(12) United States Patent
He et al.

(10) Patent No.: US 12,482,212 B2
(45) Date of Patent: Nov. 25, 2025

(54) MODELING METHOD, RELATED ELECTRONIC DEVICE, AND STORAGE MEDIUM

(71) Applicant: Huawei Technologies Co., Ltd., Shenzhen (CN)

(72) Inventors: Yong He, Shenzhen (CN); Bo Cai, Nanjing (CN); Lisheng Xu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 152 days.

(21) Appl. No.: 18/573,668

(22) PCT Filed: May 19, 2022

(86) PCT No.: PCT/CN2022/093934
§ 371 (c)(1),
(2) Date: Dec. 22, 2023

(87) PCT Pub. No.: WO2022/267781
PCT Pub. Date: Dec. 29, 2022

(65) Prior Publication Data
US 2024/0331324 A1    Oct. 3, 2024

(30) Foreign Application Priority Data

Jun. 26, 2021 (CN) .......................... 202110715044.2

(51) Int. Cl.
G06T 19/00 (2011.01)
G06T 19/20 (2011.01)
G06V 10/25 (2022.01)

(52) U.S. Cl.
CPC .............. G06T 19/20 (2013.01); G06V 10/25 (2022.01); *G06T 2219/2016* (2013.01)

(58) Field of Classification Search
None
See application file for complete search history.

(56) References Cited

U.S. PATENT DOCUMENTS

2016/0335985 A1* 11/2016 Ebberson ................. G09G 5/02

FOREIGN PATENT DOCUMENTS

CN    104573597 A    4/2015
CN    106951812 A    7/2017
(Continued)

*Primary Examiner* — Martin Mushambo
(74) *Attorney, Agent, or Firm* — Slater Matsil, LLP

(57) ABSTRACT

In the method, a terminal device display a first interface including a taken picture; collect a plurality of frames of images corresponding target object, and obtain an association relationship between the plurality of frames of images; and obtain a three-dimensional model corresponding to the target object based on the plurality of frames of images and the association relationship between the plurality of frames of images, and display the three-dimensional model. When the plurality of frames of images are collected, a first virtual bounding body including a plurality of patches is displayed. When the terminal device is in a first pose, the terminal device collects a first image, and changes a display effect of a patch corresponding to the first image. When the terminal device is in a second pose, the terminal device collects a second image, and changes a display effect of a patch corresponding to the second image.

20 Claims, 28 Drawing Sheets

(56) References Cited

FOREIGN PATENT DOCUMENTS

| | | |
|---|---|---|
| CN | 107729790 A | 2/2018 |
| CN | 108108748 A | 6/2018 |
| CN | 108229232 A | 6/2018 |
| CN | 109658507 A | 4/2019 |
| CN | 110020571 A | 7/2019 |
| CN | 110378165 A | 10/2019 |

* cited by examiner

MODELING METHOD, RELATED ELECTRONIC DEVICE, AND STORAGE MEDIUM

CROSS-REFERENCE TO RELATED APPLICATIONS

This application is a national stage of International Application No. PCT/CN2022/093934, filed on May 19, 2022, which claims priority to Chinese Patent Application No. 202110715044.2 filed on Jun. 26, 2021. Both of the aforementioned applications are hereby incorporated by reference in their entireties.

TECHNICAL FIELD

This application relates to the field of three-dimensional reconstruction, and in particular, to a modeling method, a related electronic device, and a storage medium.

BACKGROUND 3D reconstruction applications/software may be used to perform 3D modeling on objects. Currently, when 3D modeling is implemented, a user needs to first use a mobile terminal tool (such as a mobile phone or a camera) to collect data (such as a picture or depth information) required for 3D modeling, and then a 3D reconstruction application may perform 3D reconstruction on an object based on the collected data required for 3D modeling, to obtain a 3D model corresponding to the object.

However, in the current 3D modeling manner, a process of collecting the data required for 3D modeling and a process of performing 3D reconstruction on the object based on the collected data required for 3D modeling are complex, and have a high requirement on device hardware. For example, in the process of collecting the data required for 3D modeling, a collection device (for example, the foregoing mobile terminal tool) needs to be configured with special hardware such as a lidar (light detection and ranging, LIDAR) sensor or an RGB depth (RGB depth, RGB-D) camera, and in the process of performing 3D reconstruction on the object based on the collected data required for 3D modeling, a processing device that runs a 3D reconstruction application needs to be configured with a high-performance independent graphics card.

SUMMARY

Embodiments of this application provide a modeling method, a related electronic device, and a storage medium, to simplify a process of collecting data required for 3D modeling and a process of performing 3D reconstruction on an object based on the collected data required for 3D modeling, and have a relatively low requirement on device hardware.

According to a first aspect, an embodiment of this application provides a modeling method. The method is applied to a terminal device. The method includes:

The terminal device displays a first interface, where the first interface includes a taken picture of the terminal device. The terminal device collects a plurality of frames of images corresponding to a to-be-modeled target object in response to a collection operation, and obtains an association relationship between the plurality of frames of images. The terminal device obtains a three-dimensional model corresponding to the target object based on the plurality of frames of images and the association relationship between the plurality of frames of images. The terminal device displays the three-dimensional model corresponding to the target object.

The terminal device displays a first virtual bounding body in a process of collecting the plurality of frames of images corresponding to the target object. The first virtual bounding body includes a plurality of patches. That the terminal device collects a plurality of frames of images corresponding to a to-be-modeled target object in response to a collection operation, and obtains an association relationship between the plurality of frames of images includes:

When the terminal device is in a first pose, the terminal device collects a first image, and changes a display effect of a patch corresponding to the first image. When the terminal device is in a second pose, the terminal device collects a second image, and changes a display effect of a patch corresponding to the second image. After changing display effects of the plurality of patches of the first virtual bounding body, the terminal device obtains the association relationship between the plurality of frames of images based on the plurality of patches.

For example, for each frame of keyframe, the terminal device may determine matching information of the frame of keyframe based on an association relationship between a patch corresponding to the frame of keyframe and another patch. The association relationship between the patch corresponding to the keyframe and the another patch may include: patches respectively corresponding to four directions, namely, the top, bottom, left, and right directions, of the patch corresponding to the keyframe in a patch model.

For example, an example in which a patch model includes two layers, and each layer includes 20 patches is used. Assuming that a patch corresponding to a frame of keyframe is a patch 1 in a first layer, an association relationship between the patch 1 and another patch may include: A patch below the patch 1 is a patch 21, a patch on a left side of the patch 1 is a patch 20, and a patch on a right side of the patch 1 is a patch 2. The mobile phone may determine, based on an association relationship between the foregoing patch 1 and other patches, that other keyframes associated with the frame of keyframe include a keyframe corresponding to the patch 21, a keyframe corresponding to the patch 20, and a keyframe corresponding to the patch 2. Therefore, the mobile phone may obtain that the matching information of the frame of keyframe includes identification information of the keyframe corresponding to the patch 21, identification information of the keyframe corresponding to the patch 20, and identification information of the keyframe corresponding to the patch 2.

It may be understood that, for the mobile phone, an association relationship between different patches in the patch model is a known quantity.

In the modeling method (or referred to as a 3D modeling method), the terminal device can implement 3D modeling by relying only on a common RGB camera to collect data required for 3D modeling, and a process of collecting the data required for 3D modeling does not need to depend on that the terminal device has special hardware such as an LIDAR sensor or an RGB-D camera. The terminal device obtains the three-dimensional model corresponding to the target object based on the plurality of frames of images and the association relationship between the plurality of frames of images. This can effectively reduce computing load in a 3D modeling process, and can improve 3D modeling efficiency.

In addition, in this method, the user only needs to perform, on a terminal device side, an operation related to collecting the data required for 3D modeling, and then view or preview a final 3D model on the terminal device. For a user, all operations are completed on the terminal device side, so that operations are simpler and user experience may be better.

In a possible design, the terminal device includes a first application, and before the terminal device displays the first interface, the method further includes: The terminal device displays a second interface in response to an operation of opening the first application.

That the terminal device displays a first interface includes: The terminal device displays the first interface in response to an operation of enabling a three-dimensional modeling function of the first application on the second interface.

For example, the second interface may include a function control used to enable a 3D modeling function. The user may tap or touch the function control on the second interface, and the mobile phone may enable a 3D modeling function of the first application in response to an operation of tapping or touching the function control on the second interface by the user. In other words, the operation of tapping or touching the function control by the user on the second interface is an operation of enabling the three-dimensional modeling function of the first application on the second interface.

In some embodiments, the first virtual bounding body includes one or more layers, and the plurality of patches are distributed at the one or more layers.

For example, in an implementation, a structure of the patch model may include an upper layer and a lower layer, and each layer may include a plurality of patches. In another implementation, a structure of the patch model may include three layers: an upper layer, a middle layer, and a lower layer, and each layer may include a plurality of patches. In still another implementation, a structure of the patch model may be a one-layer structure including a plurality of patches. This is not limited herein.

Optionally, the method further includes: The terminal device displays first prompt information, where the first prompt information is used to remind a user to place a location of the target object in the taken picture at a central location.

For example, the first prompt information may be "Place a target object in a center of a screen".

Optionally, the method further includes: The terminal device displays second prompt information, where the second prompt information is used to remind the user to adjust one or more of a shooting environment in which the target object is located, a manner of shooting the target object, and a screen-to-body ratio of the target object.

For example, the second prompt information may be "Place an object still on a pure-color plane, with soft lighting, and shoot around the object, with an object screen-to-body ratio as large and complete as possible".

In this embodiment, after the user adjusts the shooting environment in which the target object is located, the object screen-to-body ratio, and the like based on prompt content of the second prompt information, a subsequent data collection process may be faster, and quality of collected data may be better.

Optionally, before the terminal device obtains the three-dimensional model corresponding to the target object based on the plurality of frames of images and the association relationship between the plurality of frames of images, the method further includes: The terminal device detects an operation of generating the three-dimensional model; and the terminal device displays third prompt information in response to the operation of generating the three-dimensional model, where the third prompt information is used to prompt the user that modeling is being performed on the target object.

For example, the third prompt information may be "Modeling".

Optionally, after the terminal device obtains the three-dimensional model corresponding to the target object based on the plurality of frames of images and the association relationship between the plurality of frames of images, the method further includes: The terminal device displays fourth prompt information, where the fourth prompt information is used to prompt the user that the modeling on the target object is completed.

For example, the fourth prompt information may be "Modeling completed".

Optionally, that the terminal device displays the three-dimensional model corresponding to the target object further includes: The terminal device changes a display angle of the three-dimensional model corresponding to the target object in response to an operation of changing the display angle of the three-dimensional model corresponding to the target object, where the operation of changing the display angle of the three-dimensional model corresponding to the target object includes an operation of dragging the three-dimensional model corresponding to the target object to rotate clockwise or counterclockwise along a first direction.

The first direction may be any direction, for example, a horizontal direction or a vertical direction. The terminal device changes the display angle of the three-dimensional model corresponding to the target object in response to the operation of changing the display angle of the three-dimensional model corresponding to the target object, so that an effect of presenting the 3D model to the user at different angles can be implemented.

Optionally, that the terminal device displays the three-dimensional model corresponding to the target object further includes: The terminal device changes a display size of the three-dimensional model corresponding to the target object in response to an operation of changing the display size of the three-dimensional model corresponding to the target object, where the operation of changing the display size of the three-dimensional model corresponding to the target object includes an operation of zooming in or zooming out on the three-dimensional model corresponding to the target object.

For example, a zoom-out operation may be an operation of sliding inward (in relative directions) on a 3D model preview interface by using two fingers by the user, and a zoom-in operation may be an operation of sliding the 3D model preview interface outward (in opposite directions) by using two fingers by the user. The 3D model preview interface is an interface on which the terminal device displays the 3D model corresponding to the target object.

In some other implementations, the zoom-in operation or the zoom-out operation performed by the user on the three-dimensional model corresponding to the target object may alternatively be a double-tap operation or a touch and hold operation. Alternatively, the 3D model preview interface may further include a function control that can perform the zoom-in operation or the zoom-out operation, or the like. This is not limited herein.

In some embodiments, the association relationship between the plurality of frames of images includes matching information of each frame of image in the plurality of frames of images; the matching information of each frame of image includes identification information of another image that is associated with the image and that is in the plurality of frames of images; and the matching information of each frame of image is obtained based on an association relationship between each frame of image and a patch corresponding to each frame of image, and an association relationship between the plurality of patches.

For example, for a keyframe whose image number is 18, identification information of other keyframes associated with the keyframe whose image number is 18 is image numbers of the other keyframes associated with the keyframe whose image number is 18, such as 26, 45, 59, 78, 89, 100, and 449.

Optionally, that the terminal device collects a plurality of frames of images corresponding to a to-be-modeled target object in response to a collection operation, and obtains an association relationship between the plurality of frames of images further includes: The terminal device determines the target object based on the taken picture; and when the terminal device collects the plurality of frames of images, the location of the target object in the taken picture is the central location of the taken picture.

Optionally, that the terminal device collects a plurality of frames of images corresponding to a to-be-modeled target object includes: In a process of shooting the target object, the terminal device performs blur detection on each frame of shot image, and collects an image whose definition is greater than a first threshold as an image corresponding to the target object.

For each shooting location (one shooting location may correspond to one patch), the terminal device may obtain some keyframe pictures with relatively good quality by performing blur detection on a picture shot at the shooting location. The keyframe picture is an image corresponding to the target object, and there may be one or more keyframe pictures corresponding to each patch.

Optionally, that the terminal device displays the three-dimensional model corresponding to the target object includes: The terminal device displays the three-dimensional model corresponding to the target object in response to an operation of previewing the three-dimensional model corresponding to the target object.

For example, the terminal device may display a view button, and the user may tap the view button. The terminal device may display the three-dimensional model corresponding to the target object in response to an operation of the user tapping the view button. An operation of tapping the view button by the user is an operation of previewing the three-dimensional model corresponding to the target object.

Optionally, the three-dimensional model corresponding to the target object includes a basic three-dimensional model of the target object and texture of a surface of the target object.

The texture of the surface of the target object may be a texture map the surface of the target object. The 3D model of the target object may be generated based on the basic 3D model of the target object and the texture of the surface of the target object. The texture of the surface of the target object is mapped to a surface of the basic 3D model of the target object in a specific manner, so that the surface of the target object can be more realistically restored, and the target object looks more realistic.

In a possible design, the terminal device is connected to a server, and that the terminal device obtains a three-dimensional model corresponding to the target object based on the plurality of frames of images and the association relationship between the plurality of frames of images includes: The terminal device sends the plurality of frames of images and the association relationship between the plurality of frames of images to the server; and the terminal device receives the three-dimensional model corresponding to the target object that is sent by the server.

In this design, a process of generating the three-dimensional model corresponding to the target object based on the plurality of frames of images and the association relationship between the plurality of frames of images may be completed on a server side. In other words, in the design, 3D modeling may be implemented by using a computing resource of the server. The design may be applied to a scenario in which computing capabilities of some terminal devices are weak, to improve universality of the 3D modeling method.

Optionally, the method further includes: The terminal device sends a camera intrinsic parameter, gravity direction information, an image name, an image number, camera pose information, and a timestamp that correspond to each of the plurality of frames of images to the server.

Optionally, the method further includes: The terminal device receives an indication message from the server, where the indication message indicates, to the terminal device, that the server completes the modeling on the target object.

For example, the terminal device may display the fourth prompt information after receiving the indication message.

Optionally, before the terminal device receives the three-dimensional model corresponding to the target object that is sent the server, the method further includes: The terminal device sends a download request message to the server, where the download request message is used to request to download the three-dimensional model corresponding to the target object from the server.

After receiving the download request message, the server may send the three-dimensional model corresponding to the target object to the terminal device.

Optionally, in some embodiments, when collecting the data required for performing 3D modeling on the target object, the terminal device may further display a scanning progress on the first interface. For example, the first interface may include a scan button, and the terminal device may display the scanning progress by using an annular black filling effect in the scan button in the first interface.

It may be understood that a manner in which the mobile phone displays the scanning progress on the first interface may vary with UI presentation effects of the scan button. This is not limited herein.

In some other embodiments, the terminal device may alternatively not display the scanning progress, and the user may learn of the scanning progress based on a status in which a patch in the first virtual bounding body is lit.

According to a second aspect, an embodiment of this application provides a modeling apparatus. The apparatus may be used in a terminal device, to implement the modeling method according to the first aspect. Functions of the apparatus may be implemented by hardware, or may be implemented by hardware executing corresponding software. The hardware or the software includes one or more modules or units corresponding to the foregoing functions. For example, the apparatus may include a display unit and a processing unit. The display unit and the processing unit may be configured to cooperate to implement the modeling method in the first aspect.

For example, the display unit is configured to display a first interface, where the first interface includes a taken picture of the terminal device.

The processing unit is configured to: collect a plurality of frames of images corresponding to a to-be-modeled target object in response to a collection operation, obtain an association relationship between the plurality of frames of images, and obtain a three-dimensional model corresponding to the target object based on the plurality of frames of images and the association relationship between the plurality of frames of images.

The display unit is further configured to display the three-dimensional model corresponding to the target object.

The display unit is further configured to display a first virtual bounding body in a process of collecting the plurality of frames of images corresponding to the target object. The first virtual bounding body includes a plurality of patches. The processing unit is specifically configured to: when the terminal device is in a first pose, collect a first image, and change a display effect of a patch corresponding to the first image; when the terminal device is in a second pose, collect a second image, and change a display effect of a patch corresponding to the second image; and after changing display effects of the plurality of patches of the first virtual bounding body, obtain the association relationship between the plurality of frames of images based on the plurality of patches.

Optionally, the display unit and the processing unit are further configured to implement other display functions and processing functions in the method according to the first aspect. Details are not described herein again.

Optionally, for the implementation described in the first aspect in which the terminal device sends the plurality of frames of images and the association relationship between the plurality of frames of images to the server, and the server generates the three-dimensional model corresponding to the target object based on the plurality of frames of images and the association relationship between the plurality of frames of images, the modeling apparatus may further include a sending unit and a receiving unit. The sending unit is configured to send the plurality of frames of images and the association relationship between the plurality of frames of images to the server, and the receiving unit is configured to receive the three-dimensional model corresponding to the target object that is sent by the server.

According to a third aspect, an embodiment of this application provides an electronic device, including a processor, a memory, and a computer program, where the computer program is stored in the memory, and when the computer program is executed by the processor, the electronic device performs the method according to any one of the first aspect or the possible implementations of the first aspect.

According to a fourth aspect, an embodiment of this application provides a computer-readable storage medium, where the computer-readable storage medium includes a computer program, and when the computer program is run on an electronic device, the electronic device performs the method according to any one of the first aspect and the possible implementations of the first aspect.

According to a fifth aspect, an embodiment of this application further provides a computer program product, including computer-readable code. When the computer-readable code is run on an electronic device, the electronic device performs the method according to any one of the first aspect and the possible implementations of the first aspect.

For beneficial effects of the second aspect to the fifth aspect, refer to descriptions in the first aspect. Details are not described herein again.

According to a sixth aspect, an embodiment of this application further provides a modeling method. The method is applied to a server, and the server is connected to a terminal device. The method includes: The server receives a plurality of frames of images corresponding to a target object and an association relationship between the plurality of frames of images that are sent by the terminal device. The server generates a three-dimensional model corresponding to the target object based on the plurality of frames of images and the association relationship between the plurality of frames of images. The server sends the three-dimensional model corresponding to the target object to the terminal device.

In the method, 3D modeling may be implemented by using a computing resource of the server, a process of generating the three-dimensional model corresponding to the target object based on the plurality of frames of images and the association relationship between the plurality of frames of images may be completed on a server side. The server performs 3D modeling with reference to the association relationship between the plurality of frames of images, which can effectively reduce computing load of the server and improve modeling efficiency.

For example, when performing 3D modeling, the server performs feature detection and matching on each frame of image and another image associated with the image with reference to the association relationship between the plurality of frames of images, and does not need to perform feature detection and matching on the image and all other images. In this manner, two adjacent frames of images can be quickly compared, thereby effectively reducing the computing load of the server and improving the 3D modeling efficiency.

For another example, after determining a mapping relationship between a texture of a first frame of image and a surface of a basic 3D model of the target object, the server may quickly and accurately determine, with reference to matching information of the first frame of image, a mapping relationship between a texture of another image associated with the first frame of image and the surface of the basic 3D model of the target object. Similarly, for each subsequent frame of image, the server may quickly and accurately determine, with reference to matching information of the image, a mapping relationship between a texture of another image associated with the image and the surface of the basic 3D model of the target object.

The method may be applied to a scenario in which computing capabilities of some terminal devices are weak, to improve universality of the 3D modeling method.

In addition, the method also has other beneficial effects described in the first aspect. For example, a process of collecting data required for 3D modeling does not need to depend on that the terminal device has special hardware such as an LIDAR sensor or an RGB-D camera. The server obtains the three-dimensional model corresponding to the target object based on the plurality of frames of images and the association relationship between the plurality of frames of images. This can effectively reduce computing load in a 3D modeling process, improve 3D modeling efficiency, and the like. Details are not described herein one by one.

Optionally, the method further includes: The server receives a camera intrinsic parameter, gravity direction information, an image name, an image number, camera pose information, and a timestamp that correspond to each of the plurality of frames of images and that are sent by the terminal device.

That the server generates a three-dimensional model corresponding to the target object based on the plurality of frames of images and the association relationship between the plurality of frames of images includes: The server generates the three-dimensional model corresponding to the target object based on the plurality of frames of images, the association relationship between the plurality of frames of images, and the camera intrinsic parameter, the gravity direction information, the image name, the image number, the camera pose information, and the timestamp that correspond to each of the plurality of frames of images.

Optionally, the association relationship between the plurality of frames of images includes matching information of each frame of image in the plurality of frames of images; the matching information of each frame of image includes identification information of another image that is associated with the image and that is in the plurality of frames of images; and the matching information of each frame of image is obtained based on an association relationship between each frame of image and a patch corresponding to each frame of image, and an association relationship between a plurality of patches.

According to a seventh aspect, an embodiment of this application provides a modeling apparatus, where the apparatus may be used in a server, and is configured to implement the modeling method according to the sixth aspect. Functions of the apparatus may be implemented by hardware, or may be implemented by hardware executing corresponding software. The hardware or the software includes one or more modules or units corresponding to the foregoing functions. For example, the apparatus may include a receiving unit, a processing unit, and a sending unit. The receiving unit, the processing unit, and the sending unit may be configured to cooperate to implement the modeling method according to the sixth aspect.

For example, the receiving unit may be configured to receive a plurality of frames of images corresponding to a target object and an association relationship between the plurality of frames of images that are sent by a terminal device. The processing unit may be configured to generate a three-dimensional model corresponding to the target object based on the plurality of frames of images and the association relationship between the plurality of frames of images. The sending unit may be configured to send the three-dimensional model corresponding to the target object to the terminal device.

Optionally, the receiving unit, the processing unit, and the sending unit may be configured to implement all functions that can be implemented by the server in the method according to the sixth aspect. Details are not described herein again.

According to an eighth aspect, an embodiment of this application provides an electronic device, including a processor, a memory, and a computer program, where the computer program is stored in the memory, and when the computer program is executed by the processor, the electronic device performs the method according to any one of the sixth aspect and the possible implementations of the sixth aspect.

According to a ninth aspect, an embodiment of this application provides a computer-readable storage medium, where the computer-readable storage medium includes a computer program, and when the computer program is run on an electronic device, the electronic device performs the method according to any one of the sixth aspect and the possible implementations of the sixth aspect.

According to a tenth aspect, an embodiment of this application further provides a computer program product, including computer-readable code. When the computer-readable code is run on an electronic device, the electronic device performs the method according to any one of the sixth aspect and the possible implementations of the sixth aspect.

For beneficial effects of the seventh aspect to the tenth aspect, refer to descriptions in the sixth aspect. Details are not described herein again.

According to an eleventh aspect, an embodiment of this application further provides a device-cloud collaborative system, including a terminal device and a server, where the terminal device is connected to the server. The terminal device displays a first interface, where the first interface includes a taken picture of the terminal device. The terminal device collects a plurality of frames of images corresponding to a to-be-modeled target object in response to a collection operation, and obtains an association relationship between the plurality of frames of images. The terminal device displays a first virtual bounding body in a process of collecting the plurality of frames of images corresponding to the target object. The first virtual bounding body includes a plurality of patches. That the terminal device collects a plurality of frames of images corresponding to a to-be-modeled target object in response to a collection operation, and obtains an association relationship between the plurality of frames of images includes: When the terminal device is in a first pose, the terminal device collects a first image, and changes a display effect of a patch corresponding to the first image. When the terminal device is in a second pose, the terminal device collects a second image, and changes a display effect of a patch corresponding to the second image. After changing display effects of the plurality of patches of the first virtual bounding body, the terminal device obtains the association relationship between the plurality of frames of images based on the plurality of patches. The terminal device sends the plurality of frames of images and the association relationship between the plurality of frames of images to the server. The server obtains a three-dimensional model corresponding to the target object based on the plurality of frames of images and the association relationship between the plurality of frames of images. The server sends the three-dimensional model corresponding to the target object to the terminal device. The terminal device displays the three-dimensional model corresponding to the target object.

For beneficial effects of the eleventh aspect, refer to the descriptions in the first aspect and the sixth aspect. Details are not described herein again.

It should be understood that, descriptions of technical features, technical solutions, beneficial effect, or similar words in this application do not imply that all features and advantages can be implemented in any individual embodiment. On the contrary, it may be understood that, the descriptions of the features or the beneficial effect mean that at least one embodiment includes a specific technical feature, technical solution, or beneficial effect. Therefore, the descriptions of the technical features, the technical solutions, or the beneficial effect in this specification may not necessarily be specific to a same embodiment. Further, the technical features, the technical solutions, and the beneficial effect described in embodiments may be combined in any proper manner. A person skilled in the art may understand that an embodiment may be implemented without one or more specific technical features or technical solutions, or beneficial effect in the specific embodiment. In other embodiments, additional technical features and beneficial effect may be identified in a specific embodiment that does not reflect all embodiments.

DETAILED DESCRIPTION OF ILLUSTRATIVE EMBODIMENTS

Figure 1:
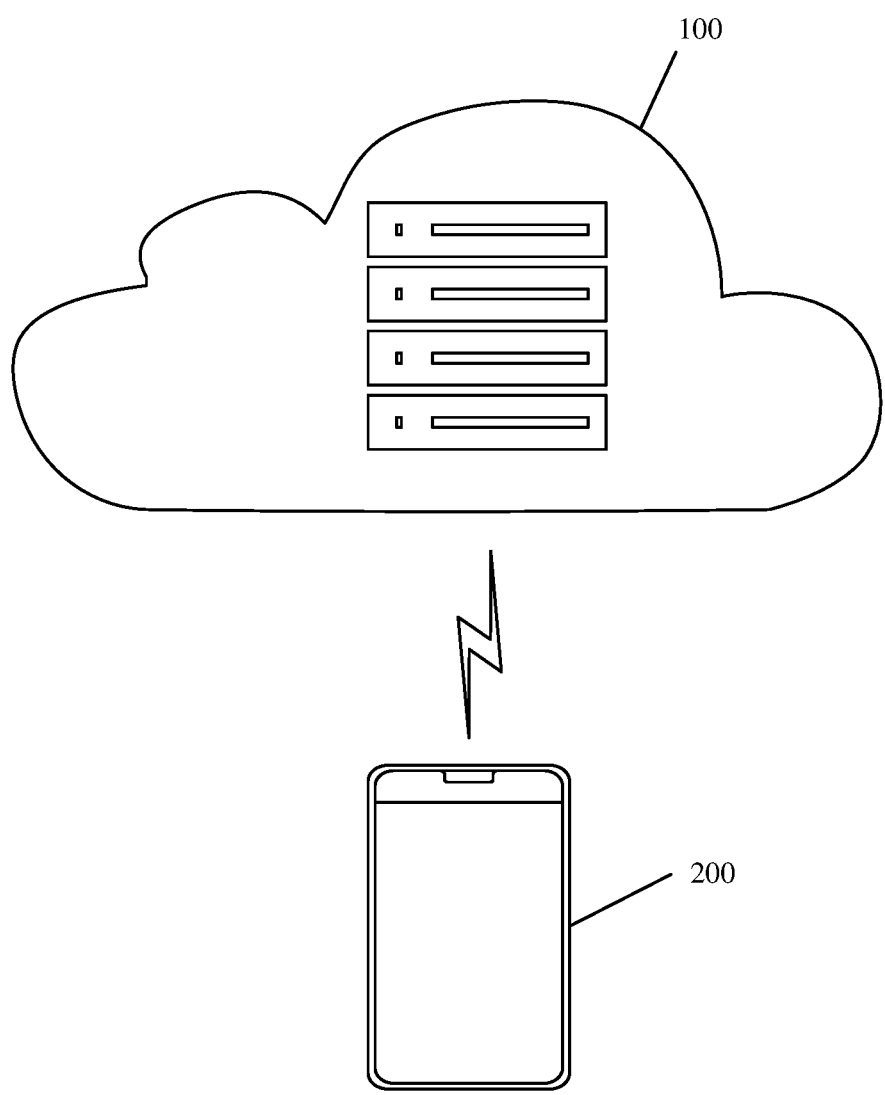
FIG. 1 is a schematic diagram of composition of a device-cloud collaborative system according to an embodiment of this application.

Terms used in the following embodiments are merely intended to describe specific embodiments, but are not intended to limit this application. The terms "one", "a" and "this" of singular forms used in this specification and the appended claims of this application are also intended to include expressions such as "one or more", unless otherwise specified in the context clearly. It should be further understood that in the following embodiments of this application, "at least one" and "one or more" mean one, two, or more. The character "/" generally indicates an "or" relationship between the associated objects.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner. The term "connection" includes a direct connection and an indirect connection, unless otherwise indicated.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features.

In embodiments of this application, the word "example", "for example", or the like is used to represent giving an example, an illustration, or a description. Any embodiment or design scheme described as "example" or "for example" in embodiments of this application should not be explained as being more preferred or having more advantages than another embodiment or design scheme. Exactly, use of the word "example", "for example", or the like is intended to present a relative concept in a specific manner.

A three-dimensional (3-dimension, 3D) reconstruction technology is widely applied to fields such as virtual reality (virtual reality), augmented reality (augmented reality), extended reality (extended reality, XR), mixed reality (mixed reality, MR), games, movies, education, and medical care. For example, the 3D reconstruction technology may be used to perform modeling on a role, a prop, a vegetation, and the like in a game, or perform modeling on a character model in a film and video, or may implement modeling related to a chemical analysis structure in an education field, or implement modeling related to a human body structure in a medical field.

Currently, most 3D reconstruction applications/software that can be used to implement 3D modeling need to be implemented on a personal computer (personal computer, PC) terminal (for example, a computer), and a few 3D reconstruction applications can implement 3D modeling on a mobile terminal (for example, a mobile phone). When a 3D reconstruction application on the PC terminal implements 3D modeling, a user needs to use a mobile terminal tool (such as a mobile phone or camera) to collect data (such as images and depth information) required for 3D modeling and upload the collected data to the PC terminal. Then, the 3D reconstruction application on the PC can perform 3D modeling based on the uploaded data. When a 3D reconstruction application on the mobile terminal implements 3D modeling, the user may directly use the mobile terminal to collect the data required for 3D modeling, and the 3D reconstruction application on the mobile terminal may directly perform 3D modeling processing based on the data collected by the mobile terminal.

However, in the foregoing two 3D modeling manners, when a user collects, by using the mobile terminal, the data required for 3D modeling, special hardware such as a lidar (light detection and ranging, LIDAR) sensor or an RGB depth (RGB depth, RGB-D) camera of the mobile terminal needs to be depended on, and a process of collecting the data required for 3D modeling requires a relatively high hardware requirement. That the 3D reconstruction application on the PC terminal/mobile terminal implements 3D modeling also has a high requirement on hardware of the PC terminal/mobile terminal. For example, the PC terminal/mobile terminal may need to be configured with a high-performance independent graphics card.

In addition, the foregoing manner of implementing 3D modeling on the PC terminal is complex. For example, after the user performs a related data collection operation on the mobile terminal, the user needs to copy the collected data or transmit the collected data to the PC terminal through a network, and needs to perform a related modeling operation on the 3D reconstruction application on the PC terminal.

In this background, an embodiment of this application provides a 3D modeling method, which may be applied to a device-cloud collaborative system formed by a terminal device and a cloud. In "device" in device-cloud collaboration means a terminal device, "cloud" means a cloud, and the cloud may also be referred to as a cloud server or a cloud platform. In the method, the terminal device may collect data required for 3D modeling, preprocess the data required for 3D modeling, and upload the preprocessed data required for 3D modeling to the cloud. The cloud may perform 3D modeling based on the received preprocessed data required for 3D modeling. The terminal device may download, from the cloud, a 3D model obtained by performing 3D modeling by the cloud, and provide a function of previewing the 3D model.

In the 3D modeling method, the terminal device can implement 3D modeling by relying only on a common RGB camera to collect the data required for 3D modeling, and a process of collecting the data required for 3D modeling does not need to depend on that the terminal device has special hardware such as an LIDAR sensor or an RGB-D camera; and a process of 3D modeling is completed on the cloud, and there is no need to rely on high-performance discrete graphics cards configured on terminal devices. In other words, the 3D modeling method has a low requirement on hardware of the terminal device.

In addition, compared with the foregoing manner of implementing 3D modeling on the PC terminal, in this method, the user only needs to perform, on a terminal device side, an operation related to collecting the data required for 3D modeling, and then view or preview a final 3D model on the terminal device. For a user, all operations are completed on the terminal device side, so that operations are simpler and user experience may be better.

For example, FIG. 1 is a schematic diagram of composition of a device-cloud collaborative system according to an embodiment of this application. As shown in FIG. 1, a device-cloud collaborative system provided in this embodiment of this application may include a cloud 100 and a terminal device 200. The terminal device 200 may be connected to the cloud 100 through a wireless network.

The cloud 100 is also a server. For example, in some embodiments, the cloud 100 may be a single server or a server cluster including a plurality of servers. An implementation architecture of the cloud 100 is not limited in this application.

Optionally, in this embodiment of this application, the terminal device 200 may be an interactive electronic whiteboard with a shooting function, a mobile phone, a wearable device (such as a smartwatch or a smart band), a tablet computer, a notebook computer, a desktop computer, a portable electronic device (such as a laptop computer, Laptop), a ultra-mobile personal computer (ultra-mobile personal computer, UMPC), a netbook, a personal digital assistant (personal digital assistant, PDA), a smart television (such as a smart screen), an in-vehicle computer, a smart sound box, augmented reality (augmented reality, AR) device, a virtual reality (virtual reality, VR) device, and another intelligent device with a display, or may be a professional shooting device such as a digital camera, a single-lens reflex camera/micro single-lens camera, a motion camera, a pan-tilt-zoom camera, or an unmanned aerial vehicle. A specific type of the terminal device is not limited in this embodiment of this application.

It should be understood that, when the terminal device is a shooting device such as a pan-tilt-zoom camera or an unmanned aerial vehicle, the terminal device further includes a display device that may provide a shooting interface, configured to display a collection interface for collecting data required for 3D modeling, a preview interface of a 3D model, and the like. For example, the display device of the pan-tilt-zoom camera may be a mobile phone, and the display device of an aerial drone may be a remote control device.

It should be noted that FIG. 1 provides an example of the terminal device 200. However, it should be understood that there may be one or more terminal devices 200 in the device-cloud collaborative system, and the plurality of terminal devices 200 may be the same, or may be different or partially the same. This is not limited herein. The 3D modeling method provided in this embodiment of this application is a process of implementing 3D modeling by interacting between each terminal device 200 and the cloud 100.

Figure 2:
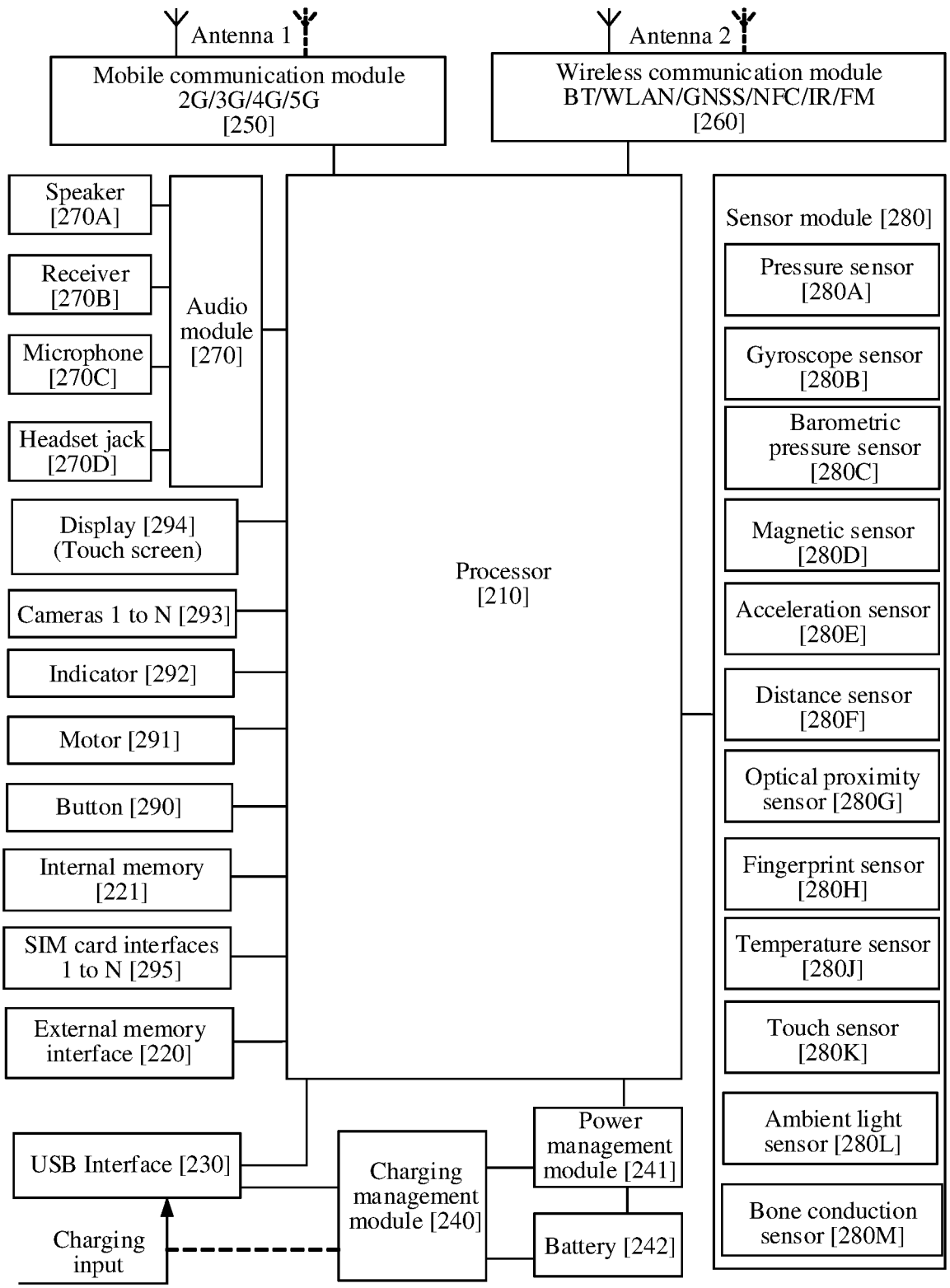
FIG. 2 is a schematic diagram of a structure of a terminal device according to an embodiment of this application.

For example, the terminal device 200 is a mobile phone. FIG. 2 is a schematic diagram of a structure of a terminal device according to an embodiment of this application. As shown in FIG. 2, the mobile phone may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (subscriber identification module, SIM) card interface 295, and the like.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the mobile phone. The controller may generate an operation control signal based on an instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data that has been used or cyclically used by the processor 210. If the processor 210 needs to use the instructions or the data again, the processor 210 may directly invoke the instructions or the data from the memory. This avoids repeated access and reduces waiting time of the processor 210, thereby improving system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, a USB interface, and/or the like.

The external memory interface 220 may be configured to connect to an external memory card, for example, a micro SD card, to expand a storage capability of the mobile phone. The external storage card communicates with the processor 210 through the external memory interface 220, to implement a data storage function. For example, files such as music and videos are stored in the external storage card.

The internal memory 221 may be configured to store computer-executable program code, and the executable program code includes instructions. The processor 210 runs the instructions stored in the internal memory 221, to perform various function applications of the mobile phone and data processing.

The internal memory 221 may further include a program storage area and a data storage area. The program storage area may store an operating system, an application required by at least one function (for example, a first application in embodiments of this application), and the like. The data storage area may store data (for example, image data and a phone book) created during use of the mobile phone. In addition, the internal memory 221 may include a high-speed random access memory, or may include a nonvolatile memory, for example, at least one magnetic disk storage device, a flash memory, or a universal flash storage (universal flash storage, UFS).

The charging management module 240 is configured to receive a charging input from a charger. The charging management module 240 may further supply power to the mobile phone by using the power management module 241 while charging the battery 242. The power management module 241 is configured to connect to the battery 242, the charging management module 240, and the processor 210. The power management module 241 may also receive input of the battery 242 to supply power to the mobile phone.

A wireless communication function of the mobile phone may be implemented through the antenna 1, the antenna 2, the mobile communication module 250, the wireless communication module 260, the modem processor, the baseband processor, and the like. The antenna 1 and the antenna 2 are configured to transmit and receive an electromagnetic wave signal. Each antenna in the mobile phone may be configured to cover one or more communication frequency bands Different antennas may be further multiplexed, to improve antenna utilization. For example, the antenna 1 may be multiplexed as a diversity antenna of a wireless local area network. In some other embodiments, the antenna may be used in combination with a tuning switch.

The mobile phone may implement an audio function, for example, music playing and recording, through the audio module 270, the speaker 270A, the receiver 270B, the microphone 270C, the headset jack 270D, the application processor, and the like.

The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, the like.

The camera 293 may include a plurality of types. For example, the camera 293 may include a long-focus camera, a wide-angle camera, an ultra-wide-angle camera, or the like having different focal lengths. The long-focus camera has a small field of view, and is applicable to shooting a small range of scenes at a distance. The wide-angle camera has a large field of view. The ultra-wide-angle camera has a greater field of view than the wide-angle camera, and may be used to shoot a large-range picture such as a panoramic picture. In some embodiments, a long-focus camera with a relatively small field of view may be rotated, so that objects in different ranges may be shot.

The mobile phone may capture an original image (also referred to as a RAW image or a digital negative) through the camera 293. For example, the camera 293 includes at least a lens (lens) and a sensor (sensor). When a photo or a video is shot, a shutter is enabled, and light may be transferred to the sensor through a lens of the camera 293. The sensor may convert an optical signal that passes through the lens into an electrical signal, and then perform analog-to-digital (analogue-to-digital, A/D) conversion on the electrical signal to output a corresponding digital signal. The digital signal is the raw image. Then, the mobile phone may perform subsequent ISP processing, YUV field processing, and the like on the raw image by using the processor (for example, the ISP or the DSP), to convert the raw image into an image that can be displayed, for example, a JPEG image or a high efficiency image file format (high efficiency image file format, HEIF) image. The JPEG image or the HEIF image may be transmitted to a display of the mobile phone for display, and/or transmitted to a memory of the mobile phone for storage. In this way, the mobile phone can implement a shooting function.

In a possible design, a photosensitive element of the sensor may be a charge coupled device (charge coupled device, CCD), and the sensor further includes an A/D converter. In another possible design, the photosensitive element of the sensor may be a complementary metal-oxide-semiconductor (complementary metal-oxide-semiconductor, CMOS).

For example, the ISP processing may include: bad spot correction (bad pixel correction, DPC), raw domain noise reduction, black level correction (black level correction, BLC), lens shading correction (lens shading correction, LSC), auto white balance (auto white balance, AWB), demosaic (demosaic) color interpolation, color correction (color correction matrix, CCM), dynamic range compression (dynamic range compression, DRC), gamma (gamma), 3D lookup table (look up table, LUT), YUV domain noise reduction, sharpening (sharpen), detail enhancement (detail enhance), and the like. The YUV domain processing may include: multi-frame registration, fusion, and noise reduction of a high-dynamic range (high-dynamic range, HDR) image, and a super resolution (super resolution, SR) algorithm, a beauty algorithm, a distortion correction algorithm, a blurring algorithm, and the like that improve definition.

The display 294 is configured to display an image, a video, and the like. The display 294 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light emitting diodes, QLED), or the like. In some embodiments, the mobile phone may include one or N displays 294, where N is a positive integer greater than 1. For example, the display 294 may be configured to display an interface of an application program.

The mobile phone implements a display function by using the GPU, the display 294, the application processor, and the like. The GPU is a microprocessor for image processing, and is connected to the display 294 and the application processor. The GPU is configured to: perform mathematical and geometric computation, and render an image. The processor 210 may include one or more GPUs that execute program instructions to generate or change display information.

It may be understood that the structure shown in FIG. 2 does not constitute a specific limitation on the mobile phone. In some embodiments, the mobile phone may alternatively include more or fewer components than those shown in FIG. 2, or combine some components, or split some components, or have different component arrangements. Alternatively, some components shown in FIG. 2 may be implemented by hardware, software, or a combination of software and hardware.

In addition, when the terminal device 200 is an interactive whiteboard, a wearable device, a tablet computer, a notebook computer, a desktop computer, a portable electronic device, a UMPC, a netbook, a PDA, a smart television, an in-vehicle computer, a smart sound box, an AR device, a VR device, or another intelligent device with a display, or a terminal device in another form such as a digital camera, a single-lens reflex camera/micro single-lens camera, a motion camera, a pan-tilt-zoom camera, or an unmanned aerial vehicle, for specific structures of the terminal devices in other forms, refer to FIG. 2. For example, a component may be added to or removed from a terminal device in another form based on the structure shown in FIG. 2. Details are not described herein.

It should be further understood that the terminal device 200 (for example, a mobile phone) may run one or more application programs that can implement functions such as collecting data required for 3D modeling, preprocessing the data required for 3D modeling, and supporting previewing a 3D model. For example, the application program may be referred to as a 3D modeling application or a 3D reconstruction application. When the terminal device 200 runs the foregoing 3D modeling application or 3D reconstruction application, the application program may invoke, based on an operation of a user, a camera of the terminal device 200 to perform shooting, collect the data required for 3D modeling, and preprocess the data required for 3D modeling. In addition, the application program may further display a preview interface of the 3D model through the display of the terminal device 200, so that the user views and previews the 3D model.

The following uses an example in which the terminal device 200 in the device-cloud collaborative system shown in FIG. 1 is a mobile phone to describe the 3D modeling method provided in this embodiment of this application with reference to a scenario in which a user performs 3D modeling by using the mobile phone.

It should be noted that although this embodiment of this application is described by using the example in which the terminal device 200 is a mobile phone, it should be understood that the 3D modeling method provided in this embodiment of this application is also applicable to the foregoing another terminal device with a shooting function. A specific type of the terminal device is not limited in this application.

For example, 3D modeling is performed on a target object. The 3D modeling method provided in this embodiment of this application may include the following three parts.

In a first part, a user collects, by using a mobile phone, data required for performing 3D modeling on a target object.

In a second part, the mobile phone preprocesses the collected data required for performing 3D modeling on the target object, and uploads the preprocessed data to a cloud.

In a third part, the cloud performs 3D modeling based on the data uploaded by the mobile phone, to obtain a 3D model of the target object.

Through the first part to the third part, 3D modeling may be performed on the target object. After the 3D model of the target object is obtained, the mobile phone may download the 3D model from the cloud for the user to preview.

The following separately describes the first part to the third part in detail.

First Part

In this embodiment of this application, a first application may be installed in the mobile phone, and the first application is the 3D modeling application or the 3D reconstruction application in the foregoing embodiment. For example, a name of the first application may be "3D magic cube", and the name of the first application is not limited herein. When the user wants to perform 3D modeling on the target object, the user may start and run the first application on the mobile phone. After the mobile phone starts and runs the first application, a main interface of the first application may include a function control used to start a 3D modeling function, and the user may tap or touch the function control on the home screen of the first application. The mobile phone may enable the 3D modeling function of the first application in response to an operation of tapping or touching the function control by the user. After the 3D modeling function of the first application is enabled, the mobile phone may switch a display interface from the main interface of the first application to a 3D modeling data collection interface, enable a shooting function of a camera, and display, on the 3D modeling data collection interface, a picture taken by the camera. In a process in which the mobile phone displays the 3D modeling data collection interface, the user may hold the mobile phone to collect the data required for performing 3D modeling on the target object.

In some embodiments, the mobile phone may display, on the home screen (or referred to as a desktop), a function control for starting the first application, for example, an application icon (or referred to as a button) of the first application. When the user wants to perform 3D modeling on a target object by using the first application, the user may tap or touch the application icon of the first application. After receiving an operation of tapping or touching the application icon of the first application by the user, the mobile phone may start and run the first application in response to the operation of tapping or touching the application icon of the first application by the user, and display the main interface of the first application.

Figure 3:
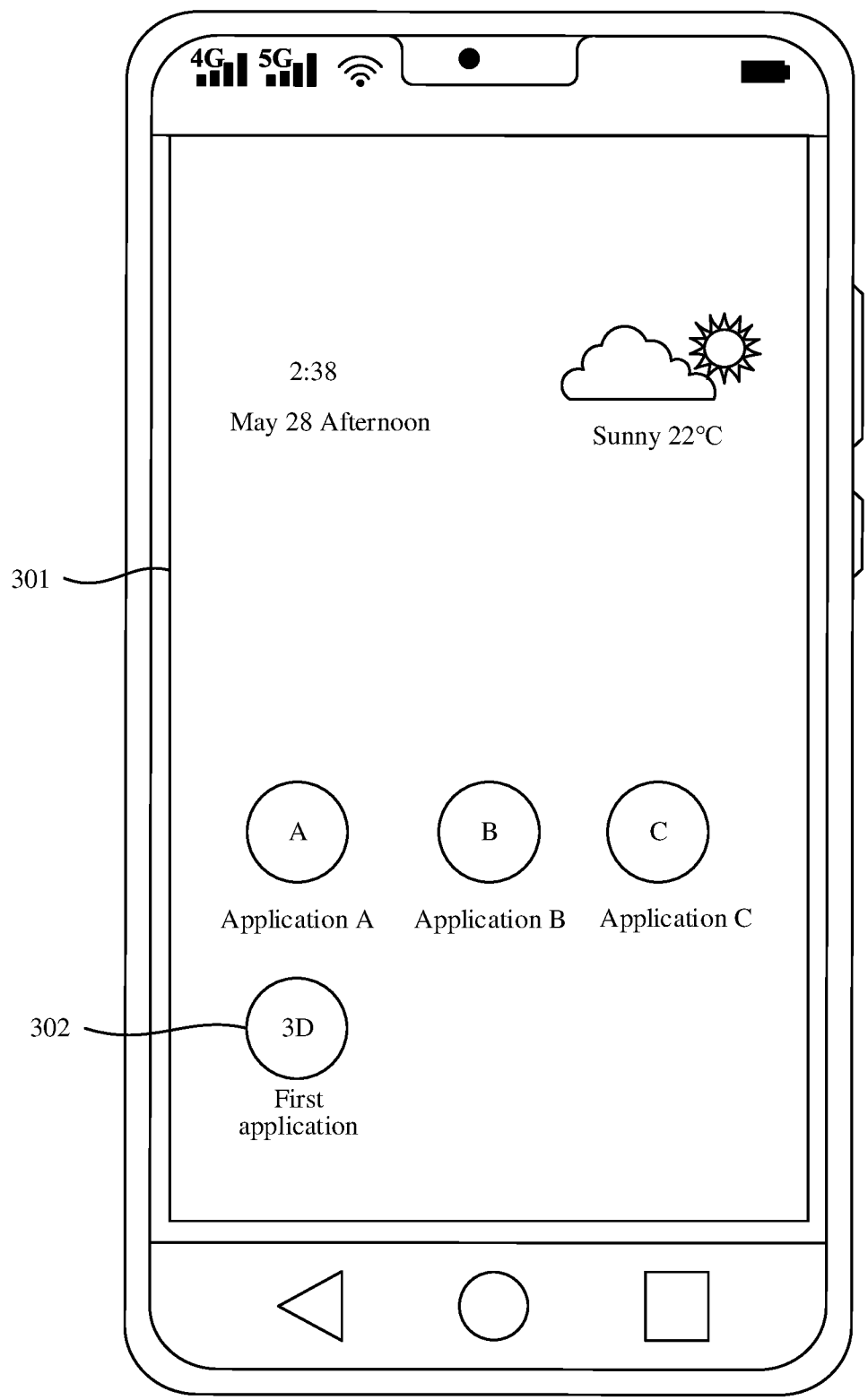
FIG. 3 is a schematic diagram of a home screen of a mobile phone according to an embodiment of this application.

For example, FIG. 3 is a schematic diagram of a home screen of a mobile phone according to an embodiment of this application. As shown in FIG. 3, the home screen 301 of the mobile phone may include an application icon 302 of a first application. The home screen 301 of the mobile phone may further include application icons of other applications such as an application A, an application B, and an application C. The user may tap or touch the application icon 302 on the home screen 301 of the mobile phone, to trigger the mobile phone to start and run the first application, and display a main interface of the first application.

In some other embodiments, the mobile phone may alternatively display, on another display interface such as a pull-down interface or a leftmost screen, a function control for starting the first application. On the pull-down interface or leftmost screen, the function control of the first application may be presented in a form of an application icon, or may be presented in a form of another function button. This is not limited herein.

The pull-down interface means a display interface that appears after a top of the home screen of the mobile phone is flicked down. The pull-down interface may display buttons of functions commonly used by the user, for example, WLAN or Bluetooth, so that the user can quickly use a related function. For example, when a current display interface of the mobile phone is a desktop, the user may perform a downward sliding operation from the top of the screen of the mobile phone, to trigger the mobile phone to switch the display interface from the desktop to a pull-down interface (or display the pull-down interface on the desktop in an overlay manner). The leftmost screen means a display interface that appears after the home screen (or referred to as a desktop) of the mobile phone is slid rightward. The leftmost screen may display applications and functions that are frequently used by the user, and subscribed services and information, and the like, to facilitate quick browsing and use by the user. For example, when the current display interface of the mobile phone is the desktop, the user may perform a rightward sliding operation on the screen of the mobile phone, to trigger the mobile phone to switch the display interface from the desktop to the leftmost screen.

It may be understood that "leftmost screen" is only a term used in embodiments of this application, and a meaning represented by "leftmost screen" is recorded in embodiments of this application, but a name of "leftmost screen" cannot constitute any limitation on embodiments of this application. In addition, in some other embodiments, "leftmost screen" may also be referred to as another name such as "desktop assistant", "shortcut menu", or "widget set interface". This is not limited herein.

In some other embodiments, when the user wants to perform 3D modeling on a target object by using a first application, the user may also control, by using a voice assistant, the mobile phone to start and run the first application. A starting manner of the first application is not limited in this application.

Figure 4:
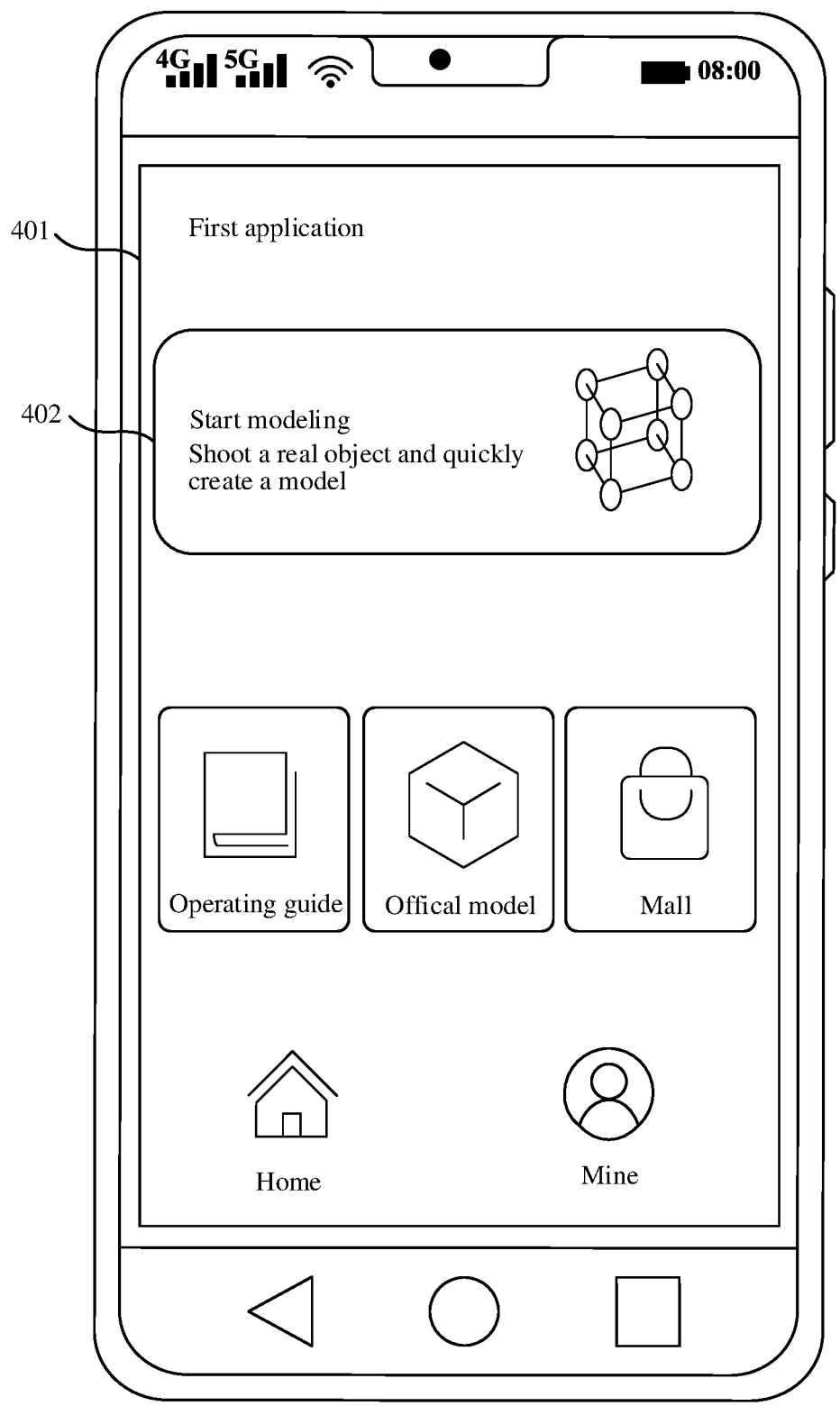
FIG. 4 is a schematic diagram of a main interface of a first application according to an embodiment of this application.

For example, FIG. 4 is a schematic diagram of a main interface of a first application according to an embodiment of this application. As shown in FIG. 4, a main interface 401 of the first application may include a function control: "Start modeling" 402, where "Start modeling" 402 is the foregoing function control used to start a 3D modeling function. A user may tap or touch "Start modeling" 402 on the main interface 401 of the first application. The mobile phone may enable a 3D modeling function of the first application in response to an operation of tapping or touching "Start modeling" 402 by the user, switch a display interface from the main interface 401 of the first application to a 3D modeling data collection interface, enable a shooting function of a camera, and display, on the 3D modeling data collection interface, a picture taken by the camera.

Figure 5:
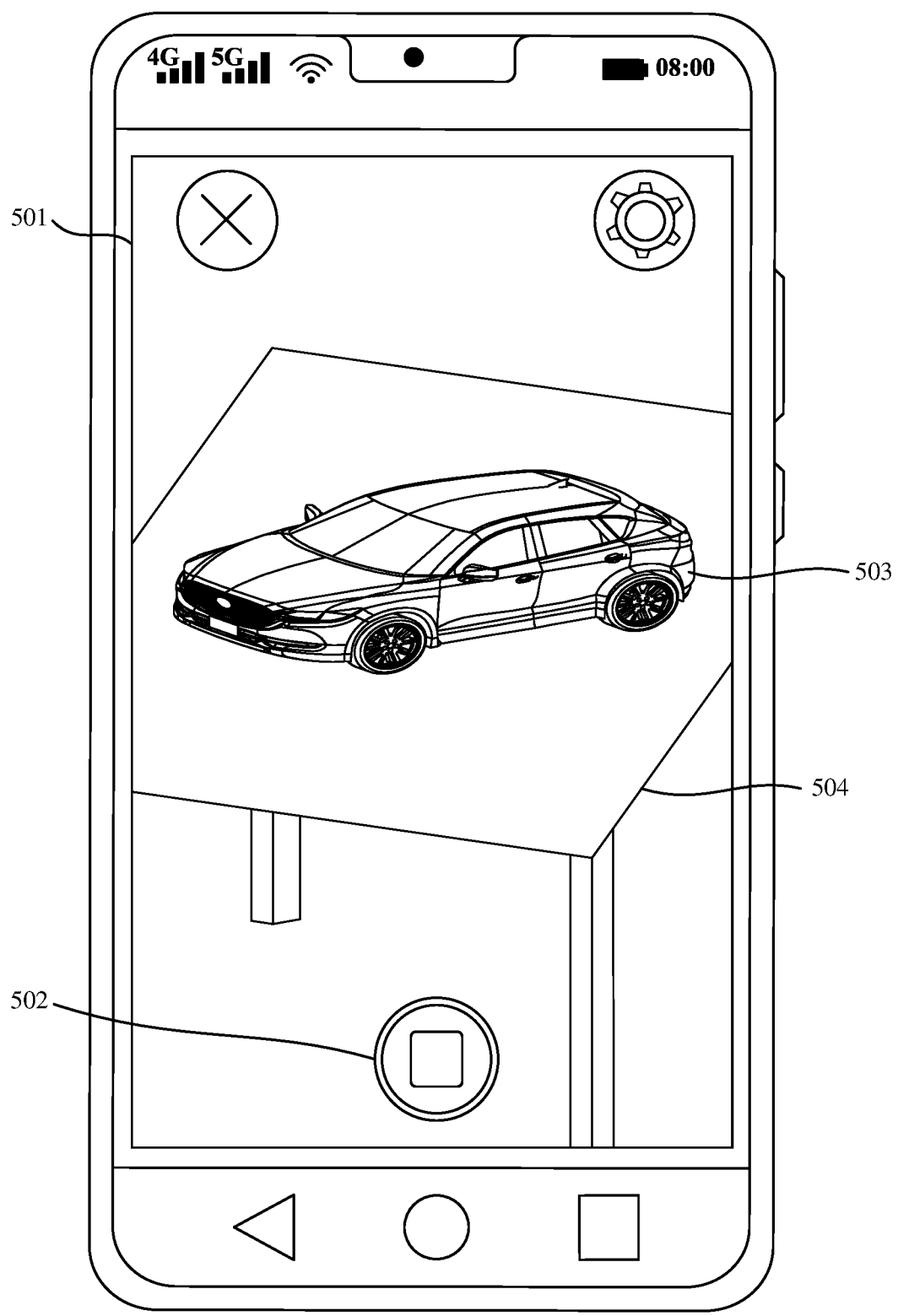
FIG. 5 is a schematic diagram of a 3D modeling data collection interface according to an embodiment of this application.

For example, FIG. 5 is a schematic diagram of a 3D modeling data collection interface according to an embodiment of this application. As shown in FIG. 5, a 3D modeling data collection interface 501 displayed by a mobile phone may include function controls: a scan button 502 and a picture taken by a camera of the mobile phone. For example, still referring to FIG. 5, assuming that a user wants to perform 3D modeling on a toy car placed on a table, the user may point the camera of the mobile phone at the toy car. In this case, a picture taken by the camera displayed on the 3D modeling data collection interface 501 may include a toy car 503 and a table 504. The user may move a shooting angle of the mobile phone, adjust a location of the toy car 503 in the picture to be at a central location of a screen (namely, the 3D modeling data collection interface 501) of the mobile phone, and tap or touch the scan button 502 on the 3D modeling data collection interface 501. The mobile phone may start to collect, in response to an operation of tapping or touching the scan button 502 by the user, data required for performing 3D modeling on a target object (namely, the toy car 503) at the central location of the screen of the mobile phone.

In other words, in this embodiment of this application, when the mobile phone starts to collect, in response to the operation of tapping or touching the scan button 502 by the user, the data required for performing 3D modeling on the target object, the mobile phone may use an object at the central location of the screen of the mobile phone in the image as the target object.

In this embodiment of this application, the 3D modeling data collection interface may be referred to as a first interface, and a main interface of the first application may be referred to as a second interface.

Figure 6:
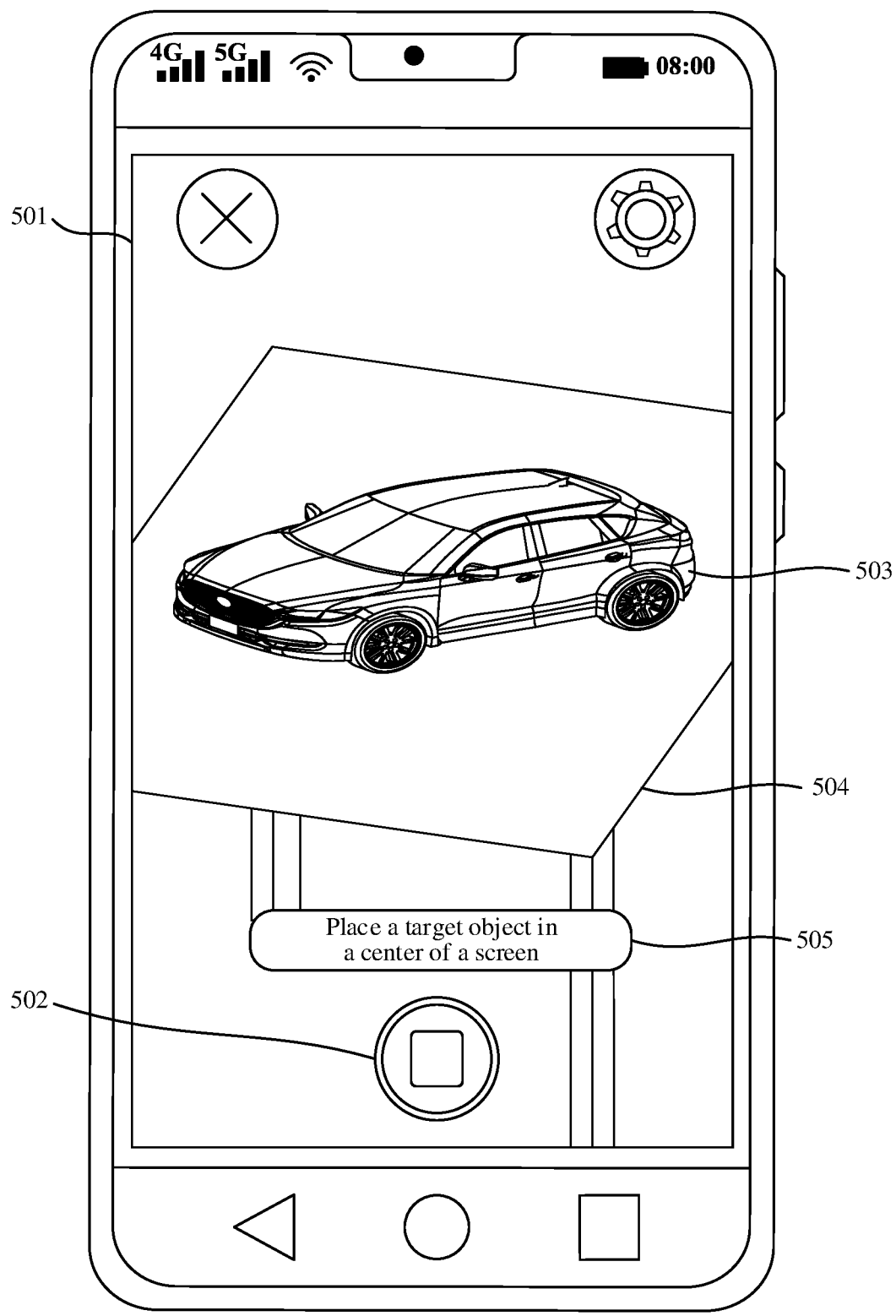
FIG. 6 is another schematic diagram of a 3D modeling data collection interface according to an embodiment of this application.

Optionally, FIG. 6 is another schematic diagram of the 3D modeling data collection interface according to an embodiment of this application. As shown in FIG. 6, after receiving an operation of tapping or touching the scan button 502 by the user, the mobile phone may further display prompt information "Place a target object in a center of a screen" 505 on the modeling data collection interface 501. The target object is also the target object, and the prompt information may be used to remind the user to place a location of the target object in the picture at the central location of the screen of the mobile phone.

For example, a display location of "Place a target object in a center of a screen" 505 on the modeling data collection interface 501 may be a location above the scan button 502, a location below the center of the screen, or the like. The display location of "Place a target object in a center of a screen" 505 on the modeling data collection interface 501 is not limited herein.

In addition, it should be noted that the prompt information "Place a target object in a center of a screen" 505 is only an example for description. In some other embodiments, another text identifier may be used to remind the user to place the location of the target object in the picture at the central location of the screen of the mobile phone. Content of the prompt information is not limited in this application either. In this embodiment of this application, the prompt information used to remind the user to place the location of the target object in the picture at the central location of the screen of the mobile phone may be referred to as first prompt information.

In this embodiment of this application, when the mobile phone starts to collect, in response to the operation of tapping or touching the scan button 502 by the user, the data required for performing 3D modeling on the target object, the user may hold the mobile phone to perform encircling shooting around the target object. In an encircling process, the mobile phone may collect 360-degree panoramic data of the target object. The data that is required for performing 3D modeling on the target object and that is collected by the mobile phone may include a picture/image of the target object that is taken by the mobile phone in the process of performing encircling shooting around the target object. The picture may be in a JPG/JPEG format. For example, the mobile phone may collect, by using the camera, a RAW image corresponding to the target object, and then a processor of the mobile phone may perform ISP processing and JPEG encoding on the RAW image, to obtain a JPG/JPEG picture corresponding to the target object.

Figure 7A:
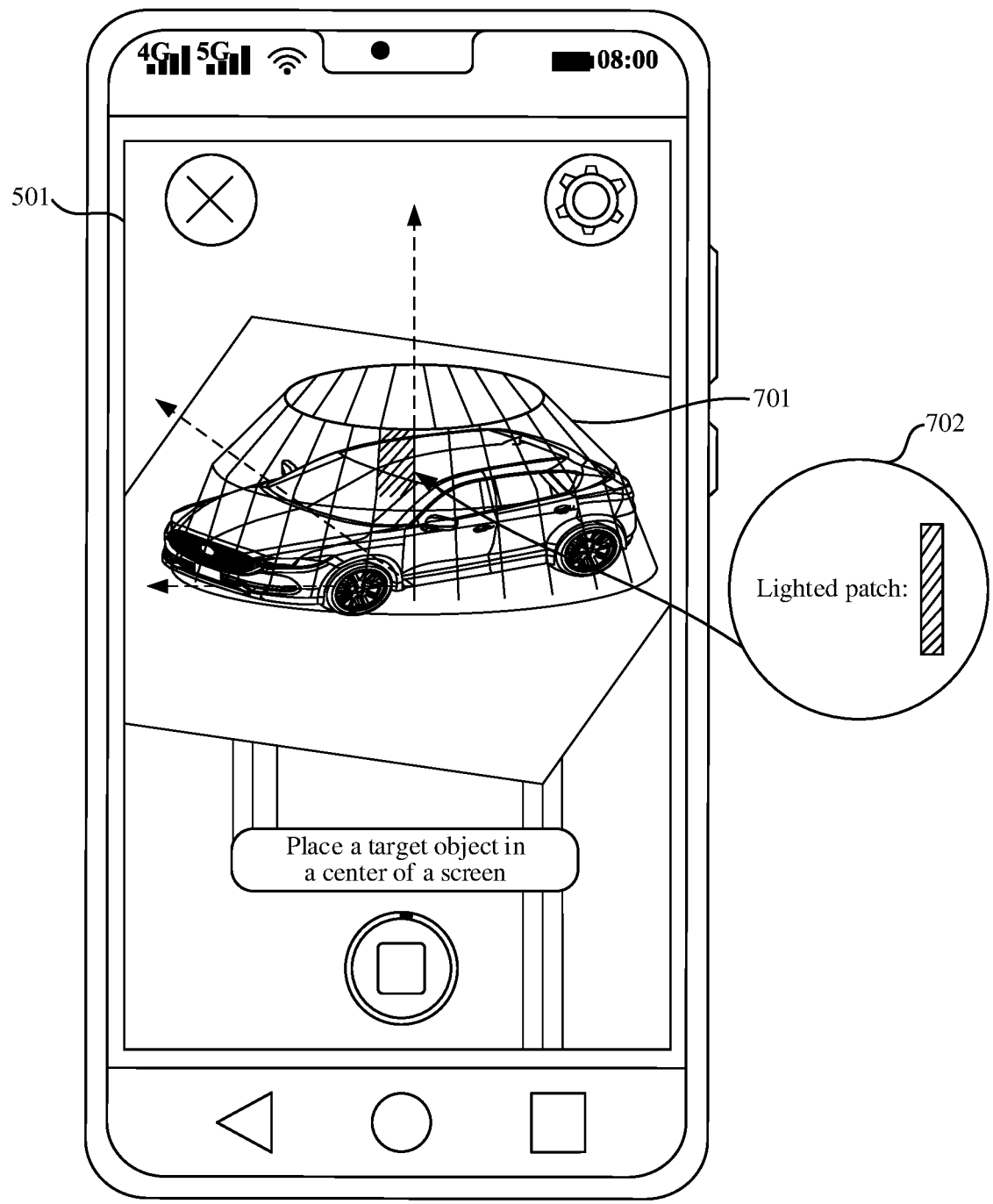
FIG. 7A is still another schematic diagram of a 3D modeling data collection interface according to an embodiment of this application.

FIG. 7A is still another schematic diagram of the 3D modeling data collection interface according to an embodiment of this application. As shown in FIG. 7A, in a possible design, when the mobile phone starts to collect, in response to an operation of tapping or touching the scan button 502 by the user, data required for performing 3D modeling on the target object (for example, the toy car), a patch model 701 (or referred to as a bounding body or a virtual bounding body) may be further displayed around the target object in the picture on the 3D modeling data collection interface 501. The patch model 701 may use a center of the target object as a central axis, and be disposed around the target object.

The patch model 701 may include an upper layer and a lower layer, and each layer may include a plurality of patches. The upper layer may be referred to as a first layer, and the lower layer may be referred to as a second layer. Each patch at each layer may correspond to an angle range within a 360-degree range around the target object. For example, assuming that there are 20 patches at each layer, each patch at each layer corresponds to an angle range of 18 degrees.

When the user holds the mobile phone to shoot the target object, the user needs to shoot two circles around the target object. A first circle is to shoot around the target object with the camera of the mobile phone looking down at the target object (for example, looking down at an angle of 30 degrees, which is not limited), and a second circle is to shoot around the target object with the camera of the mobile phone facing the target object squarely. When the user makes the camera of the mobile phone look down at the target object and performs the first round of shooting around the target object, the mobile phone may sequentially light the first layer of patches as moving around the target object. When the user makes the camera of the mobile phone face the target object squarely and performs the second round of shooting around the target object, the mobile phone may sequentially light the second layer of patches as moving around the target object.

For example, it is assumed that the user makes the camera of the mobile phone look down at the target object and performs the first round of shooting around the target object in a clockwise or counterclockwise direction. For example, an angle of initial shooting is 0 degrees, and there are 20 patches at each layer. When the mobile phone takes a picture of the target object in an angle range of 0 degrees to 18 degrees, the mobile phone may light a first patch in the first layer. When the mobile phone takes a picture of the target object in an angle range of 18 degrees to 36 degrees, the mobile phone may light a second patch in the first layer. By analogy, when the mobile phone takes a picture of the target object in an angle range from 342 degrees to 360 degrees, the mobile phone may light a twentieth patch in the first layer. In other words, after the user makes the camera of the mobile phone look down at the target object, and completes the first round of shooting around the target object in a clockwise direction or counterclockwise direction, all the 20 patches in the first layer may be illuminated. Similarly, after the user makes the camera of the mobile phone face the target object squarely, and completes the second round of shooting around the target object in a clockwise or counterclockwise direction, all the 20 patched in the second layer may be lit.

In this embodiment of this application, a picture corresponding to a first patch may be referred to as a first picture, and a picture corresponding to a second patch may be referred to as a second picture. A pose of the mobile phone obtained when the first picture is shot may be referred to as a first pose, and a pose of the mobile phone when the second image is shot may be referred to as a second pose.

For example, still refer to FIG. 7A. When the user makes the camera of the mobile phone look down at the target object, and performs the first round of shooting around the target object in the counterclockwise direction, an effect that the mobile phone may light the first patch in the first layer may be shown in 702 in FIG. 7A. Compared with another unlighted patch, a lighted patch may present a pattern or color different from that of the another unlighted patch (that is, a display effect is changed).

Figure 7B:
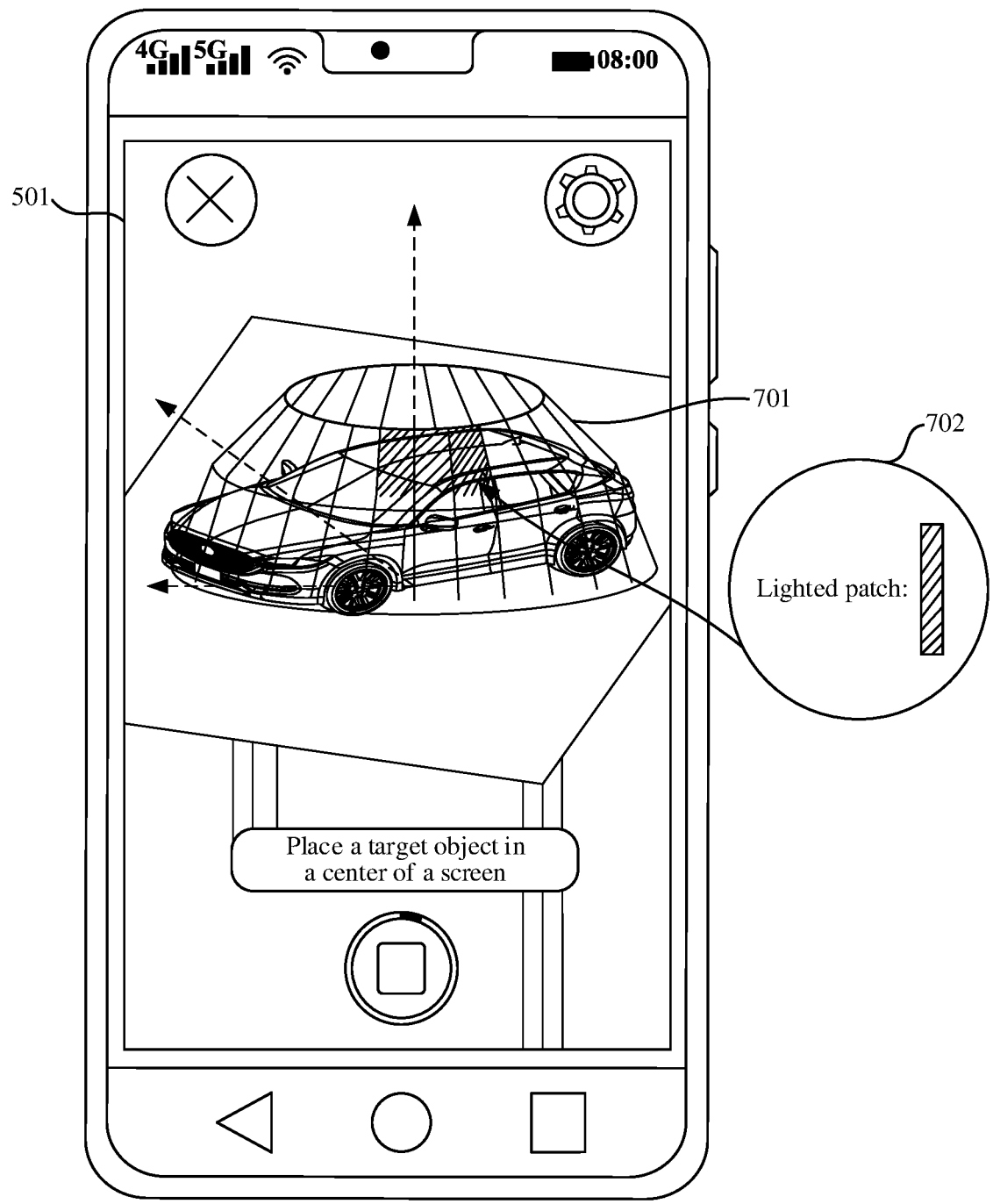
FIG. 7B is still another schematic diagram of a 3D modeling data collection interface according to an embodiment of this application.

FIG. 7B is still another schematic diagram of the 3D modeling data collection interface according to an embodiment of this application. As shown in FIG. 7B, based on the foregoing shown in FIG. 7A, in a process in which the user makes the camera of the mobile phone look down at the target object, and performs the first round of shooting around the target object in the counterclockwise direction, when the user holds the mobile phone to rotate counterclockwise around the target object by a specific angle (moves for a specific distance), the mobile phone may continue to light a second patch, a third patch, and the like in the first layer.

Figure 7C:
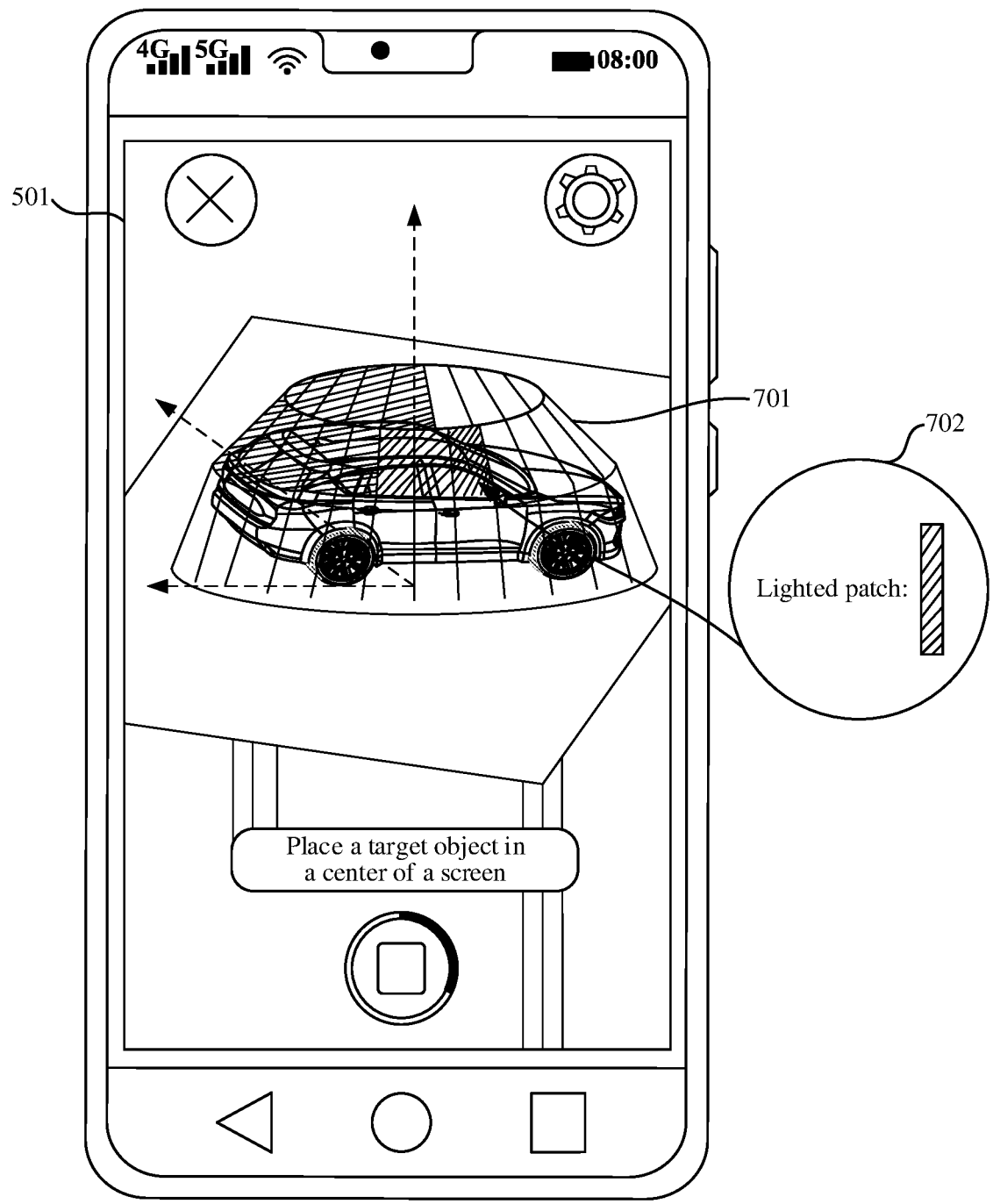
FIG. 7C is still another schematic diagram of a 3D modeling data collection interface according to an embodiment of this application.

FIG. 7C is still another schematic diagram of the 3D modeling data collection interface according to an embodiment of this application. As shown in FIG. 7C, based on the foregoing shown in FIG. 7B, in a process in which the user makes the camera of the mobile phone look down at the target object, and performs the first round of shooting around the target object in the counterclockwise direction, when the user holds the mobile phone to move counterclockwise around the target object to the other side of the target object, a quantity of patches that can be lit by the mobile phone in the first layer may reach half or more than half.

Figure 7D:
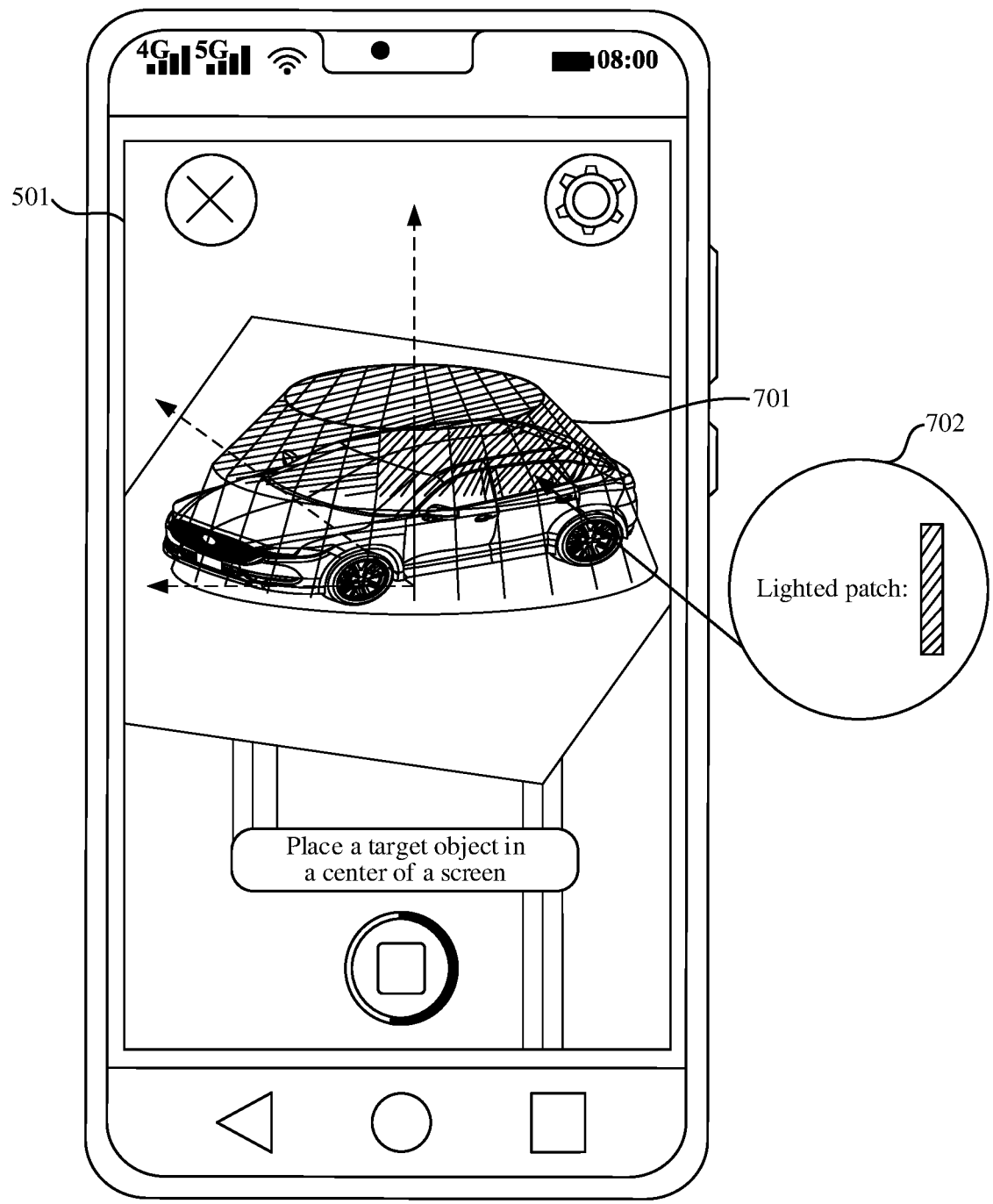
FIG. 7D is still another schematic diagram of a 3D modeling data collection interface according to an embodiment of this application.

FIG. 7D is still another schematic diagram of the 3D modeling data collection interface according to an embodiment of this application. As shown in FIG. 7D, based on the foregoing shown FIG. 7C, in a process in which the user makes the camera of the mobile phone look down at the target object, and performs the first round of shooting around the target object in the counterclockwise direction, when the user holds the mobile phone to move counterclockwise around the target object to an initial shooting location in FIG. 7A (or when the user holds the mobile phone to rotate counterclockwise around the target object for one circle), the mobile phone may light all patches in the first layer.

After the mobile phone lights up all the patches in the first layer, the user may adjust a shooting location of the mobile phone relative to the target object, and reduce the mobile phone by a distance, so that the camera of the mobile phone faces the target object squarely, and performs the second round of shooting around the target object in the counterclockwise direction.

Figure 7E:
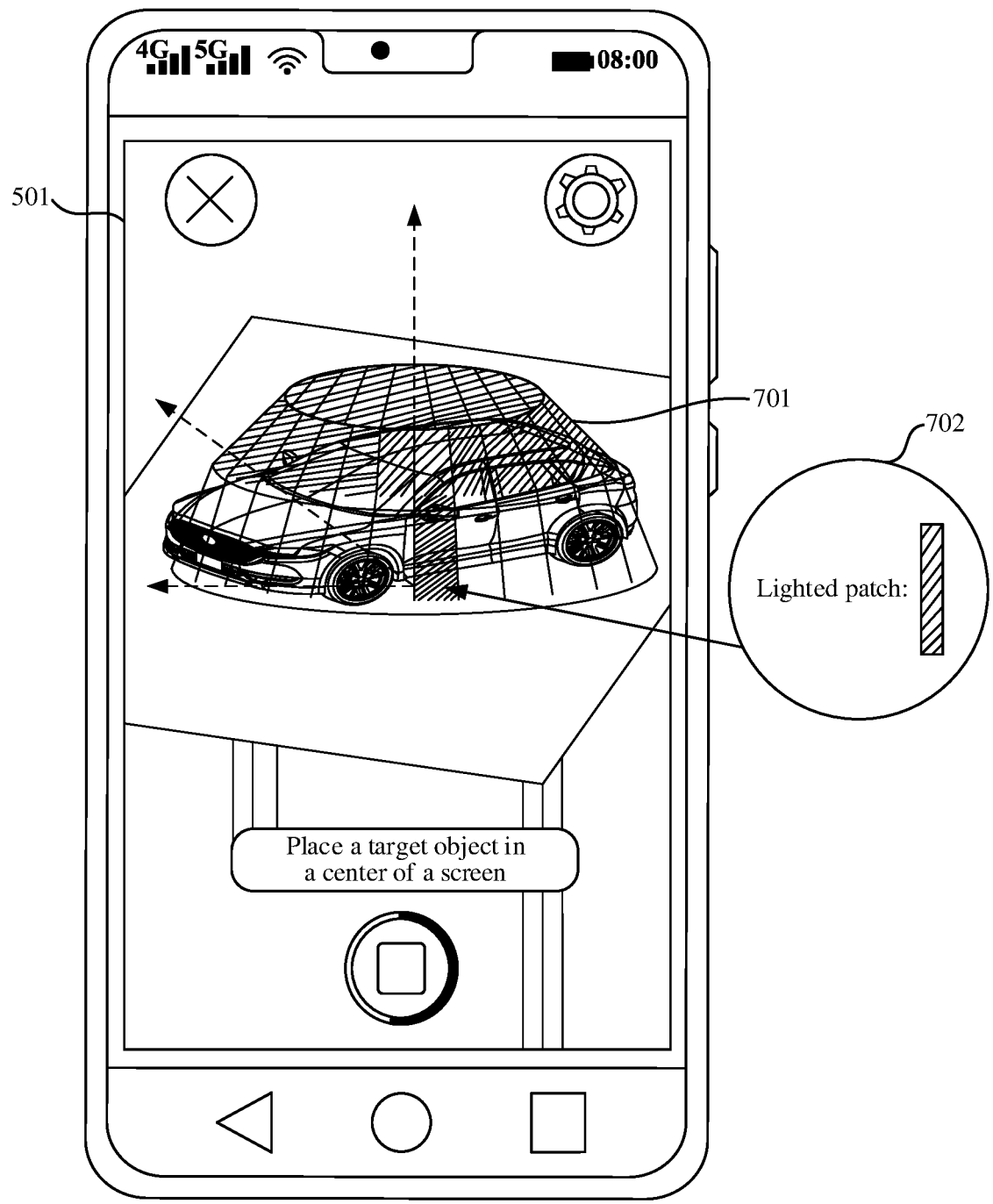
FIG. 7E is still another schematic diagram of a 3D modeling data collection interface according to an embodiment of this application.

For example, FIG. 7E is still another schematic diagram of the 3D modeling data collection interface according to an embodiment of this application. As shown in FIG. 7E, when the user makes the camera of the mobile phone face the target object squarely, and performs the second round of shooting around the target object in the counterclockwise direction, the mobile phone may light a first patch at the second layer.

Figure 7F:
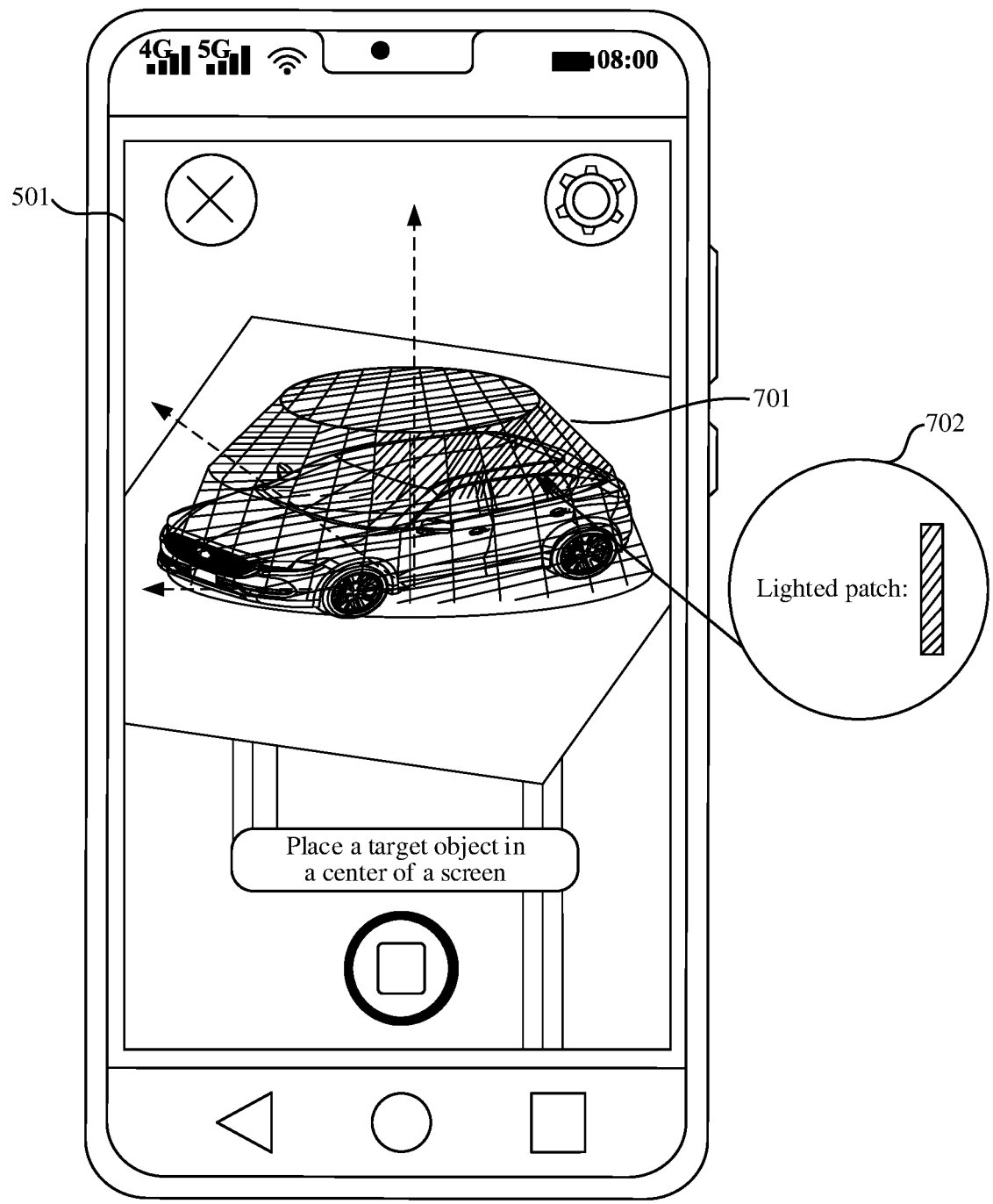
FIG. 7F is still another schematic diagram of a 3D modeling data collection interface according to an embodiment of this application.

Similarly, in a process in which the user makes the camera of the mobile phone face the target object squarely, and performs the second round of shooting around the target object in the counterclockwise direction, as the user holds the mobile phone to move counterclockwise around the target object, the mobile phone may gradually light up patches at the second layer. For example, FIG. 7F is still another schematic diagram of the 3D modeling data collection interface according to an embodiment of this application. As shown in FIG. 7F, when the user makes the camera of the mobile phone faces the target object squarely, and performs the second round of shooting around the target object in the counterclockwise direction, when the user holds the mobile phone to move counterclockwise around the target object to an initial shooting location in FIG. 7E (or when the user holds the mobile phone to rotate counterclockwise around the target object for a circle), the mobile phone may light all patches in the second layer. A process from lighting the first patch to lighting all the patches in the second layer is similar to a lighting process of the patches in the first layer. For details, refer to the foregoing processes shown in FIG. 7A to FIG. 7D. Details are not described again.

Optionally, in this embodiment of this application, a rule for lighting each patch by the mobile phone may be as follows:

(1) When the mobile phone shoots the target object at a location, blur detection and keyframe selection are performed on each frame of picture that is shot (which may be referred to as an input frame), to obtain a picture whose definition and picture feature meet a requirement.

For example, in this embodiment of this application, when shooting the target object, the mobile phone may collect a preview stream corresponding to the target object, and the preview stream includes a plurality of frames of pictures. For example, the mobile phone may shoot the target object at a frame rate such as 24 frames/second or 30 frames/second, which is not limited herein. The mobile phone may perform blur detection on each frame of picture that is shot, to obtain a picture whose definition is greater than a first threshold. The first threshold may be determined based on a requirement and a blur detection algorithm, and a size is not limited. If definition of a current frame of picture does not meet the requirement (for example, the definition is less than or equal to the first threshold), the mobile phone continues to obtain a next frame of picture. Then, the mobile phone may perform keyframe selection (or referred to as keyframe screening) on the picture whose definition is greater than the first threshold, to obtain the picture whose picture feature meets the requirement. That the picture feature meets the requirement may include: Features included in the picture are clear and rich, the feature included in the picture is easy to extract, and redundant information of the feature included in the picture is small. An algorithm and a specific requirement for selecting a keyframe are not limited herein.

For each shooting location (one shooting location may correspond to one patch), the mobile phone may obtain some keyframe pictures with relatively good quality by performing blur detection and keyframe selection on pictures shot at the shooting location. There may be one or more keyframe pictures corresponding to each patch.

(2) The mobile phone calculates camera pose information corresponding to the picture obtained in (1) (that is, camera pose information of the mobile phone).

For example, when the mobile phone supports a capability such as an AR engine (engine) capability, an AR core (core) capability, or an AR KIT capability, the mobile phone may directly obtain camera pose information corresponding to a picture by invoking the foregoing capability.

For example, the camera pose information may include qw, qx, qy, qz, tx, ty and tz. Herein, qw, qx, qy, and qz represent a rotation matrix formed by using a unit quaternion, and tx, ty, and tz may form a translation matrix. The rotation matrix and the translation matrix can represent a relative location relationship and an angle between the camera (a mobile phone camera) and the target object. The mobile phone may convert coordinates of the target object from a world coordinate system to a camera coordinate system by using the rotation matrix and the translation matrix, to obtain coordinates of the target object in the camera coordinate system. The world coordinate system may be a coordinate system using a center of the target object as an origin, and the camera coordinate system may be a coordinate system using a camera center as an origin.

(3) The mobile phone determines, based on the camera pose information corresponding to the picture obtained in (2), a relationship between the picture obtained in (1) and each patch in the patch model, to obtain a patch corresponding to the picture.

For example, as shown in (2), the mobile phone may convert the coordinates of the target object from the world coordinate system to the camera coordinate system based on the camera pose information (the rotation matrix and the translation matrix) corresponding to the picture, to obtain the coordinates of the target object in the camera coordinate system. Then, the mobile phone may determine a connection line between camera coordinates and the coordinates of the target object based on the coordinates of the target object in the camera coordinate system and the camera coordinates. A patch that intersects the connection line between the camera coordinates and the coordinates of the target object and that is in the patch model is the patch corresponding to the frame of picture. The camera coordinates are known parameters for the mobile phone.

(4) The picture is stored into a frame sequence file, and the patch corresponding to the picture is lit. The frame sequence file includes pictures corresponding to lighted patches, and the pictures may be used as the data required for performing 3D modeling on the target object.

A format of the picture included in the frame sequence file may be a JPG format. For example, pictures stored in the frame sequence file may be sequentially numbered as 001.jpg, 002.jpg, 003.jpg, . . . , and the like.

It may be understood that, after some patch is lit, the user may continue to move a location of the mobile phone to perform shooting at a next angle, and the mobile phone may continue to light a next patch according to the foregoing rule.

All frames of pictures included in the foregoing frame sequence file may be referred to as keyframes (keyframes), and the keyframes may be used as data that is collected by the mobile phone in the first part and that is required for performing 3D modeling on the target object. The frame sequence file may also be referred to as a keyframe sequence file.

Optionally, in this embodiment of this application, the user may hold the mobile phone to shoot the target object within a range within 1.5 meters from the target object. When the shooting distance is excessively short (for example, when the 3D modeling data collection interface cannot present a full view of the target object), the mobile phone may enable a wide-angle camera to perform shooting.

In the first part, in a process in which the user holds the mobile phone to perform encircling shooting around the target object, the mobile phone sequentially lights up patches in the patch model as the mobile phone moves around the target object, so that the user can be guided to collect the data required for performing 3D modeling on the target object. A manner of performing dynamic UI guidance through a 3D guidance interface (that is, the 3D modeling data collection interface for displaying the patch model) enhances user interaction, so that the user can intuitively perceive a data collection process.

It should be noted that descriptions of the patch model (or referred to as a bounding body) in the first part are only an example for description. In some other embodiments, a quantity of layers of a patch model may alternatively include more or fewer layers, and a quantity of patches in each layer may be greater than 20 or less than 20. The quantity of layers of the patch model and the quantity of patches in each layer are not limited in this application.

Figure 8:
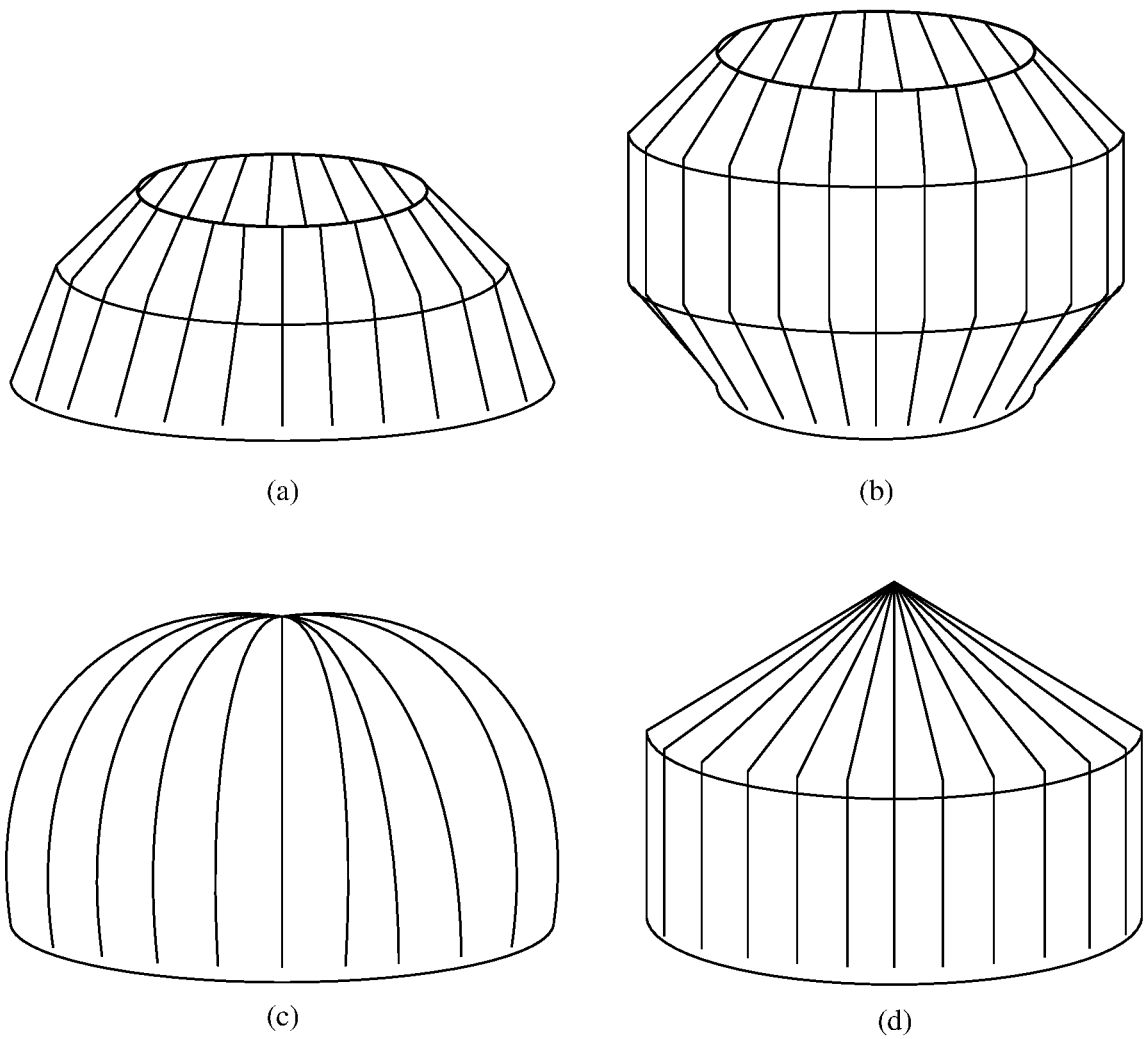
FIG. 8 is a schematic diagram of a structure of a patch model according to an embodiment of this application.

For example, FIG. 8 is a schematic diagram of a structure of a patch model according to an embodiment of this application. Refer to FIG. 8. In an implementation, the structure of the patch model may be shown in (a) in FIG. 8, and includes an upper layer and a lower layer, and each layer may include a plurality of patches (that is, the structure in the foregoing embodiment). In another implementation, the structure of the patch model may be shown in (b) in FIG. 8, and includes three layers: an upper layer, a middle layer, and a lower layer. Each layer may include a plurality of patches. In still another implementation, the structure of the patch model may be shown in (c) in FIG. 8, and is a one-layer structure including a plurality of patches. In still another implementation, the structure of the patch model may further be shown in (d) in FIG. 8, and includes an upper layer and a lower layer, where each layer may include a plurality of patches.

The structure of the patch model shown in FIG. 8 is described as an example. The structure of the patch model and a tilt angle (a tilt angle relative to a central axis) of each layer in the patch model are not limited in this application.

It should be understood that the patch model in this embodiment of this application is a virtual model, and the patch model may be preset in the mobile phone, for example, may be configured in a file directory of the first application in a form of a configuration file.

In some embodiments, a plurality of patch models may be preset in the mobile phone. When collecting the data required for performing 3D modeling on the target object, the mobile phone may recommend, based on a shape of the target object, a target patch model that matches the target object, or select a target patch model from a plurality of patch models based on a selection operation of a user, and use the target patch model to implement the guide function in the foregoing embodiment. The target patch model may also be referred to as a first virtual bounding body.

Figure 9:
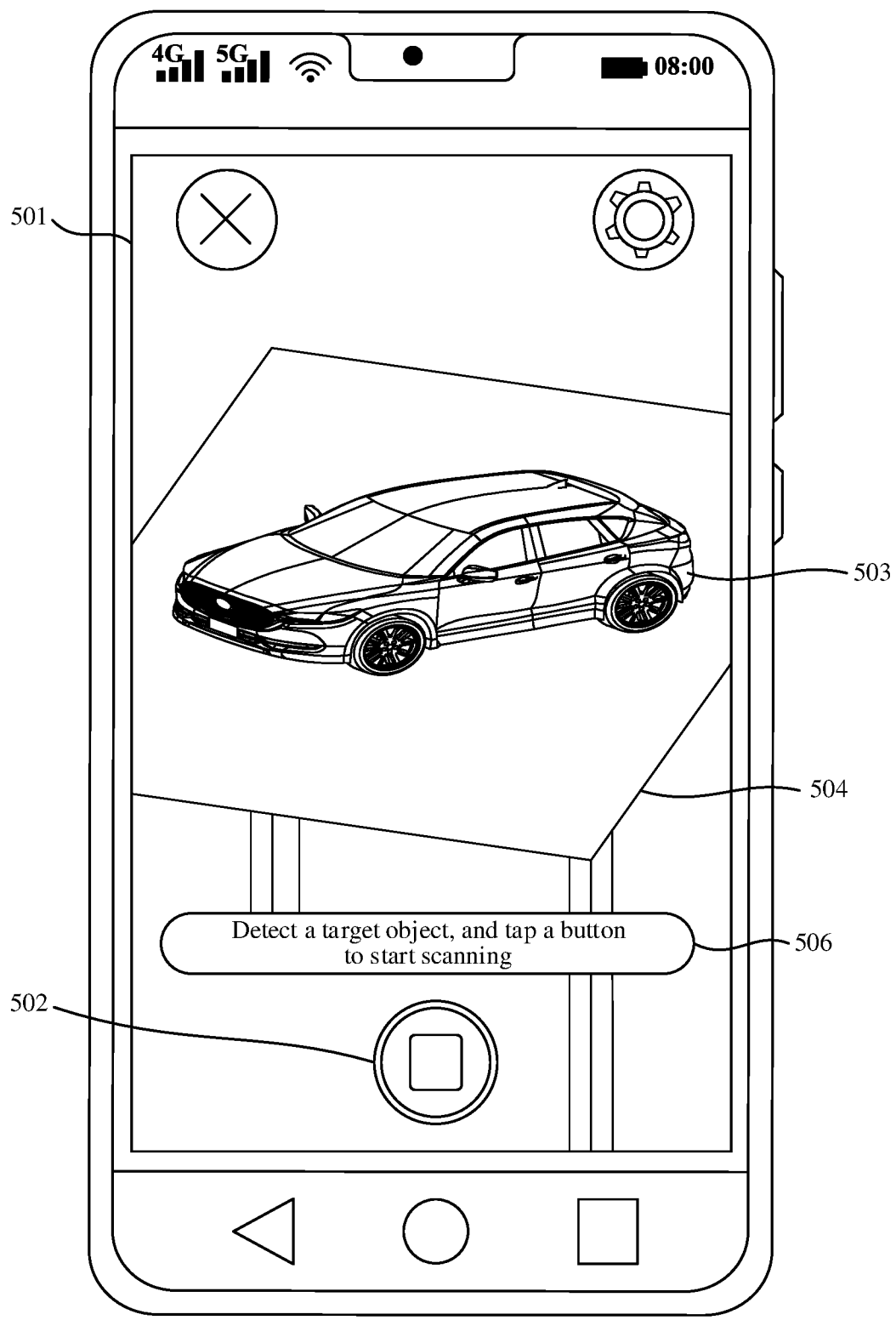
FIG. 9 is still another schematic diagram of a 3D modeling data collection interface according to an embodiment of this application.

Optionally, FIG. 9 is still another schematic diagram of the 3D modeling data collection interface according to an embodiment of this application. As shown in FIG. 9, after a mobile phone switches a display interface from a main interface 401 of a first application to a 3D modeling data collection interface 501, when it is detected that a target object (target object) exists in a picture, prompt information "Detect a target object, and tap a button to start scanning" 506 may be further displayed in the modeling data collection interface 501. The button is also a scan button 502, and the prompt information may be used to remind a user to tap the scan button 502, so that the mobile phone starts to collect data required for performing 3D modeling on the target object.

Optionally, in this embodiment of this application, the mobile phone may enable a 3D modeling function of the first application in response to an operation of tapping or touching "Start modeling" 402 by the user, and after switching the display interface from the main interface 401 of the first application to the 3D modeling data collection interface, may further first display, on the 3D modeling data collection interface, related prompt information used to remind the user to adjust a shooting environment in which the target object is located, a manner of shooting the target object, an object screen-to-body ratio, and the like.

Figure 10:
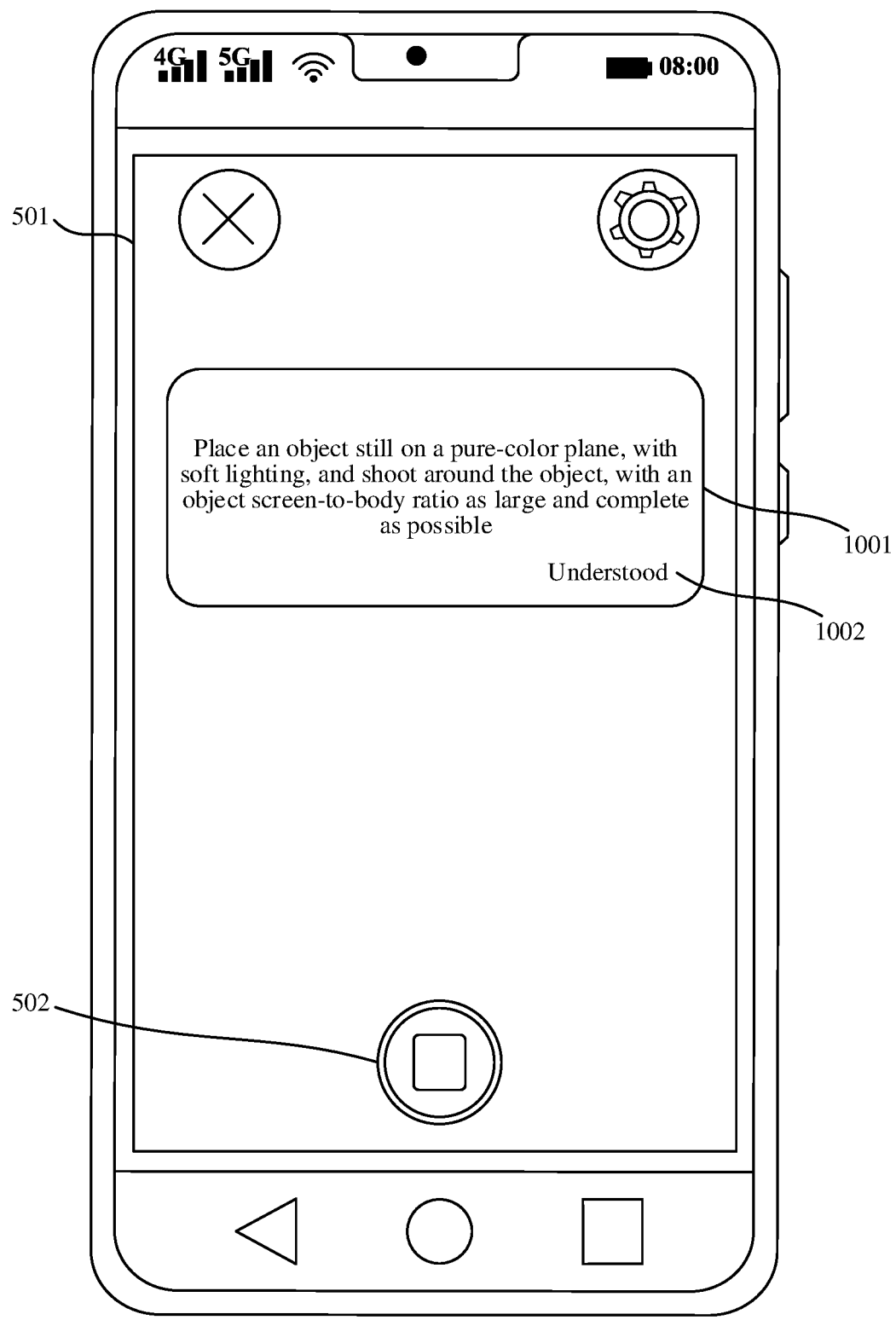
FIG. 10 is still another schematic diagram of a 3D modeling data collection interface according to an embodiment of this application.

For example, FIG. 10 is still another schematic diagram of the 3D modeling data collection interface according to an embodiment of this application. As shown in FIG. 10, the mobile phone may enable a 3D modeling function of the first application in response to an operation of tapping or touching "Start modeling" 402 by the user, and after switching the display interface from the main interface 401 of the first application to the 3D modeling data collection interface, may further first display prompt information 1001 on the 3D modeling data collection interface. Content of the prompt information 1001 may be "Place an object still on a pure-color plane, with soft lighting, and shoot around the object, with an object screen-to-body ratio as large and complete as possible". It can be used to remind the user to adjust a shooting environment in which the target object is located to be that the object is placed still on a pure-color plane with soft lighting; a manner of shooting the target object is shooting around the object; and an object screen-to-body ratio is as large and complete as possible. Still refer to FIG. 10. The mobile phone may further first display a function control 1002 on the 3D modeling data collection interface. For example, the function control may be "Understood", "Confirm", or the like. After the user taps the function control 1002, the mobile phone no longer displays the prompt information 1001 and the function control 1002, and presents the 3D modeling data collection interface shown in FIG. 5.

In this embodiment, after the user adjusts, based on prompt content of the prompt information 1001, the shooting environment in which the target object is located, the object screen-to-body ratio, and the like, a subsequent data collection process may be faster, and quality of collected data may be better. The prompt information 1001 may also be referred to as second prompt information.

In some embodiments, after switching the display interface from the main interface 401 of the first application to the 3D modeling data collection interface, the mobile phone may display the prompt information 1001 on the 3D modeling data collection interface for preset duration. After the preset duration expires, the mobile phone may automatically stop displaying the prompt information 1001, and present the 3D modeling data collection interface shown in FIG. 5. The preset duration may be 20 seconds, 30 seconds, and the like, which is not limited here.

In some embodiments, after collecting, in the manner described in the first part, the data required for performing 3D modeling on the target object (each frame of picture included in the frame sequence file), the mobile phone may automatically perform the second part.

In some other embodiments, after the mobile phone collects, in the manner described in the first part, the data required for performing 3D modeling on the target object (each frame of picture included in the frame sequence file), the mobile phone may display, on the 3D modeling data collection interface, a function control used to upload to the cloud for performing 3D modeling. The user can tap the function control used to upload to the cloud for performing 3D modeling. The mobile phone may perform the second part in response to an operation of tapping the function control used to upload to the cloud for performing 3D modeling by the user.

Figure 11:
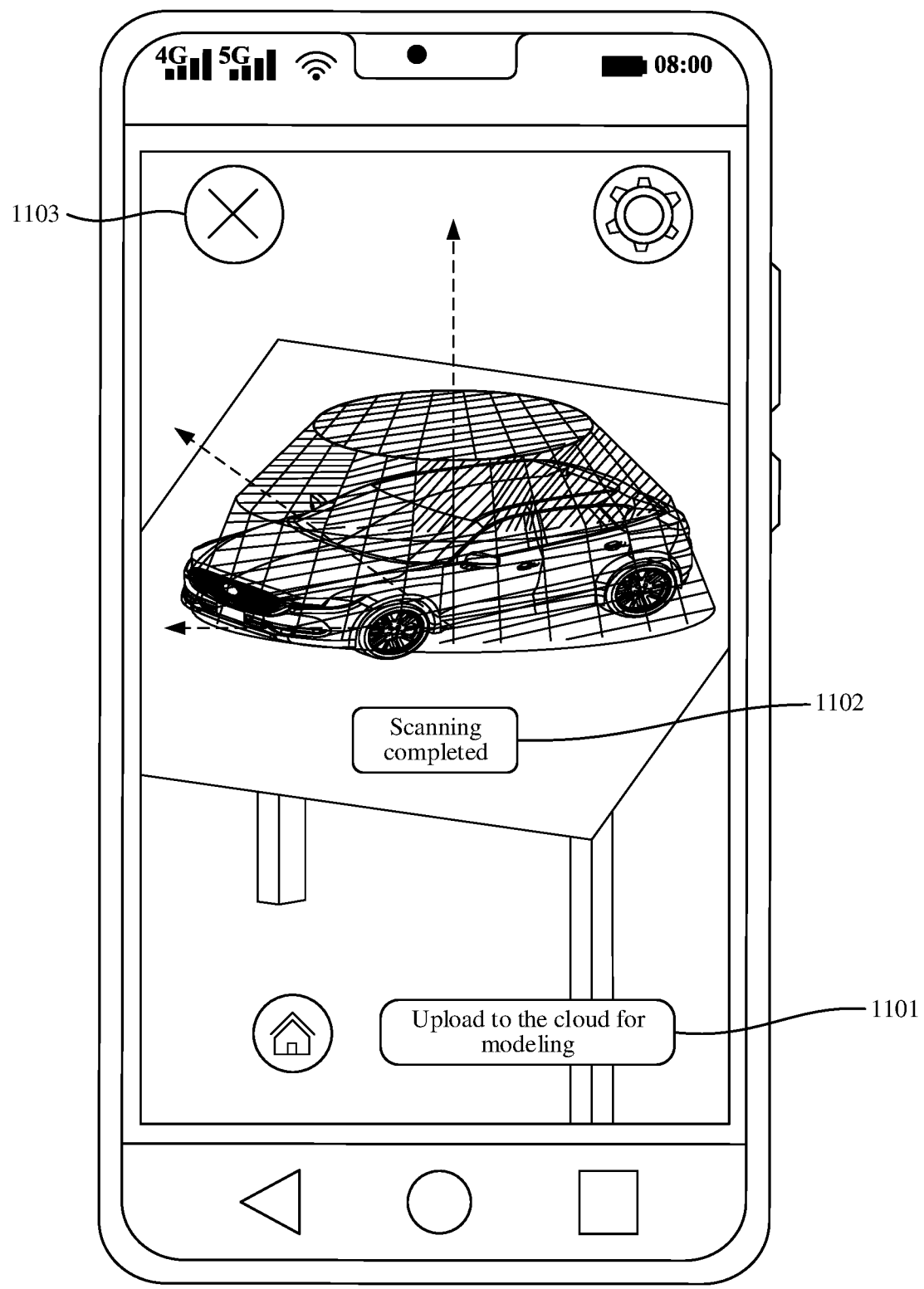
FIG. 11 is still another schematic diagram of a 3D modeling data collection interface according to an embodiment of this application.

For example, FIG. 11 is still another schematic diagram of the 3D modeling data collection interface according to an embodiment of this application. As shown in FIG. 11, after the mobile phone collects, in the manner described in the first part, the data required for performing 3D modeling on the target object (each frame of picture included in the frame sequence file), a function control may be displayed on the 3D modeling data collection interface: "Upload to the cloud for modeling" 1101, where "Upload to the cloud for modeling" 1101 is a function control used to upload to the cloud for performing 3D modeling. The user may tap "Upload to the cloud for modeling" 1101, and the mobile phone may perform the second part in response to an operation of tapping "Upload to the cloud for modeling" 1101 by the user. In this embodiment of this application, an operation of tapping "Upload to the cloud for modeling" 1101 by the user may be referred to as an operation of generating a three-dimensional model.

Optionally, still refer to FIG. 11. After the mobile phone collects, in the manner described in the first part, the data required for performing 3D modeling on the target object (each frame of picture included in the frame sequence file), the mobile phone may further display, on the 3D modeling data collection interface, prompt information used to prompt the user that the mobile phone collects the data required for performing 3D modeling on the target object, for example, "Scanning completed" 1102.

Optionally, refer to FIG. 5 to FIG. 7E and FIG. 9 to FIG. 11. The mobile phone may further display an exit button 1103 (marked only in FIG. 11) on the 3D modeling data collection interface. In a process of performing the first part, the mobile phone may tap the exit button 1103 at any time, and the mobile phone may exit a performing process of the first part in response to an operation of tapping the exit button 1103 by the user. After exiting the performing process of the first part, the mobile phone may switch the display interface from the 3D modeling data collection interface to the main interface of the first application shown in FIG. 4.

Second Part

It can be learned from the first part that, the data that is collected by the mobile phone in the first part and that is required for performing 3D modeling on the target object is each frame of picture (namely, a keyframe) included in the frame sequence file mentioned in the first part. In the second part, that the mobile phone preprocesses the collected data that is required for performing 3D modeling on the target object means that the mobile phone preprocesses the keyframe included in the frame sequence file collected in the first part. Details are as follows:

(1) The mobile phone calculates matching information of each frame of keyframe, and stores the matching information of each frame of keyframe in a first file. For example, the first file may be a file in a JS object notation (javascript object notation, JSON) format.

For each frame of keyframe, the matching information of the frame of keyframe may include identification information of another keyframe associated with the frame of keyframe. For example, matching information of some frame of keyframe may include identification information of keyframes corresponding to four directions of the frame of keyframe (for example, nearest keyframes), and the keyframes corresponding to the four directions, namely, the top, bottom, left, and right directions, of the frame of keyframe are other keyframes associated with the frame of keyframe. The identification information of the keyframe may be an image number of the keyframe. The matching information of the frame of keyframe may be used to indicate which pictures in the frame sequence file are the other keyframes associated with the frame of keyframe.

For example, matching information of each frame of keyframe is obtained based on an association relationship between each frame of keyframe and a patch corresponding to each frame of keyframe, and an association relationship between the plurality of patches. That is, for each frame of keyframe, the mobile phone may determine matching information of the keyframe based on an association relationship between a patch corresponding to the keyframe and another patch. The association relationship between the patch corresponding to the keyframe and the another patch may include: patches respectively corresponding to four directions, namely, the top, bottom, left, and right directions, of the patch corresponding to the keyframe in the patch model.

For example, the patch model shown in FIG. 7A is used as an example. Assuming that a patch corresponding to a keyframe is a patch 1 in the first layer, an association relationship between the patch 1 and another patch may include: A patch below the patch 1 is a patch 21, a patch on a left side of the patch 1 is a patch 20, and a patch on a right side of the patch 1 is a patch 2. The mobile phone may determine, based on the association relationship between the foregoing patch 1 and the other patches, that other keyframes associated with the keyframe of the frame include a keyframe corresponding to the patch 21, a keyframe corresponding to the patch 20, and a keyframe corresponding to the patch 2. Therefore, the mobile phone may obtain that the matching information of the frame of keyframe includes identification information of the keyframe corresponding to the patch 21, identification information of the keyframe corresponding to the patch 20, and identification information of the keyframe corresponding to the patch 2.

It may be understood that, for the mobile phone, an association relationship between different patches in the patch model is a known quantity.

Optionally, the first file further includes information such as a camera intrinsic parameter (intrinsics), gravity direction information (gravity), an image (image) name, an image number (index), camera pose information (slampose), and a timestamp (timestamp) corresponding to each keyframe.

For example, the first file includes three parts: "intrinsics", "keyframes", and "matching_list". Herein, "intrinsics" is a camera intrinsic parameter; "keyframes" is the gravity direction information, image name, image number, camera pose information, and timestamp (timestamp) corresponding to each keyframe; "matching_list" is the matching information of each frame of keyframe.

For example, content of the first file may be shown as follows:

```
{
  "intrinsics": {
    "cx": 541.69873046875,
    "cy": 717.9682006835938,
    "fx": 1107.391357421875,
    "fy": 1108.0687255859375,
    "height": 1440,
    "k1": 0.0,
    "k2": 0.0,
    "k3": 0.0,
    "p1": 0.0,
    "p2": 0.0,
    "width": 1080,
  },
  "keyframes": [
    {
      "gravity": {
        "x": 0.06092686897514033,
        "y": 0.14197545129484324,
        "z": 0.987993364282631,
      },
      "image": "18.jpg",
      "index": 18,
      "slampose": {
        "qw": 0.7613612238902996,
        "qx": -0.03274244637058227,
        "qy": 0.647125498445248,
        "qz": 0.02203628272740797,
        "tx": 0.2898597785823239,
        "ty": 0.02329161955223177,
        "tz": 0.04800368649545035,
      },
      "timestamp": "132384921021098970"
    },
    ...
  "matching_list": [
    {
      "src_id": 18,
      "tgt_id": 26
    },
    {
      "src_id": 18,
      "tgt_id": 45
    },
    {
      "src_id": 18,
      "tgt_id": 59
    },
    {
      "src_id": 18,
      "tgt_id": 78
    },
    {
      "src_id": 18,
      "tgt_id": 89
    },
    {
      "src_id": 18,
      "tgt_id": 100
    },
    {
      "src_id": 18,
      "tgt_id": 449
    },
    ...
```

In the content of the first file provided in the foregoing example, all of cx, cy, fx, fy, height, k1, k2, k3, p1, p2 and width are camera intrinsic parameters. Herein, cx and cy represent offsets of an optical axis to a projection plane coordinate center; fx and fy represent focal lengths in an x direction and a y direction during shooting of the camera respectively; k1, k2, and k3 represent radial distortion coefficients; p1 and p2 represent tangential distortion coefficients; height (height) and width (width) represent resolution during shooting of the camera, and x, y, and z indicate the gravity direction information. The gravity direction information may be obtained by the mobile phone based on a built-in gyroscope, and can indicate an offset angle of the mobile phone when the mobile phone takes a picture.

18.jpg indicates the image (image) name, and 18 is the image number (18.jpg is used as an example). That is, the foregoing example is a camera intrinsic parameter (intrinsics), gravity direction information (gravity), an image (image) name, an image number (index), camera pose information (slampose), a timestamp (timestamp), and matching information corresponding to 18.jpg.

Herein, qw, qx, qy, qz, tx, ty and tz are the camera pose information, qw, qx, qy, and qz represent a rotation matrix formed by using a unit quaternion, and tx, ty, and tz may form a translation matrix. The rotation matrix and the translation matrix can represent a relative location relationship and an angle between the camera (a mobile phone camera) and the target object. The mobile phone may convert coordinates of the target object from a world coordinate system to a camera coordinate system by using the rotation matrix and the translation matrix, to obtain coordinates of the target object in the camera coordinate system. The world coordinate system may be a coordinate system using a center of the target object as an origin, and the camera coordinate system may be a coordinate system using a camera center as an origin.

Herein, the timestamp indicates the timestamp, which indicates a time when the camera shoots the frame of keyframe.

Herein, src_id indicates an image number of each keyframe. For example, in the content of the first file provided in the foregoing example, the image number is 18, and the "matching_list" part is matching information of a keyframe whose image number is 18. Herein, tgt_id indicates image numbers of other keyframes associated with the keyframe whose image number is 18 (that is, identification information of other keyframes associated with the keyframe whose image number is 18). For example, in the content of the first file provided in the foregoing example, the image numbers of the other keyframes associated with the keyframe whose image number is 18 include: 26, 45, 59, 78, 89, 100, 449, and the like. That is, other keyframes associated with the keyframe whose image number is 18 include: a keyframe whose image number is 26, a keyframe whose image number is 45, a keyframe whose image number is 59, a keyframe whose image number is 78, a keyframe whose image number is 89, a keyframe whose image number is 100, a keyframe whose image number is 449, and the like.

It should be noted that, the foregoing only uses the keyframe whose image number is 18 as an example to provide partial content of the first file, and is not used to limit the content of the first file.

(2) The mobile phone packs the first file and all keyframes in the frame sequence file (namely, all frame pictures included in the foregoing frame sequence file).

A result (for example, referred to as a packaging file or a data packet) obtained after the first file and all keyframes in the frame sequence file are packaged is the preprocessed data obtained by the mobile phone in the second part by preprocessing data that is collected in the first part and that is required for performing 3D modeling on the target object.

That is, in this embodiment of this application, the data obtained after the mobile phone preprocesses the data that is collected in the first part and that is required for performing 3D modeling on the target object may include: each frame of keyframe picture stored by the mobile phone in the frame sequence file in a process of performing encircling shooting around the target object, and the first file including the matching information of each frame of keyframe.

After obtaining the foregoing preprocessed data, the mobile phone may send (that is, upload) the preprocessed data to the cloud, and the cloud may perform the third part, to perform 3D modeling based on the data uploaded by the mobile phone, to obtain the 3D model of the target object.

Third Part

A process in which the cloud performs 3D modeling based on the data uploaded by the mobile phone may be as follows:

(1) The cloud decompresses the data packet (the data packet includes the frame sequence file and the first file) received from the mobile phone, and extracts the frame sequence file and the first file.

(2) The cloud performs 3D modeling processing based on the keyframe picture included in the frame sequence file and the first file, to obtain the 3D model of the target object.

For example, steps of performing 3D modeling processing based on the keyframe picture included in the frame sequence file and the first file by the cloud may include at least: key target extraction, feature detection and matching, global optimization and fusion, sparse point cloud computing, dense point cloud computing, surface reconstruction, and texture generation.

The key target extraction means an operation of separating a target object of interest in a keyframe picture from a background, and identifying and translating a meaningful object entity from the picture to extract different image features.

Feature detection and matching means detecting a unique pixel in a keyframe picture as a feature point of the keyframe picture; describing feature points with prominent features in different keyframe pictures; and comparing similarity between two descriptions to determine whether the feature points in different keyframe pictures are the same feature.

In this embodiment of this application, when the cloud performs feature detection and matching, for each frame of keyframe, the cloud may determine, based on the matching information of the keyframe included in the first file (namely, the identification information of the other keyframes associated with the frame of keyframe), the other keyframes associated with the frame of keyframe and the frame keyframe, and perform feature detection and matching on the frame of keyframe and the other keyframes associated with the frame of keyframe.

For example, the content of the first file provided by using the keyframe whose image number is 18 is used as an example. The cloud may determine, based on the first file, the other keyframes associated with the keyframe whose image number is 18, including: a keyframe whose image number is 26, a keyframe whose image number is 45, a keyframe whose image number is 59, a keyframe whose image number is 78, a keyframe whose image number is 89, a keyframe whose image number is 100, a keyframe whose image number is 449, and the like. Then, the cloud may perform feature detection and matching on the keyframe whose image number is 18 and the keyframe whose image number is 26, the keyframe whose image number is 45, the keyframe whose image number is 59, the keyframe whose image number is 78, the keyframe whose image number is 89, the keyframe whose image number is 100, the keyframe whose image number is 449, and the like, it is unnecessary to perform feature detection and matching on the keyframe whose image number is 18 and all other keyframes in the frame sequence file.

It can be learned that, in this embodiment of this application, for each keyframe, the cloud may perform feature detection and matching on the keyframe and the other keyframes associated with the keyframe with reference to the matching information of the keyframe included in the first file, and does not need to perform feature detection and matching on the keyframe and all other keyframes in the frame sequence file. In this manner, computing load on the cloud can be effectively reduced, and 3D modeling efficiency can be improved.

Global optimization and fusion means that a matching result of feature detection and matching is optimized and fused by using a global optimization and fusion algorithm, and a result of global optimization and fusion may be used to generate a basic 3D model.

The sparse point cloud computing and the dense point cloud computing mean generating three-dimensional point cloud data corresponding to the target object based on the result of global optimization and fusion. Compared with images, point clouds have an irreplaceable advantage: depth. The three-dimensional point cloud data directly provides three-dimensional space data, but the image needs to be deduced through perspective geometry.

The surface reconstruction means using the three-dimensional point cloud data to accurately restore a three-dimensional surface shape of an object, and obtaining a basic 3D model of the target object.

The texture generation means generating a texture (also referred to as texture mapping) of a surface of the target object based on a keyframe picture or a feature of the keyframe picture. After the texture of the surface of the target object is obtained, the texture is mapped to the surface of the basic 3D model of the target object in a specific manner, so that the surface of the target object can be more realistically restored, and the target object looks more realistic.

In this embodiment of this application, the cloud may also quickly and accurately determine a mapping relationship between the texture and the surface of the basic 3D model of the target object based on the matching information of each frame of keyframe included in the first file, so that modeling efficiency and an effect can be further improved.

For example, after determining a mapping relationship between a texture of a first frame of keyframe and the surface of the basic 3D model of the target object, the cloud may quickly and accurately determine, with reference to matching information of the first frame of keyframe, a mapping relationship between a texture of another keyframe associated with the first keyframe and the surface of the basic 3D model of the target object. Similarly, for each subsequent frame of keyframe, the cloud may quickly and accurately determine, with reference to matching information of the keyframe, a mapping relationship between texture of another keyframe associated with the keyframe and the surface of the basic 3D model of the target object.

After obtaining the basic 3D model of the target object and the texture of the surface of the target object, the cloud may generate the 3D model of the target object based on the basic 3D model of the target object and the texture of the surface of the target object. The cloud may store the basic 3D model of the target object and the texture of the surface of the target object for the mobile phone to download.

It can be learned that, in the foregoing process in which the cloud performs 3D modeling based on the data uploaded by the mobile phone, the matching information of each frame of keyframe included in the first file can effectively improve a processing speed of 3D modeling, reduce computing load of the cloud, and improve efficiency of performing 3D modeling by the cloud.

For example, the basic 3D model of the target object may be stored in an OBJ format, and the texture of the surface of the target object may be stored in a JPG format (for example, texture mapping). For example, the basic 3D model of the target object may be an OBJ file, and the texture of the surface of the target object may be a JPG file.

Optionally, the cloud may store the basic 3D model of the target object and the texture of the surface of the target object for specific duration (for example, seven days). After the duration expires, the cloud may automatically delete the basic 3D model of the target object and the texture of the surface of the target object. Alternatively, the cloud may permanently retain the basic 3D model of the target object and the texture of the surface of the target object. This is not limited herein.

Through the first part to the third part, 3D modeling may be performed on the target object, to obtain the 3D model of the target object. It can be learned from the first part to the third part that, in the 3D modeling method provided in embodiments of this application, the mobile phone can implement 3D modeling by relying only on a common RGB camera (camera) to collect data required for 3D modeling, and a process of collecting the data required for 3D modeling does not need to depend on that the mobile phone has special hardware such as an LIDAR sensor or an RGB-D camera. A process of 3D modeling is completed on the cloud, and there is no need to rely on high-performance discrete graphics cards configured on the mobile phone. The 3D modeling method can significantly reduce a threshold of 3D modeling, and is more universally applicable to a terminal device. In addition, in a process in which the user collects the data required for 3D modeling by using the mobile phone, the mobile phone may enhance user interaction in a dynamic UI guidance manner, so that the user can intuitively perceive a data collection process.

In addition, in the 3D modeling method, when the mobile phone performs shooting on the target object at a location, blur detection is performed on each frame of picture that is shot, to obtain a picture that meets a definition requirement. This can implement keyframe screening, and obtain a keyframe that facilitates modeling. The mobile phone extracts the matching information of each frame of keyframe, and sends the first file including the matching information of each frame of keyframe and the frame sequence file formed by the keyframes to the cloud, so that the cloud performs modeling (without sending all taken pictures). This can greatly reduce complexity of 3D modeling on a cloud side, reduce consumption of hardware resources on the cloud in a 3D modeling process, effectively reduce computing load of modeling by the cloud, and improve a speed and an effect of 3D modeling.

The following describes, by using an example, a process in which the mobile phone downloads the 3D model from the cloud for the user to preview the 3D model.

For example, after completing 3D modeling on the target object and obtaining the 3D model of the target object, the cloud may send an indication message to the mobile phone, to indicate that the cloud completes 3D modeling.

In some embodiments, after receiving the indication message from the cloud, the mobile phone may automatically download the 3D model of the target object from the cloud, so that the user previews the 3D model.

Figure 12:
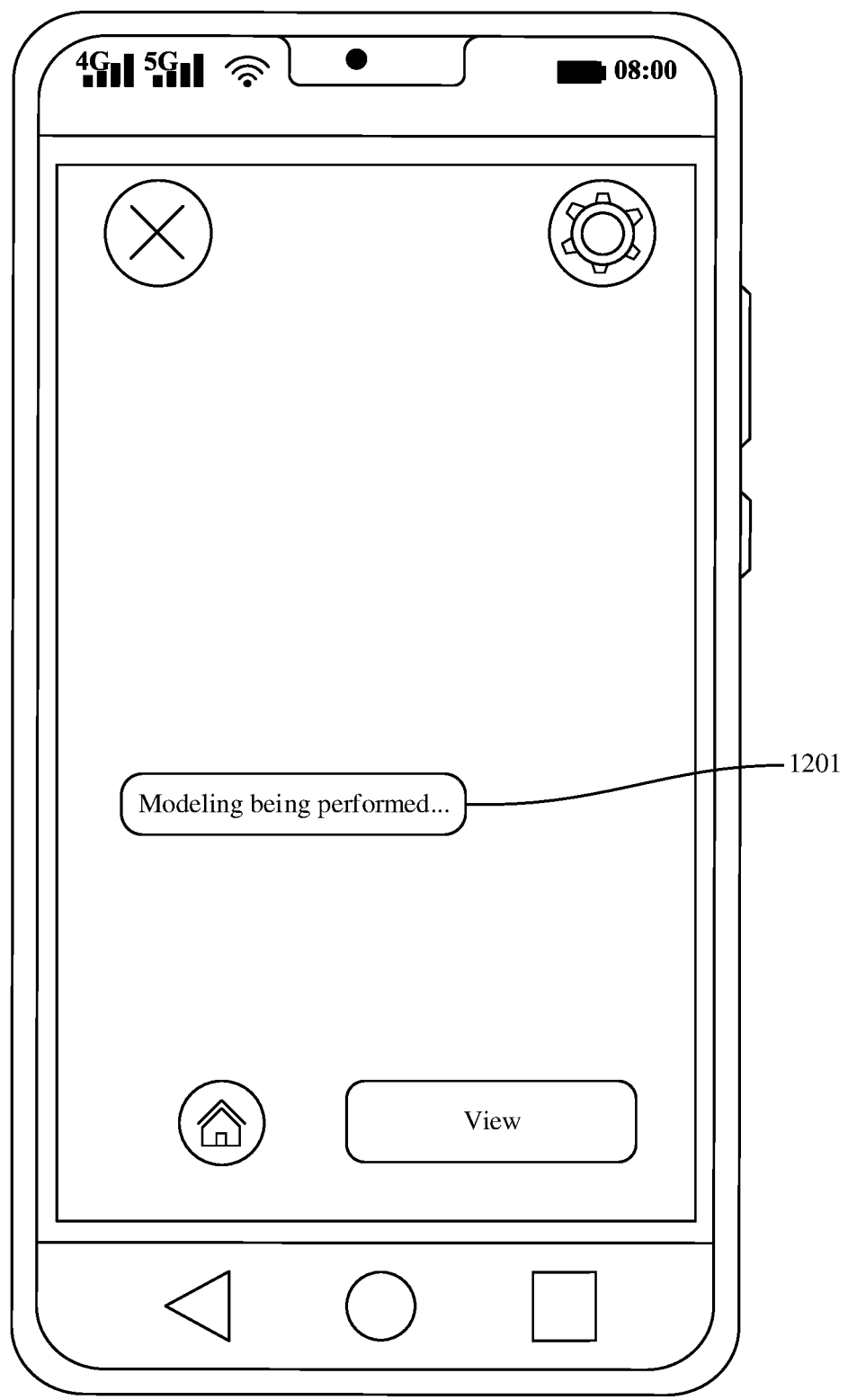
FIG. 12 is a schematic diagram of a 3D model preview interface according to an embodiment of this application.

For example, FIG. 12 is a schematic diagram of a 3D model preview interface according to an embodiment of this application. In the second part, after sending the preprocessed data to the cloud, the mobile phone may switch the display interface from the 3D modeling data collection interface shown in FIG. 11 to the 3D model preview interface shown in FIG. 12. As shown in FIG. 12, the mobile phone may display prompt information in the 3D model preview interface: "Modeling being performed" 1201, to prompt the user that 3D modeling is being performed on the target object. "Modeling being performed" 1201 may be referred to as third prompt information.

In some embodiments, the mobile phone may display the third prompt information after detecting an operation that the user taps the function control "Upload to the cloud for modeling" 1101.

After completing 3D modeling on the target object and obtaining the 3D model of the target object, the cloud may send an indication message to the mobile phone, to indicate that the cloud completes 3D modeling. After receiving the indication message, the mobile phone may automatically download the 3D model of the target object from the cloud. For example, the mobile phone may send a download request message to the cloud, and the cloud may send the 3D model of the target object (that is, the basic 3D model of the target object and the texture of the surface of the target object) to the mobile phone based on the download request message.

Figure 13:
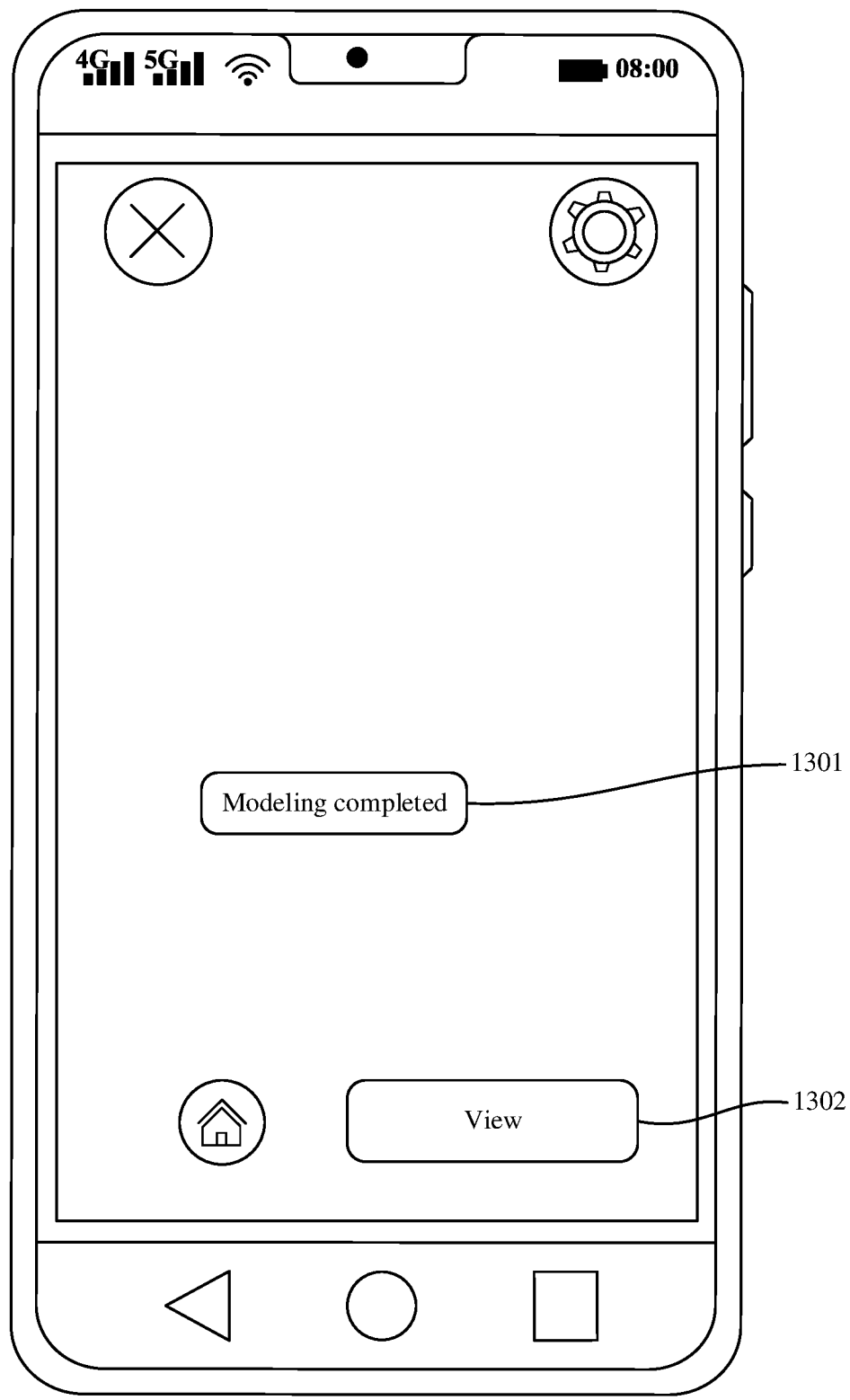
FIG. 13 is another schematic diagram of a 3D model preview interface according to an embodiment of this application.

FIG. 13 is another schematic diagram of a 3D model preview interface according to an embodiment of this application. As shown in FIG. 13, after receiving the indication message, the mobile phone may further change prompt information from "Modeling being performed" 1201 to "Modeling completed" 1301, to prompt the user that modeling of the 3D model of the target object is completed. The 3D model preview interface may further include a "View" button 1302. The user may tap the "View" button 1302. In response to an operation of tapping the "View" button 1302 by the user, the mobile phone may display, on the 3D model preview interface, the 3D model of the target object downloaded from the cloud. "Modeling completed" 1301 may be referred to as fourth prompt information.

Figure 14:
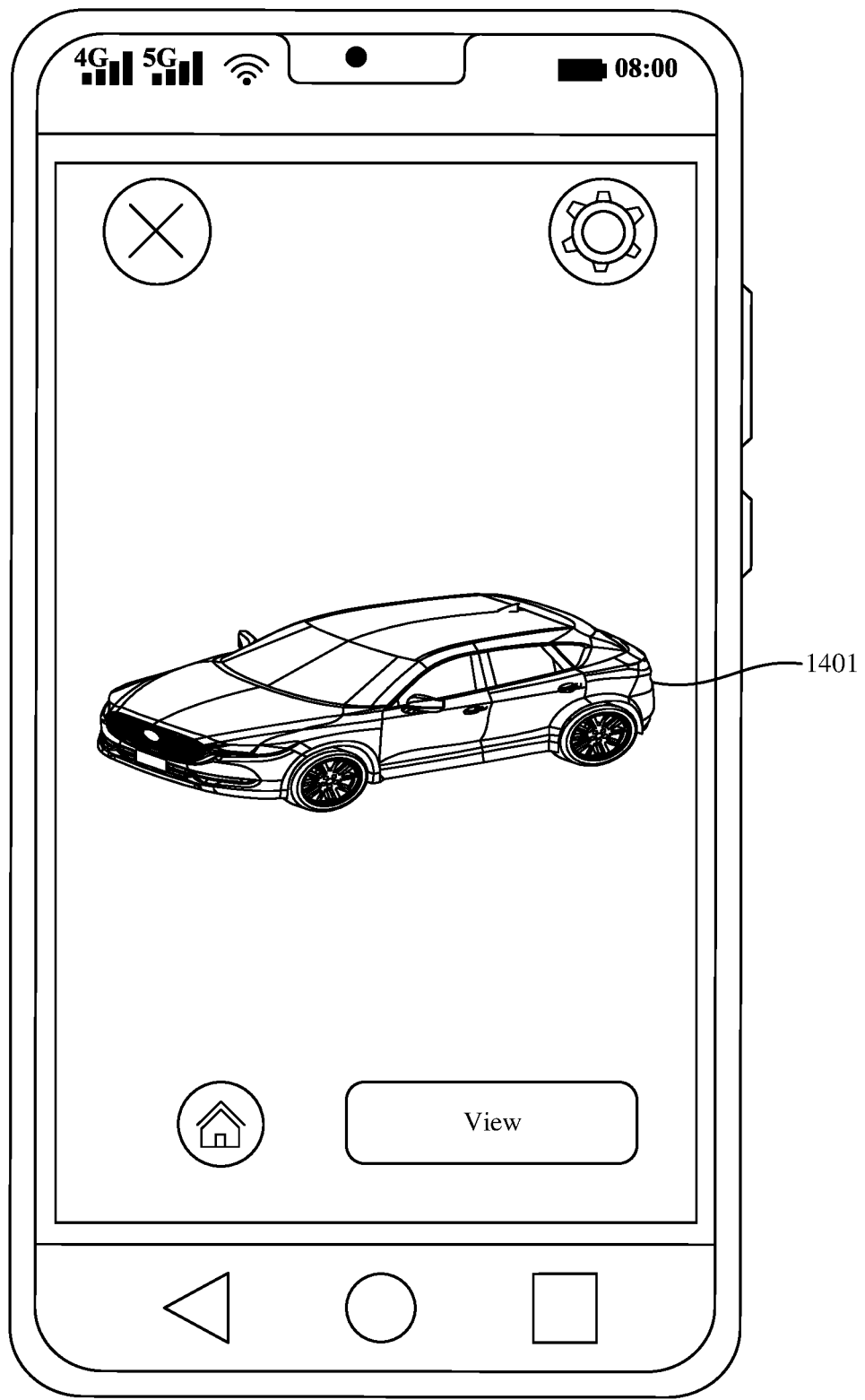
FIG. 14 is still another schematic diagram of a 3D model preview interface according to an embodiment of this application.

For example, the target object is the toy car in the foregoing embodiments. FIG. 14 is still another schematic diagram of a 3D model preview interface according to an embodiment of this application. As shown in FIG. 14, the mobile phone may display a 3D model 1401 of the toy car in the 3D model preview interface in response to an operation of tapping the "View" button 1302 by the user. The user may view the 3D model 1401 of the toy car in the 3D model preview interface shown in FIG. 14. An operation of tapping the "View" button 1302 by the user is an operation of previewing the three-dimensional model corresponding to the target object.

Optionally, when viewing the 3D model of the toy car in the 3D model preview interface, the user may perform a counterclockwise rotation operation or a clockwise rotation operation on the 3D model of the toy car in any direction (for example, a horizontal direction or a vertical direction). The mobile phone may display presentation effects of the 3D model of the toy car at different angles (360 degrees) for the user in the 3D model preview interface in response to the foregoing operation of the user.

Figure 15:
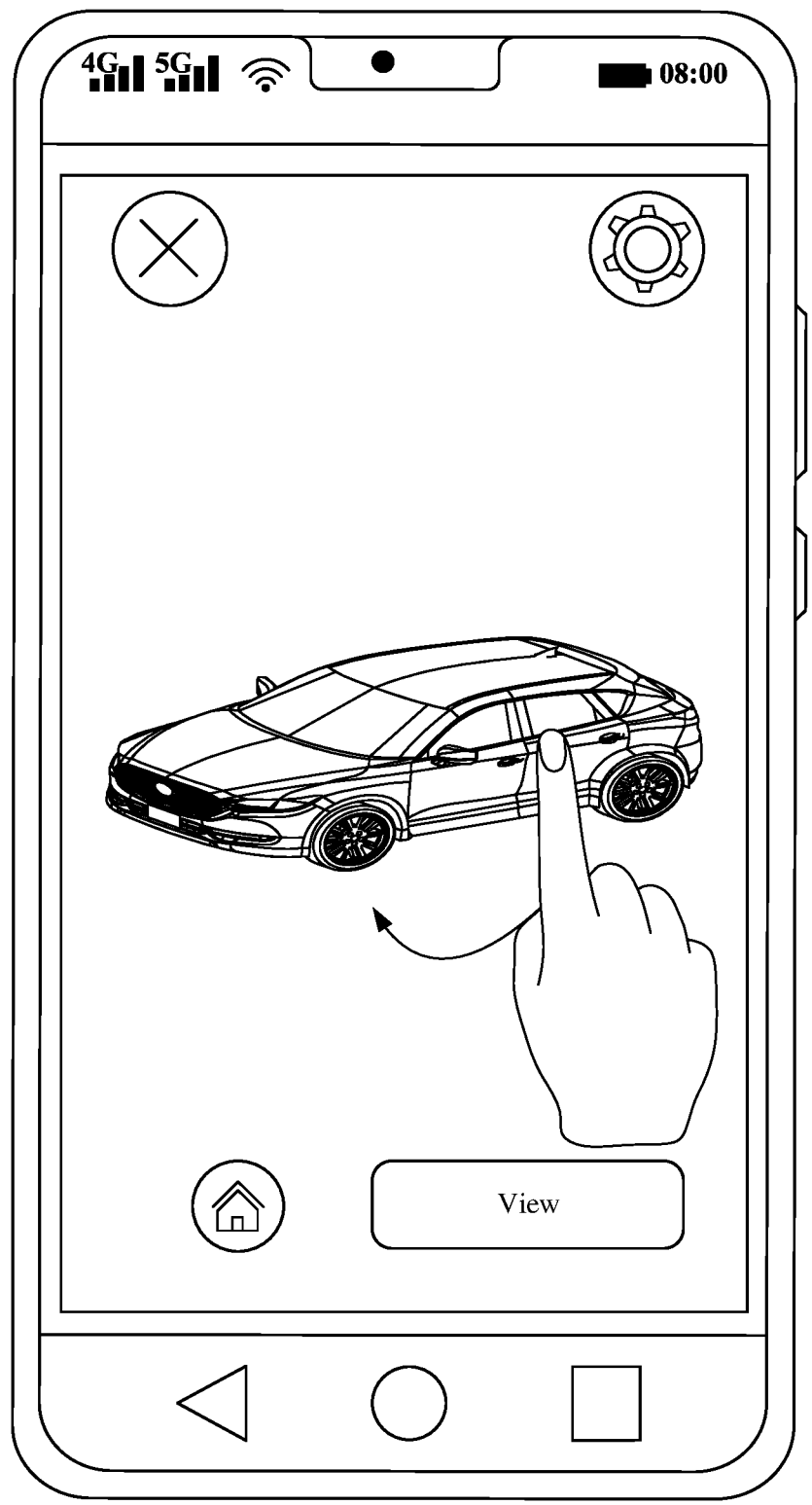
FIG. 15 is a schematic diagram of performing a counter-clockwise rotation operation along a horizontal direction on a 3D model of a toy car by a user according to an embodiment of this application.

For example, FIG. 15 is a schematic diagram of performing a counterclockwise rotation operation along a horizontal direction on a 3D model of a toy car by a user according to an embodiment of this application. As shown in FIG. 15, the user may use a finger to drag, on a 3D model preview interface, the 3D model of the toy car to rotate in a counterclockwise direction in a horizontal direction.

Figure 16A:
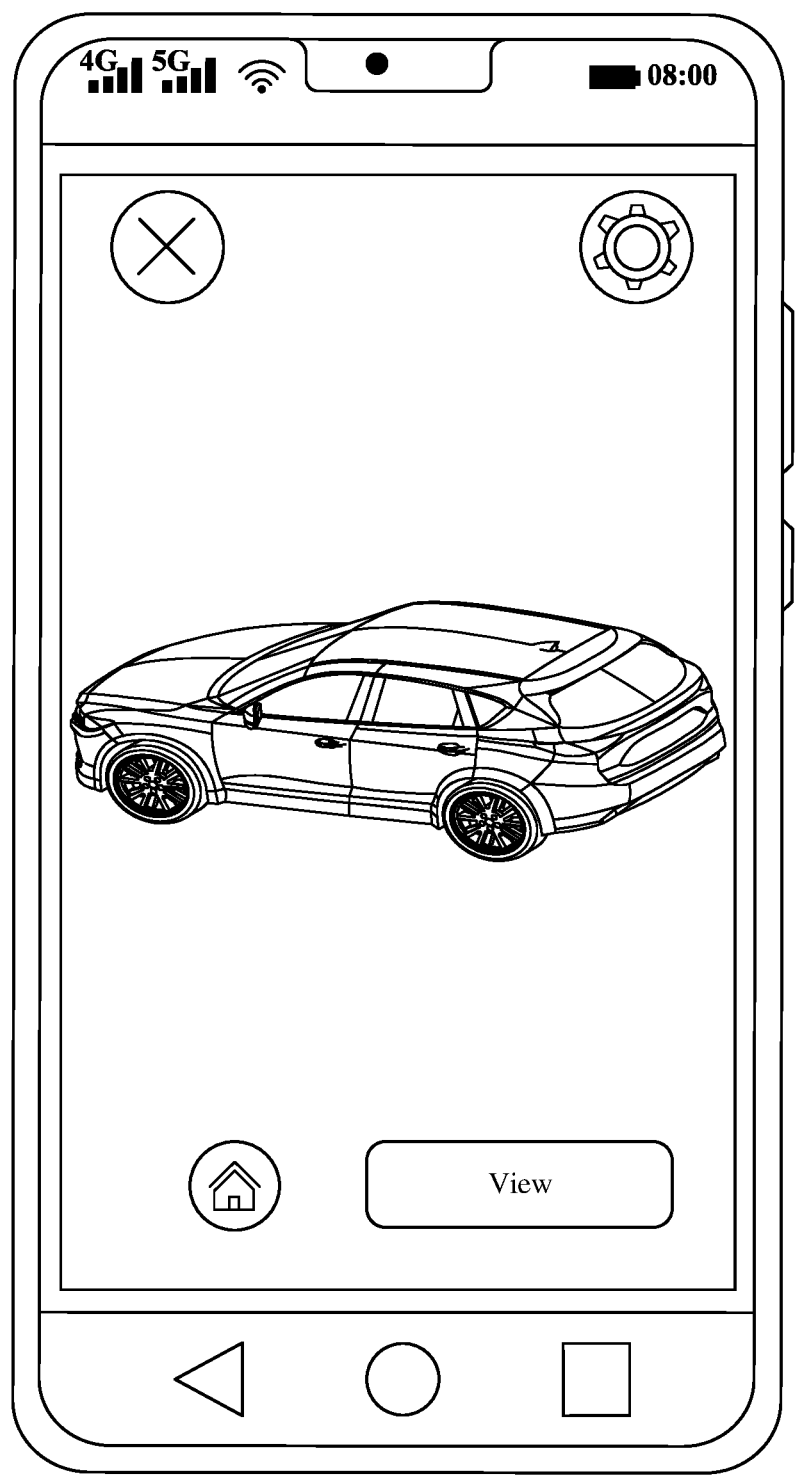
FIG. 16(a) and FIG. 16(b) are still another schematic diagram of a 3D model preview interface according to an embodiment of this application.
Figure 16B:
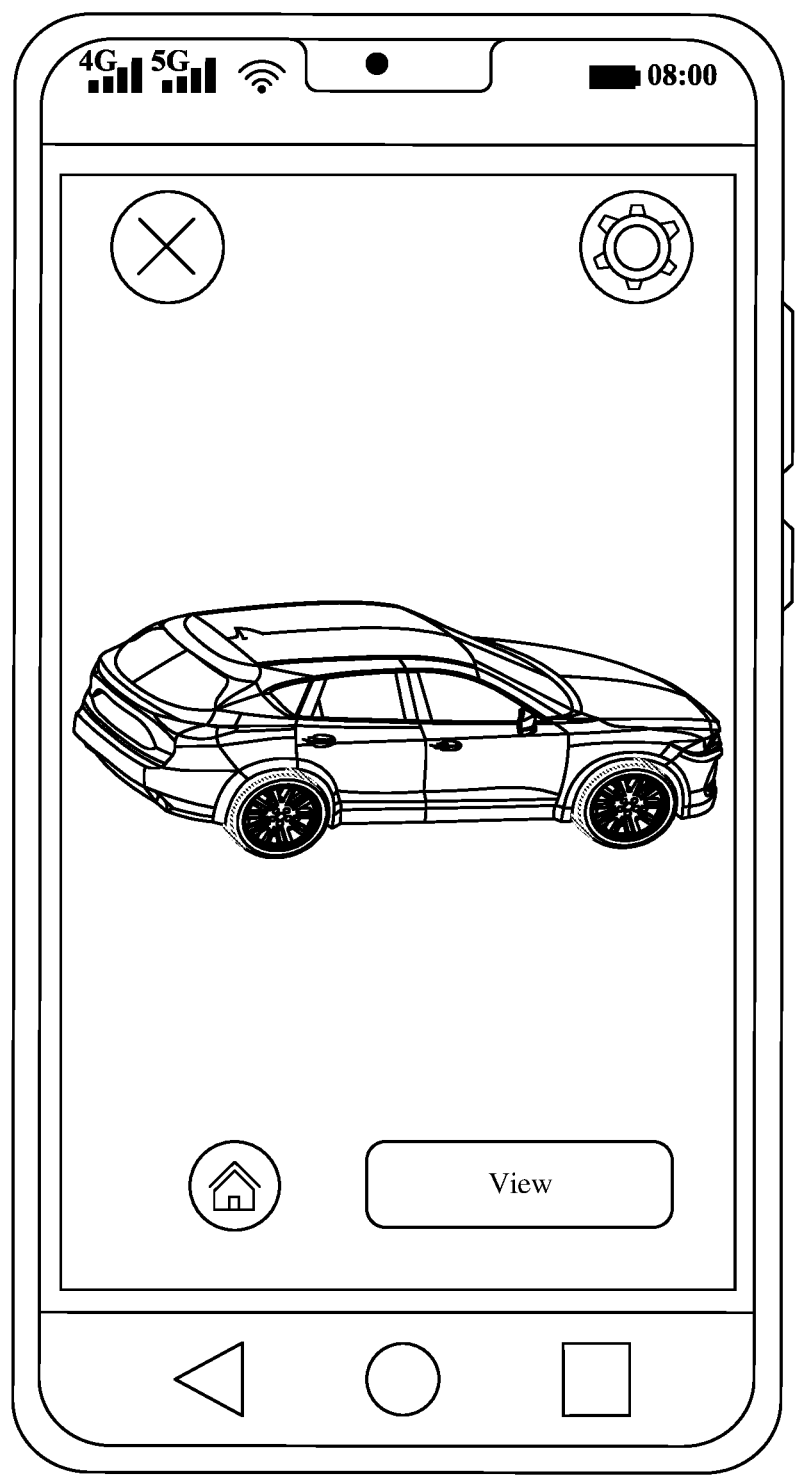

FIG. 16(a) and FIG. 16(b) are still another schematic diagram of a 3D model preview interface according to an embodiment of this application. As shown in FIG. 16(a) and FIG. 16(b), when the user may drag the 3D model of the toy car in the 3D model preview interface by using a finger to rotate the 3D model in a counterclockwise direction in a horizontal direction, the mobile phone may display, on the 3D model preview interface, presentation effects of angles shown in FIG. 16(a), FIG. 16(b), and the like for the user in response to an operation of dragging the 3D model of the toy car in the counterclockwise direction in the horizontal direction.

It may be understood that the presentation effects of angles shown in FIG. 16(a), FIG. 16(b), and the like are only an example for description. An angle at which the 3D model of the toy car is presented is related to a direction, a distance, a quantity of times, and the like of dragging the 3D model of the toy car by the user, and is not represented one by one herein.

Optionally, when viewing the 3D model of the toy car in the 3D model preview interface, the user may further perform a zoom-in or zoom-out operation on the 3D model of the toy car. The mobile phone may display a zoom-in effect or a zoom-out effect of the 3D model of the toy car for the user on the 3D model preview interface in response to the zoom-in or zoom-out operation performed by the user on the 3D model of the toy car.

Figure 17:
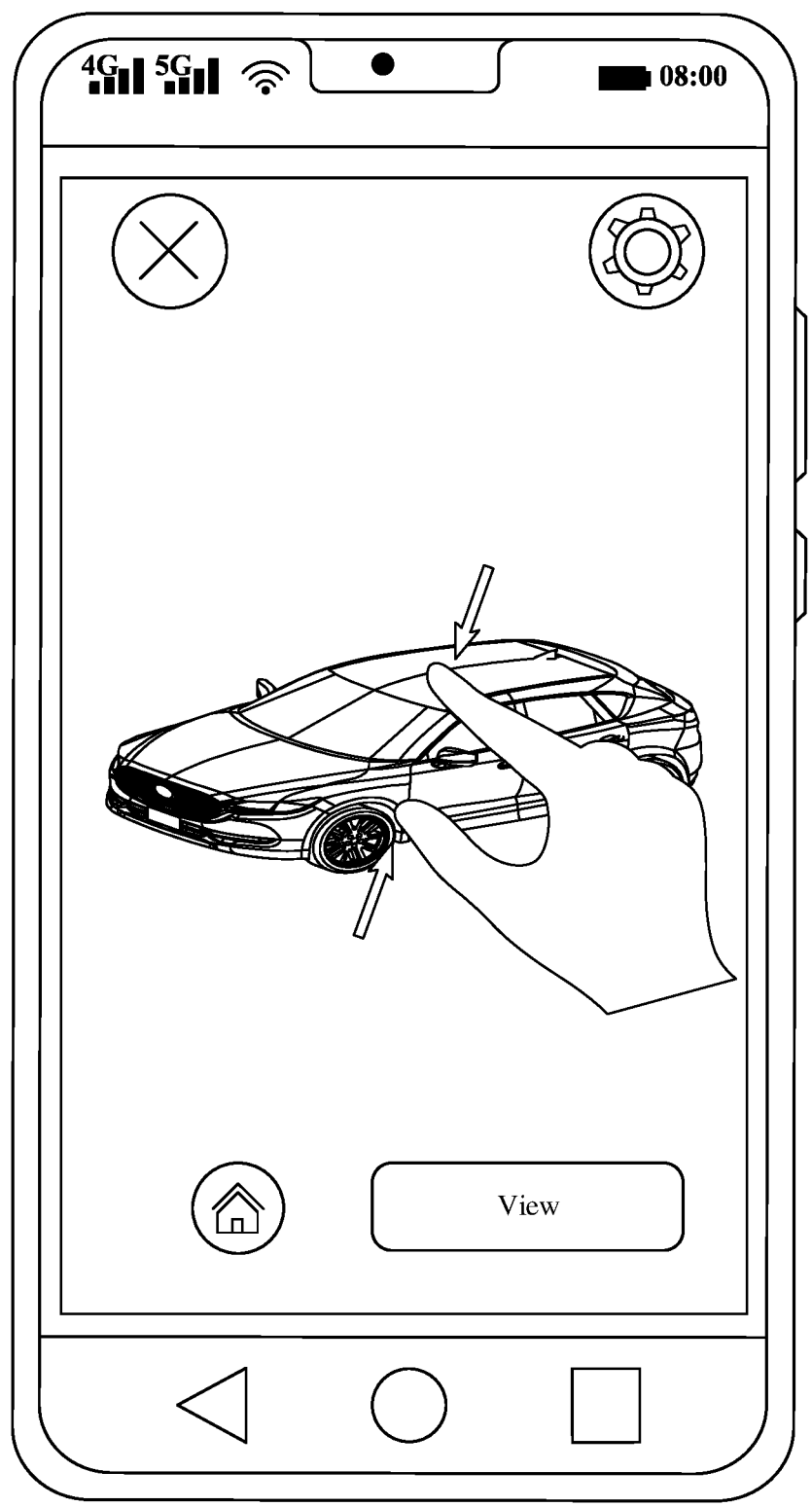
FIG. 17 is a schematic diagram of performing a zoom-out operation on a 3D model of a toy car by a user according to an embodiment of this application.

For example, FIG. 17 is a schematic diagram of performing a zoom-out operation on a 3D model of a toy car by a user according to an embodiment of this application. As shown in FIG. 17, the user may use two fingers to slide inward (in relative directions) on a 3D model preview interface, and the sliding operation is a zoom-out operation.

Figure 18:
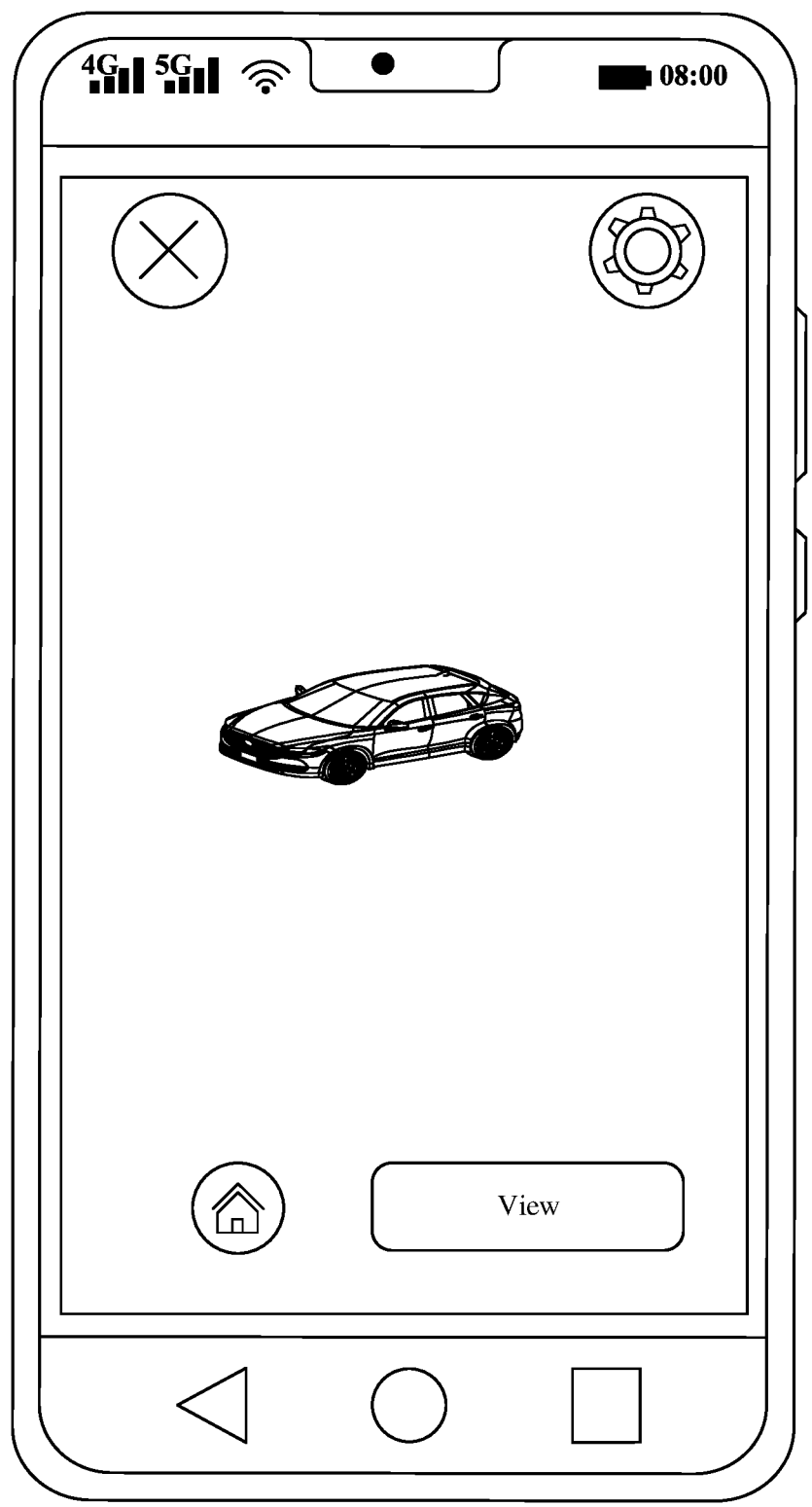
FIG. 18 is still another schematic diagram of a 3D model preview interface according to an embodiment of this application.

FIG. 18 is still another schematic diagram of a 3D model preview interface according to an embodiment of this application. As shown in FIG. 18, when the user performs a zoom-out operation on the 3D model of the toy car, the mobile phone may display a presentation effect obtained after the 3D model of the toy car is zoomed out for the user on the 3D model preview interface in response to the zoom-out operation performed by the user on the 3D model of the toy car.

Similarly, a zoom-in operation performed by the user on the 3D model of the toy car may be using two fingers to slide outward (in opposite directions) on the 3D model preview interface. When the user performs the zoom-in operation on the 3D model of the toy car, the mobile phone may display a presentation effect of the zoom-in 3D model of the toy car for the user on the 3D model preview interface in response to the zoom-in operation performed by the user on the 3D model of the toy car. Details are not described again.

It should be noted that the zoom-in operation or the zoom-out operation performed by the user on the 3D model of the toy car is an example for description. In some other implementations, the zoom-in operation or the zoom-out operation performed by the user on the 3D model of the toy car may alternatively be a double-tap operation or a touch and hold operation. Alternatively, the 3D model preview interface may further include a function control that can perform the zoom-in operation or the zoom-out operation, or the like. This is not limited herein.

In some other embodiments, after receiving the instruction message from the cloud, the mobile phone may display only the 3D model preview interface shown in FIG. 13. After the user taps the "View" button 1302, the mobile phone downloads the 3D model of the target object from the cloud in response to an operation tapping the "View" button 1302 by the user, and displays the 3D model of the target object on the 3D model preview interface for the user to preview. A trigger condition for downloading the 3D model of the target object from the cloud by the mobile phone is not limited in this application either.

According to the foregoing descriptions, in this embodiment of this application, the user only needs to perform, on a terminal device side, an operation related to collecting the data required for 3D modeling, and then view or preview a final 3D model on the terminal device. For a user, all operations are completed on the terminal device side, so that operations are simpler and user experience may be better.

Figure 19:
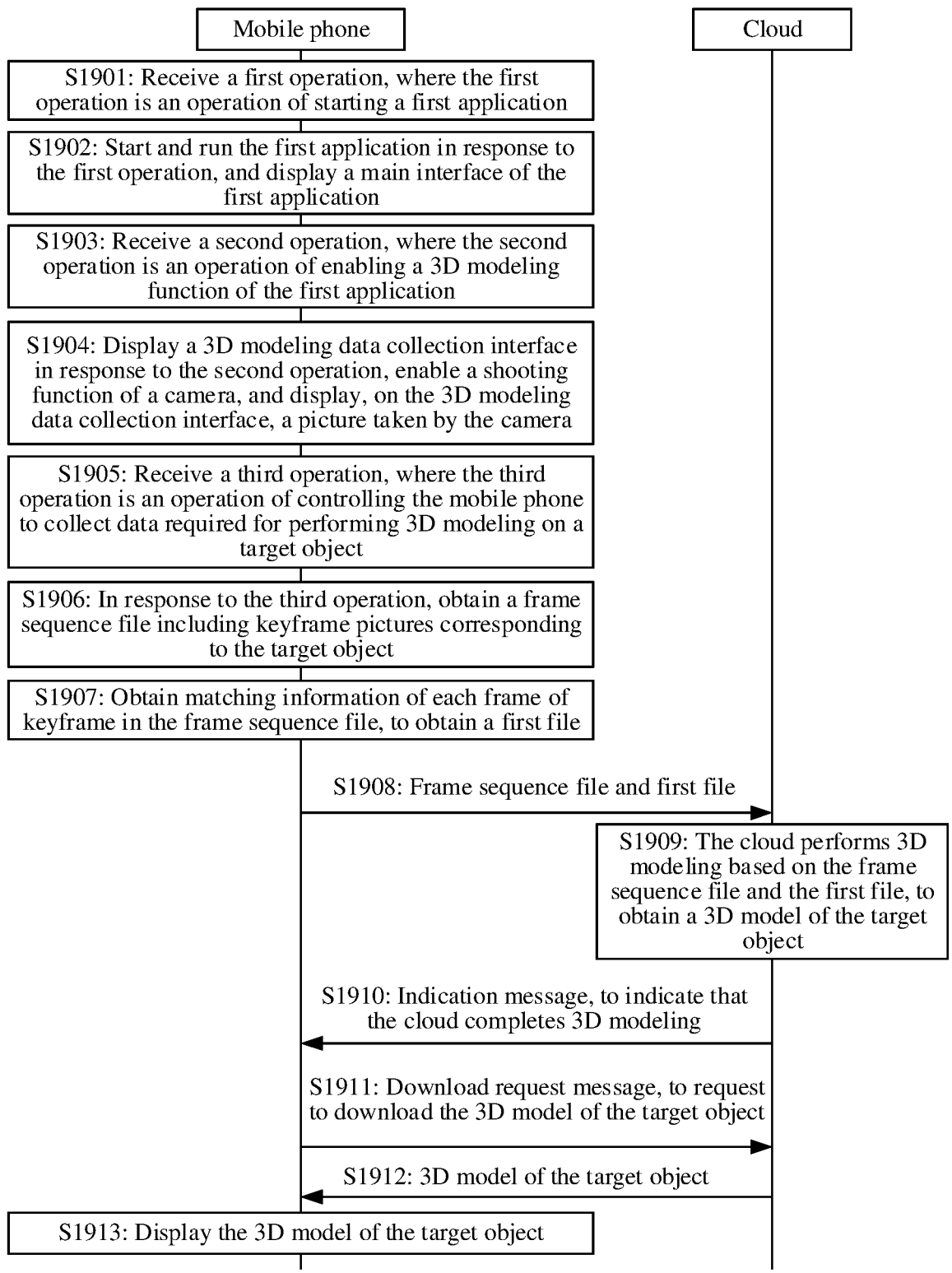
FIG. 19 is a schematic flowchart of a 3D modeling method according to an embodiment of this application.
Figure 20:
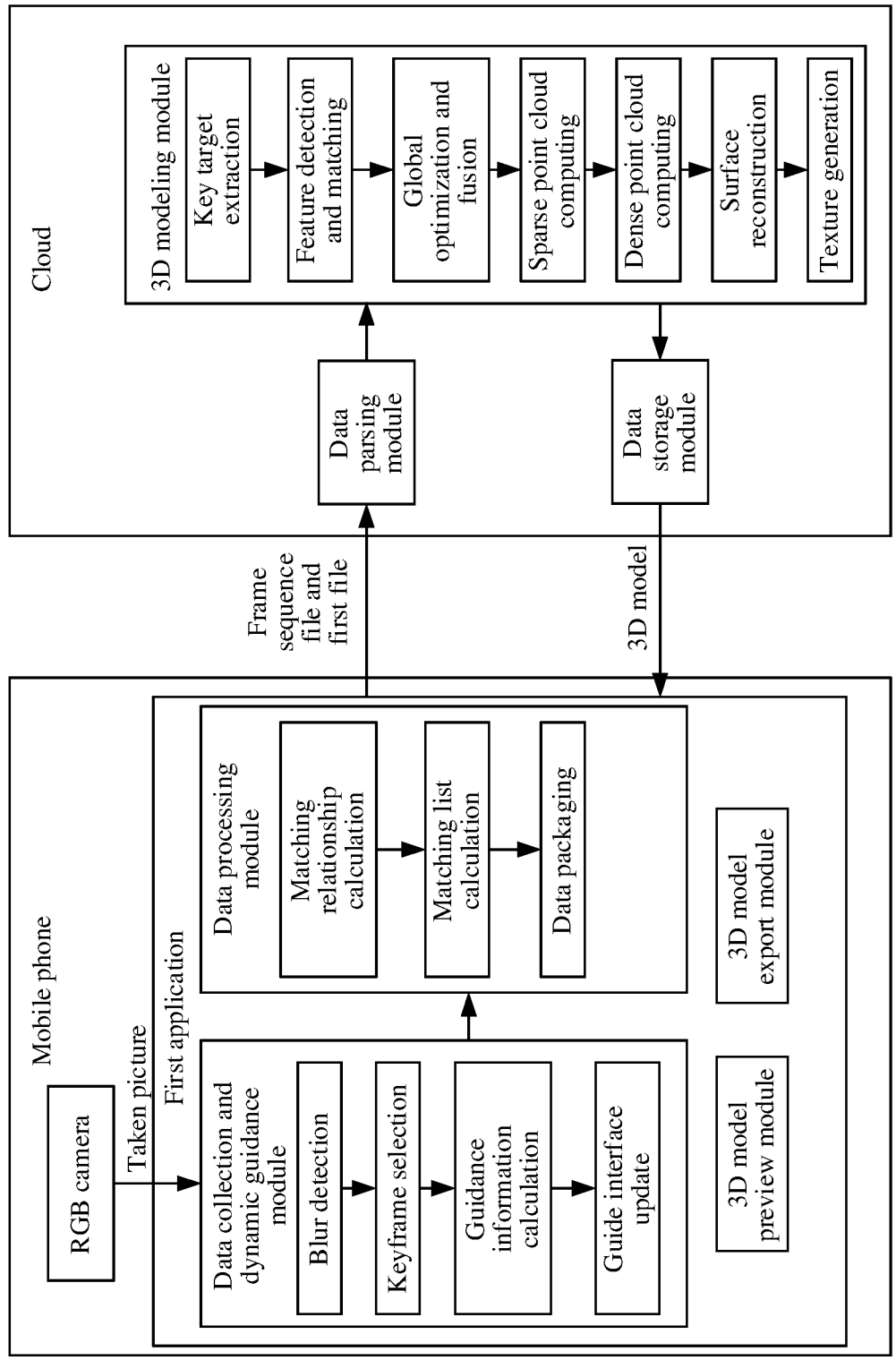
FIG. 20 is a schematic logical diagram of a 3D modeling method implemented by a device-cloud collaborative system according to an embodiment of this application.

To make the technical solutions provided in embodiments of this application more concise and clearer, the following separately describes, with reference to FIG. 19 and FIG. 20, implementation logic of the 3D modeling method provided in embodiments of this application by using examples.

For example, FIG. 19 is a schematic flowchart of a 3D modeling method according to an embodiment of this application. As shown in FIG. 19, the 3D modeling method may include S1901 to S1913.

S1901: A mobile phone receives a first operation, where the first operation is an operation of starting a first application.

For example, the first operation may be the foregoing operation of tapping or touching the application icon 302 of the first application on the home screen of the mobile phone shown in FIG. 3. Alternatively, the first operation may be an operation of tapping or touching a function control of the first application on another display interface such as a pull-down interface or a leftmost screen. Alternatively, the first operation may be the foregoing operation of controlling, by using the voice assistant, the mobile phone to start and run the first application.

S1902: The mobile phone starts and runs the first application in response to the first operation, and displays a main interface of the first application.

For the main interface of the first application, refer to FIG. 4. The main interface of the first application may be referred to as a second interface.

S1903: The mobile phone receives a second operation, where the second operation is an operation of enabling a 3D modeling function of the first application.

For example, the second operation may be an operation of tapping or touching the function control "Start modeling" 402 in the main interface 401 of the first application shown in FIG. 4.

S1904: The mobile phone displays a 3D modeling data collection interface in response to the second operation, enables a shooting function of a camera, and displays, on the 3D modeling data collection interface, a picture taken by the camera.

For the displayed 3D modeling data collection interface of the mobile phone in response to the second operation, refer to FIG. 5. The 3D modeling data collection interface may be referred to as a first interface.

S1905: The mobile phone receives a third operation, where the third operation is an operation of controlling the mobile phone to collect data required for performing 3D modeling on a target object.

For example, the third operation may include the operation of tapping or touching the scan button 502 on the 3D modeling data collection interface shown in FIG. 5 by the user, and the operation of holding the mobile phone by the user to perform encircling shooting around the target object. The third operation may also be referred to as a collection operation.

S1906: In response to the third operation, the mobile phone obtains a frame sequence file including keyframe pictures corresponding to the target object.

S1907: The mobile phone obtains matching information of each frame of keyframe in the frame sequence file, to obtain a first file.

For the first file, refer to the descriptions in the foregoing embodiments. For each frame of keyframe, the matching information of the frame of keyframe included in the first file may include: identification information of nearest keyframes corresponding to four directions, namely, the top, bottom, left, and right directions, of the frame of keyframe. For example, the identification information may be a number of the foregoing picture.

S1908: The mobile phone sends the frame sequence file and the first file to a cloud.

Correspondingly, the cloud receives the frame sequence file and the first file.

S1909: The cloud performs 3D modeling based on the frame sequence file and the first file, to obtain a 3D model of the target object.

For a specific process in which the cloud performs 3D modeling based on the frame sequence file and the first file, refer to the descriptions in the third part in the foregoing embodiments. Details are not described again. The 3D model of the target object may include a basic 3D model of the target object and texture of a surface of the target object. The texture (texture mapping) of the surface of the target object is pasted onto the basic 3D model of the target object, that is, to obtain the 3D model of the target object.

S1910: The cloud sends an indication message to the mobile phone, to indicate that the cloud completes 3D modeling.

Correspondingly, the mobile phone receives the indication message.

S1911: The mobile phone sends a download request message to a cloud, where the download request message is used to request to download the 3D model of the target object.

Correspondingly, the cloud receives the download request message.

S1912: The cloud sends the 3D model of the target object to the mobile phone.

Correspondingly, the mobile phone receives the 3D model of the target object.

S1913: The mobile phone displays the 3D model of the target object.

The mobile phone displays the 3D model of the target object for the user to preview the 3D model of the target object.

For example, for an effect of displaying the 3D model of the target object by the mobile phone, refer to FIG. 12, FIG. 13, FIG. 14, FIG. 16(*a*), FIG. 16(*b*), FIG. 18, and the like. When previewing the 3D model of the target object, the user may rotate an angle, zoom in, zoom out, or the like on the 3D model of the target object displayed by the mobile phone.

For specific implementation and beneficial effects of the procedure shown in FIG. 19, refer to the descriptions in the foregoing embodiments. Details are not described again.

For example, FIG. 20 is a schematic logical diagram of a 3D modeling method implemented by a device-cloud collaborative system according to an embodiment of this application.

As shown in FIG. 20, in this embodiment of this application, a mobile phone may include at least an RGB camera (for example, a camera) and a first application. The first application is the foregoing 3D modeling application.

The RGB camera may be configured to implement a shooting function of the mobile phone, and shoot a to-be-modeled target object, to obtain a picture corresponding to the target object. The RGB camera may transmit a taken picture to the first application.

The first application may include a data collection and dynamic guidance module, a data processing module, a 3D model preview module, and a 3D model export module.

The data collection and dynamic guidance module can implement functions such as blur detection, keyframe selection, guidance information calculation, and guide interface update. For the picture taken by the RGB camera, through the blur detection function, blur detection may be performed on each frame of picture shot (which may be referred to as an input frame), and a picture that meets a definition requirement is obtained as a keyframe. If definition of a current frame of picture does not meet the requirement, a next frame of picture is obtained. Through the keyframe selection function, whether a picture is stored in the frame sequence file can be determined. If a picture is not stored in the frame sequence file, the frame of picture is added to the frame sequence file. Through the guidance information calculation function, a relationship between a picture and each patch in a patch model may be determined based on camera pose information corresponding to the picture, to obtain a patch corresponding to the picture. A correspondence between the image and the patch is the guidance information. Through the guide interface update function, a display effect of a patch in the patch model may be updated (that is, changed) based on the foregoing guidance information obtained through calculation, for example, the patch is lit.

The data processing module can implement functions such as matching relationship calculation, matching list calculation, and data packaging. Through the matching relationship calculation function, a matching relationship between keyframes in the frame sequence file can be calculated, for example, whether the keyframes are adjacent. Specifically, the data processing module may obtain the matching relationship between the keyframes in the frame sequence file through calculation through the matching relationship calculation function and based on an association relationship between patches in a patch model. Through the matching list calculation function, a matching list of each keyframe may be generated based on a calculation result of the matching relationship calculation function. The matching list of each keyframe includes matching information of each keyframe. For example, the matching information of some keyframe includes identification information of another keyframe associated with the keyframe. Through the data packaging function, the first file that includes the matching information of each keyframe and the frame sequence file may be packaged. After packaging the first file and the frame sequence file, the mobile phone may send a packaged data packet (including the first file and the frame sequence file) to the cloud.

The cloud may include a data parsing module, a 3D modeling module, and a data storage module. The data parsing module may parse the received data packet, to obtain the frame sequence file and the first file. The 3D modeling module may perform 3D modeling based on the frame sequence file and the first file, to obtain a 3D model.

For example, the 3D modeling module may implement functions such as key target extraction, feature detection and matching, global optimization and fusion, sparse point cloud computing, dense point cloud computing, surface reconstruction, and texture generation. Through the key target extraction function, a target object of interest in a keyframe picture may be separated from a background, and a meaningful object entity is identified and translated from the picture to extract different image features. Through the feature detection and matching function, a unique pixel in a keyframe picture is detected as a feature point of the keyframe picture; feature points with prominent features in different keyframe pictures are described; and similarity between two descriptions is compared to determine whether the feature points in different keyframe pictures are the same feature. Through the global optimization and fusion function, the sparse point cloud computing function, the dense point cloud computing function, and the like, three-dimensional point cloud data corresponding to the target object may be generated based on a feature detection and matching result. Through the surface reconstruction function, three-dimensional point cloud data is used to accurately restore a three-dimensional surface shape of an object, to obtain a basic 3D model of the target object. Through the texture generation function, a texture (also referred to as texture mapping) of a surface of the target object is generated based on a keyframe picture or a feature of the keyframe picture. After the texture of the surface of the target object is obtained, the texture is mapped to the surface of the basic 3D model of the target object in a specific manner, so that the 3D model of the target object can be obtained.

After obtaining the 3D model of the target object, the 3D modeling module may store the 3D model of the target object in the data storage module.

The first application of the mobile phone may download the 3D model of the target object from the data storage module in the cloud. After the 3D model of the target object is downloaded, the first application may provide a 3D model preview function for the user by using the 3D model preview module, or provide a 3D model export function for the user by using the 3D model export module. For a specific process in which the first application provides the 3D model preview function for the user by using the 3D model preview module, refer to the descriptions in the foregoing embodiments.

Optionally, in embodiments of this application, when the mobile phone collects, in the first part, the data required for performing 3D modeling on the target object, the mobile phone may further display a scanning progress on the 3D modeling data collection interface. For example, refer to FIG. 7A to FIG. 7E. The mobile phone may display the scanning progress by using an annular black filling effect in the scan button on the 3D modeling data collection interface. It may be understood that a manner in which the mobile phone displays the scanning progress on the 3D modeling data collection interface may vary with UI presentation effects of the scan button. This is not limited herein.

In some other embodiments, the mobile phone may alternatively not display the scanning progress, and the user may learn of the scanning progress based on a light-up status of the patch in the patch model.

The foregoing embodiment is described by using an example in which the 3D modeling method provided in embodiments of this application is implemented in a device-cloud collaborative system including a terminal device and a cloud. Optionally, in some other embodiments, all steps of the 3D modeling method provided in this embodiment of this application may be implemented on a terminal device side. For example, for some terminal devices with a relatively strong processing capability and sufficient computing resources, all functions implemented on the cloud side in the foregoing embodiments may alternatively be implemented in the terminal device. To be specific, after obtaining the frame sequence file and the first file, the terminal device may directly generate the 3D model of the target object locally based on the frame sequence file and the first file, and provide functions such as preview and export of the 3D model. A specific principle of locally generating the 3D model of the target object based on the frame sequence file and the first file by the terminal device is the same as a principle of generating the 3D model of the target object based on the frame sequence file and the first file by the cloud in the foregoing embodiment. Details are not described herein again.

It should be understood that the foregoing embodiments are only examples for describing the 3D modeling method provided in embodiments of this application. In some other possible implementations, some execution steps may be deleted or added in the foregoing embodiments, or a sequence of some steps in the foregoing embodiments may be adjusted. This is not limited in this application.

Corresponding to the 3D modeling method in the foregoing embodiment, an embodiment of this application provides a modeling apparatus. The apparatus may be used in a terminal device, and is configured to implement steps that can be implemented by the terminal device in the 3D modeling method in the foregoing embodiments. Functions of the apparatus may be implemented by hardware, or may be implemented by hardware executing corresponding software. The hardware or the software includes one or more modules or units corresponding to the foregoing function.

Figure 21:
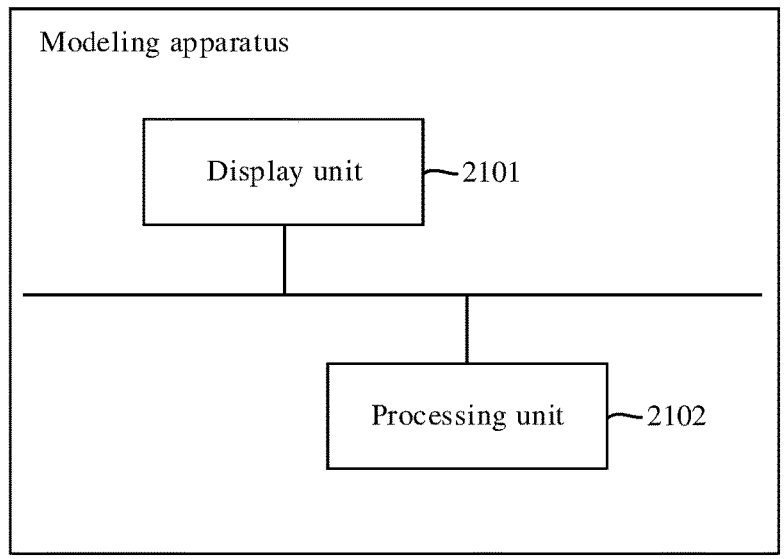
FIG. 21 is a schematic diagram of a structure of a modeling apparatus according to an embodiment of this application.

For example, FIG. 21 is a schematic diagram of a structure of a modeling apparatus according to an embodiment of this application. As shown in FIG. 21, the apparatus may include a display unit 2101 and a processing unit 2102. The display unit 2101 and the processing unit 2102 may be configured to cooperate to implement functions of the terminal device in the modeling method in the foregoing method embodiment.

For example, the display unit 2101 is configured to display a first interface, where the first interface includes a taken picture of the terminal device.

The processing unit 2102 is configured to: collect a plurality of frames of images corresponding to a to-be-modeled target object in response to a collection operation, obtain an association relationship between the plurality of frames of images, and obtain a three-dimensional model corresponding to the target object based on the plurality of frames of images and the association relationship between the plurality of frames of images.

The display unit 2101 is further configured to display the three-dimensional model corresponding to the target object.

The display unit 2101 is further configured to display a first virtual bounding body in a process of collecting the plurality of frames of images corresponding to the target object. The first virtual bounding body includes a plurality of patches. The processing unit 2102 is specifically configured to: when the terminal device is in a first pose, collect a first image, and change a display effect of a patch corresponding to the first image; when the terminal device is in a second pose, collect a second image, and change a display effect of a patch corresponding to the second image; and after changing display effects of the plurality of patches of the first virtual bounding body, obtain the association relationship between the plurality of frames of images based on the plurality of patches.

Optionally, the display unit 2101 and the processing unit 2102 are further configured to implement other display functions and processing functions of the terminal device in the modeling method in the foregoing method embodiment. Details are not described herein again.

Figure 22:
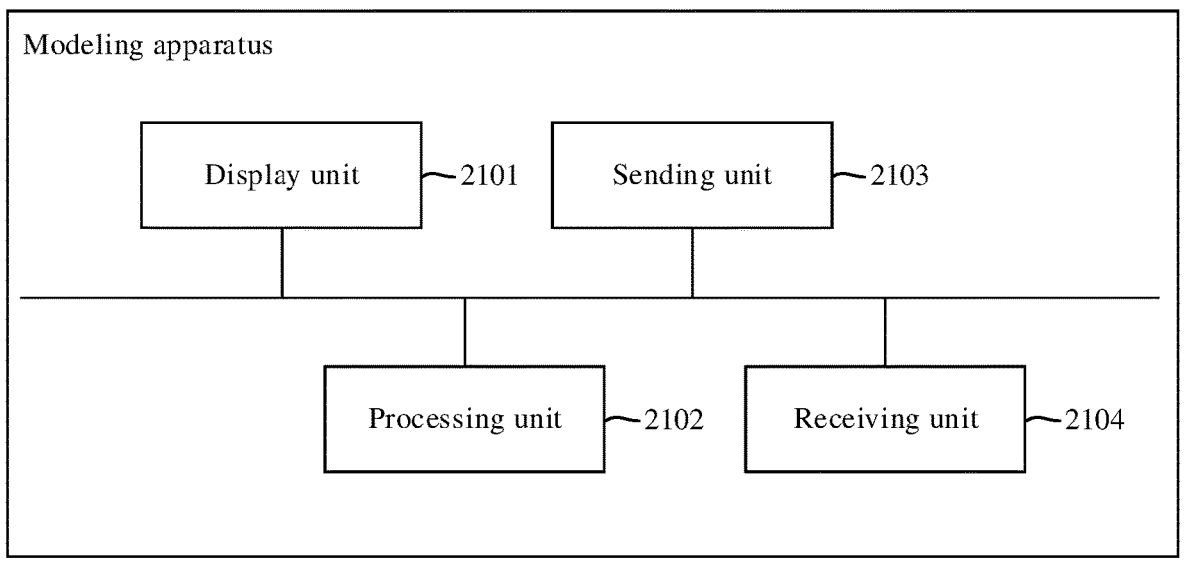
FIG. 22 is a schematic diagram another structure of a modeling apparatus according to an embodiment of this application.

Optionally, FIG. 22 is a schematic diagram another structure of a modeling apparatus according to an embodiment of this application. As shown in FIG. 22, in the modeling method described in the foregoing method embodiment, for the implementation in which the terminal device sends the plurality of frames of images and the association relationship between the plurality of frames of images to the server, and the server generates the three-dimensional model corresponding to the target object based on the plurality of frames of images and the association relationship between the plurality of frames of images, the modeling apparatus may further include a sending unit 2103 and a receiving unit 2104. The sending unit 2103 is configured to send the plurality of frames of images and the association relationship between the plurality of frames of images to the server, and the receiving unit 2104 is configured to receive the three-dimensional model corresponding to the target object that is sent by the server.

Optionally, the sending unit 2103 is further configured to implement another sending function that can be implemented by the terminal device in the method in the foregoing method embodiment, for example, sending a download request message. The receiving unit 2104 is further configured to implement another receiving function that can be implemented by the terminal device in the method in the foregoing method embodiment, for example, receiving an indication message. Details are not described herein again.

It should be understood that the apparatus may further include other modules or units that can implement functions of the terminal device in the method in the foregoing embodiment, which are not shown one by one herein.

Optionally, an embodiment of this application further provides a modeling apparatus. The apparatus may be used in a server, and is configured to implement functions of the server in the 3D modeling method in the foregoing embodiment. Functions of the apparatus may be implemented by hardware, or may be implemented by hardware executing corresponding software. The hardware or the software includes one or more modules or units corresponding to the foregoing function.

Figure 23:
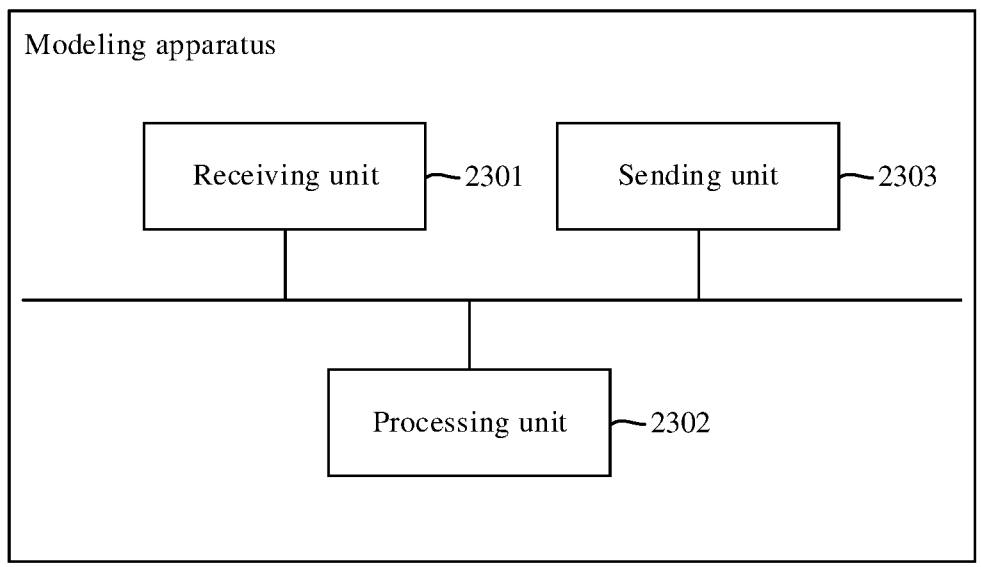
FIG. 23 is a schematic diagram of still another structure of a modeling apparatus according to an embodiment of this application.

For example, FIG. 23 is a schematic diagram of still another structure of a modeling apparatus according to an embodiment of this application. As shown in FIG. 23, the apparatus may include a receiving unit 2301, a processing unit 2302, and a sending unit 2303. The receiving unit 2301, the processing unit 2302, and the sending unit 2303 may be configured to cooperate to implement functions of the server in the modeling method in the foregoing method embodiment.

For example, the receiving unit 2301 may be configured to receive a plurality of frames of images corresponding to a target object and an association relationship between the plurality of frames of images that are sent by a terminal device. The processing unit 2302 may be configured to generate a three-dimensional model corresponding to the target object based on the plurality of frames of images and the association relationship between the plurality of frames of images. The sending unit 2303 may be configured to send the three-dimensional model corresponding to the target object to the terminal device.

Optionally, the receiving unit 2301, the processing unit 2302, and the sending unit 2303 may be configured to implement all functions that can be implemented by the server in the modeling method described in the foregoing method embodiment, and details are not described herein again.

It should be understood that division of units (or referred to as modules) in the apparatus is only logical function division. During actual implementation, all or some of the units may be integrated into one physical entity, or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware.

For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, the units in the foregoing apparatus may be configured as one or more integrated circuits for implementing the foregoing method, for example, one or more application-specific integrated circuits (application-specific integrated circuit, ASIC), one or more digital signal processors (digital signal processor, DSP), one or more field programmable gate arrays (field programmable gate array, FPGA), or a combination of at least two of the integrated circuits.

For another example, when the units in the apparatus may be implemented in a form of scheduling a program by the processing element, the processing element may be a general-purpose processor, for example, a central processing unit (central processing unit, CPU) or another processor that can invoke the program. For still another example, the units may be integrated and implemented in a form of a system-on-a-chip (system-on-a-chip, SOC).

In an implementation, the units that implement the corresponding steps in the foregoing method in the foregoing apparatus may be implemented by using a processing element to schedule a program. For example, the apparatus may include a processing element and a storage element. The processing element invokes a program stored in the storage element, to perform the method in the foregoing method embodiment. The storage element may be a storage element whose processing element is located on a same chip, that is, an on-chip storage element.

In another implementation, the program for performing the foregoing method may be in a storage element on a different chip from the processing element, that is, an off-chip storage element. In this case, the processing element invokes or loads the program from the off-chip storage element to the on-chip storage element, to invoke and perform the steps performed by the terminal device or the server in the method in the foregoing method embodiment.

For example, an embodiment of this application may further provide an apparatus, for example, an electronic device. The electronic device may include: a processor, a memory, and a computer program. The computer program is stored in the memory. When the computer program is executed by the processor, the electronic device implements the steps performed by the terminal device or the server in the 3D modeling method described in the foregoing embodiment. The memory may be located inside the electronic device, or may be located outside the electronic device. There are one or more processors.

For example, the electronic device may be a terminal device such as a mobile phone, a large screen (for example, a smart screen), a tablet computer, a wearable device (for example, a smart watch or a smart band), a television, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA).

In still another implementation, a unit used by the apparatus to implement the steps in the foregoing method may be configured as one or more processing elements. The processing element herein may be an integrated circuit, for example, one or more ASICs, one or more DSPs, one or more FPGAs, or a combination of these types of integrated circuits. These integrated circuits may be integrated together to form a chip.

For example, an embodiment of this application further provides a chip. The chip may be applied to the foregoing electronic device. The chip includes one or more interface circuits and one or more processors. The interface circuit and the processor are interconnected through a line. The processor receives and executes computer instructions from a memory of an electronic device through the interface circuit, to implement the steps performed by the terminal device or the server in the 3D modeling method described in the foregoing embodiment.

An embodiment of this application further provides a computer program product, including computer-readable code. When the computer-readable code is run in an electronic device, the electronic device implements the steps performed by the terminal device or the server in the 3D modeling method in the foregoing embodiment.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium.

Based on such an understanding, the technical solutions of embodiments of this application essentially, or the part contributing to the conventional technology, or all or some of the technical solutions may be implemented in a form of a software product, for example, a program. The software product is stored in a program product, for example, a computer-readable storage medium, and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

For example, an embodiment of this application may further provide a computer-readable storage medium. The computer-readable storage medium includes a computer program. When the computer program is run on an electronic device, the electronic device implements the steps performed by the terminal device or the server in the 3D modeling method described in the foregoing embodiment.

Optionally, an embodiment of this application further provides a device-cloud collaborative system. For composition of the device-cloud collaborative system, refer to FIG. 1 or FIG. 20. The device-cloud collaborative system includes a terminal device and a server. The terminal device is connected to the server. The terminal device displays a first interface, where the first interface includes a taken picture of the terminal device. The terminal device collects a plurality of frames of images corresponding to a to-be-modeled target object in response to a collection operation, and obtains an association relationship between the plurality of frames of images. The terminal device displays a first virtual bounding body in a process of collecting the plurality of frames of images corresponding to the target object. The first virtual bounding body includes a plurality of patches. That the terminal device collects a plurality of frames of images corresponding to a to-be-modeled target object in response to a collection operation, and obtains an association relationship between the plurality of frames of images includes: When the terminal device is in a first pose, the terminal device collects a first image, and changes a display effect of a patch corresponding to the first image. When the terminal device is in a second pose, the terminal device collects a second image, and changes a display effect of a patch corresponding to the second image. After changing display effects of the plurality of patches of the first virtual bounding body, the terminal device obtains the association relationship between the plurality of frames of images based on the plurality of patches. The terminal device sends the plurality of frames of images and the association relationship between the plurality of frames of images to the server. The server obtains a three-dimensional model corresponding to the target object based on the plurality of frames of images and the association relationship between the plurality of frames of images. The server sends the three-dimensional model corresponding to the target object to the terminal device. The terminal device displays the three-dimensional model corresponding to the target object.

Similarly, in the device-cloud synergy system, the terminal device may implement all functions that can be implemented by the terminal device in the 3D modeling method in the foregoing method embodiment, and the server may implement all functions that can be implemented by the server in the 3D modeling method in the foregoing method embodiment. Details are not described herein again.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method applied to a terminal device, the method comprising:
    displaying, by the terminal device, a first interface comprising a taken picture of the terminal device;
    collecting, by the terminal device, a plurality of frames of images corresponding to a target object that is to be modeled in response to a collection operation, and obtaining an association relationship between the plurality of frames of images, wherein the terminal device displays a first virtual bounding body in a process of collecting the plurality of frames of images corresponding to the target object, and the first virtual bounding body comprises a plurality of patches, wherein collecting, by the terminal device, the plurality of frames of images corresponding to the target object in response to the collection operation, and obtaining the association relationship between the plurality of frames of images comprises:
        when the terminal device is in a first pose, collecting, by the terminal device, a first image, and changing a display effect of a first patch corresponding to the first image;
        when the terminal device is in a second pose, collecting, by the terminal device, a second image, and changing a display effect of a second patch corresponding to the second image; and
        after changing display effects of the plurality of patches of the first virtual bounding body, obtaining, by the terminal device, the association relationship between the plurality of frames of images based on the plurality of patches;
    obtaining, by the terminal device, a three-dimensional model corresponding to the target object based on the plurality of frames of images and the association relationship between the plurality of frames of images; and
    displaying, by the terminal device, the three-dimensional model corresponding to the target object.

2. The method according to claim 1, wherein the terminal device comprises a first application, and before the displaying, by the terminal device, a first interface, the method further comprises:
    displaying, by the terminal device, a second interface in response to an operation of opening the first application; and
    the displaying, by the terminal device, a first interface comprises:
    displaying, by the terminal device, the first interface in response to an operation of enabling a three-dimensional modeling function of the first application on the second interface.

3. The method according to claim 1, wherein the first virtual bounding body comprises one or more layers, and the plurality of patches are distributed in the one or more layers.

4. The method according to claim 1, wherein the method further comprises:
    displaying, by the terminal device, first prompt information, wherein the first prompt information reminds a user to place a location of the target object in the taken picture at a central location.

5. The method according to claim 1, wherein the method further comprises:
    displaying, by the terminal device, second prompt information, wherein the second prompt information reminds a user to adjust a shooting environment in which the target object is located, a manner of shooting the target object, or a screen-to-body ratio of the target object.

6. The method according to claim 1, wherein before obtaining, by the terminal device, the three-dimensional model corresponding to the target object based on the plurality of frames of images and the association relationship between the plurality of frames of images, the method further comprises:
    detecting, by the terminal device, an operation of generating the three-dimensional model; and
    displaying, by the terminal device, third prompt information in response to detecting the operation of generating the three-dimensional model, wherein the third prompt information prompts a user that modeling is being performed on the target object.

7. The method according to claim 1, wherein after obtaining, by the terminal device, the three-dimensional model corresponding to the target object based on the plurality of frames of images and the association relationship between the plurality of frames of images, the method further comprises:
    displaying, by the terminal device, fourth prompt information, wherein the fourth prompt information prompts a user that modeling on the target object is completed.

8. The method according to claim 1, wherein displaying, by the terminal device, the three-dimensional model corresponding to the target object further comprises:
changing, by the terminal device, a display angle of the three-dimensional model corresponding to the target object in response to an operation of changing the display angle of the three-dimensional model corresponding to the target object, wherein the operation of changing the display angle of the three-dimensional model corresponding to the target object comprises an operation of dragging the three-dimensional model corresponding to the target object to rotate clockwise or counterclockwise along a first direction.

9. The method according to claim 1, wherein displaying, by the terminal device, the three-dimensional model corresponding to the target object further comprises:
changing, by the terminal device, a display size of the three-dimensional model corresponding to the target object in response to an operation of changing the display size of the three-dimensional model corresponding to the target object, wherein the operation of changing the display size of the three-dimensional model corresponding to the target object comprises an operation of zooming in or zooming out on the three-dimensional model corresponding to the target object.

10. The method according to claim 1, wherein the association relationship between the plurality of frames of images comprises matching information of each frame of image in the plurality of frames of images, the matching information of each frame of image comprises identification information of another image that is associated with the image and that is in the plurality of frames of images, and the matching information of each frame of image is obtained based on:
an association relationship between each frame of image and a patch corresponding to each frame of image; and
an association relationship between the plurality of patches.

11. The method according to claim 1, wherein collecting, by the terminal device, the plurality of frames of images corresponding to the target object in response to the collection operation, and obtaining the association relationship between the plurality of frames of images further comprises:
determining, by the terminal device, the target object based on the taken picture; and
when the terminal device collects the plurality of frames of images, a location of the target object in the taken picture is a central location of the taken picture.

12. The method according to claim 1, wherein collecting, by the terminal device, the plurality of frames of images corresponding to the target object comprises:
in a process of shooting the target object, performing, by the terminal device, blur detection on each frame of shot image, and collecting an image whose definition is greater than a first threshold as an image corresponding to the target object.

13. The method according to claim 1, wherein displaying, by the terminal device, the three-dimensional model corresponding to the target object comprises:
displaying, by the terminal device, the three-dimensional model corresponding to the target object in response to an operation of previewing the three-dimensional model corresponding to the target object.

14. The method according to claim 1, wherein the three-dimensional model corresponding to the target object comprises a basic three-dimensional model of the target object and texture of a surface of the target object.

15. The method according to claim 1, wherein the terminal device is connected to a server, and obtaining, by the terminal device, the three-dimensional model corresponding to the target object based on the plurality of frames of images and the association relationship between the plurality of frames of images comprises:
sending, by the terminal device, the plurality of frames of images and the association relationship between the plurality of frames of images to the server; and
receiving, by the terminal device, the three-dimensional model corresponding to the target object from the server.

16. The method according to claim 15, wherein the method further comprises:
sending, by the terminal device, a camera intrinsic parameter, gravity direction information, an image name, an image number, camera pose information, and a timestamp that correspond to each of the plurality of frames of images to the server.

17. The method according to claim 15, wherein the method further comprises:
receiving, by the terminal device, an indication message from the server, wherein the indication message indicates, to the terminal device, that the server completes modeling on the target object.

18. The method according to claim 15, wherein before receiving, by the terminal device, the three-dimensional model corresponding to the target object from the server, the method further comprises:
sending, by the terminal device, a download request message to the server, wherein the download request message requests to download the three-dimensional model corresponding to the target object from the server.

19. A modeling method applied to a server that is connected to a terminal device, wherein the method comprises:
receiving, by the server from the terminal device, a plurality of frames of images corresponding to a target object and an association relationship between the plurality of frames of images;
generating, by the server, a three-dimensional model corresponding to the target object based on the plurality of frames of images and the association relationship between the plurality of frames of images; and
sending, by the server, the three-dimensional model corresponding to the target object to the terminal device.

20. An electronic device, comprising:
one or more processors; and
a non-transitory memory coupled to the one or more processors and storing a computer program, wherein when the computer program is executed by the one or more processors, the electronic device is enabled to implement the following steps:
display a first interface, wherein the first interface comprises a taken picture of the electronic device;
collect a plurality of frames of images corresponding to a target object that is to be modeled in response to a collection operation, and obtaining an association relationship between the plurality of frames of images, wherein the electronic device displays a first virtual bounding body in a process of collecting the plurality of frames of images corresponding to the target object, and the first virtual bounding body comprises a plurality of patches, wherein collecting the plurality of frames of images corresponding to the target object in response to the collection operation, and obtaining the association relationship between the plurality of frames of images comprises:
when the electronic device is in a first pose, collect a first image and change a display effect of a first patch corresponding to the first image;
when the electronic device is in a second pose, collecting a second image and change a display effect of a second patch corresponding to the second image; and
after changing display effects of the plurality of patches of the first virtual bounding body, obtain the association relationship between the plurality of frames of images based on the plurality of patches;
obtain a three-dimensional model corresponding to the target object based on the plurality of frames of images and the association relationship between the plurality of frames of images; and
display the three-dimensional model corresponding to the target object.

* * * * *